(12) United States Patent
Mizuno et al.

(10) Patent No.: US 7,531,238 B2
(45) Date of Patent: May 12, 2009

(54) LAMINATED THERMOPLASTIC RESIN FILM AND LAMINATED THERMOPLASTIC RESIN FILM ROLL

(75) Inventors: Naoki Mizuno, Otsu (JP); Shigenori Iwade, Otsu (JP); Hideki Sugihara, Otsu (JP); Chikao Morishige, Otsu (JP); Yasuhiro Nishino, Osaka (JP); Katsuhiko Nose, Osaka (JP); Toshitake Suzuki, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 105 days.

(21) Appl. No.: 11/791,767
(22) PCT Filed: Nov. 28, 2005
(86) PCT No.: PCT/JP2005/021770

§ 371 (c)(1),
(2), (4) Date: May 29, 2007

(87) PCT Pub. No.: WO2006/057382

PCT Pub. Date: Jun. 1, 2006

(65) Prior Publication Data

US 2008/0131704 A1 Jun. 5, 2008

(30) Foreign Application Priority Data

Nov. 29, 2004 (JP) ............................. 2004-343223
Jul. 28, 2005 (JP) ............................. 2005-219694
Jul. 29, 2005 (JP) ............................. 2005-221426

(51) Int. Cl.
*B32B 5/00* (2006.01)
*B32B 27/08* (2006.01)
*B32B 27/20* (2006.01)
*B32B 27/36* (2006.01)
*B32B 27/40* (2006.01)

(52) U.S. Cl. ................. 428/423.5; 428/195.1; 428/323; 428/423.1; 428/423.7; 428/424.2; 428/424.4; 428/474.4; 428/475.2; 428/480; 428/483; 525/123; 525/437; 525/440

(58) Field of Classification Search ...................... None
See application file for complete search history.

(56) References Cited

U.S. PATENT DOCUMENTS 4,900,625 A * 2/1990 Kondo et al. ................. 428/383

(Continued)

FOREIGN PATENT DOCUMENTS

JP 64-006025 1/1989

(Continued)

OTHER PUBLICATIONS

Notice of Reasons for Refusal for JP2005-341840 dated Sep. 5, 2006.

(Continued)

*Primary Examiner*—Vivian Chen
(74) *Attorney, Agent, or Firm*—Kenyon & Kenyon LLP

(57) ABSTRACT

The present invention provides a laminated thermoplastic resin film which is excellent in adhesion and blocking resistance. A laminated thermoplastic resin film has a covering layer containing a copolymerized polyester resin and a polyurethane resin on one side or both sides of a thermoplastic resin film, characterized in that the covering layer has a microphase-separated or nanophase-separated structure in polyester (PE) phase A comprising a copolymerized polyester resin as a main component and polyurethane (PU) phase B comprising a polyurethane resin as a main component, and when the covering layer is observed by a scanning probe microscopy in phase measurement mode, an area ration (surface fraction of PEs) of polyester phase A (which indicates a dark phase in phase image) of the surface of the covering layer defined by following the formula (1) is 35% or more and less than 90% per 20 a measurement area of 5 μm×5 μm.

Surface fraction of PEs (%)=(area of PEs phase A/measurement area)×100. (1)

19 Claims, 13 Drawing Sheets

U.S. PATENT DOCUMENTS

| | | | |
|---|---|---|---|
| 4,959,437 A | | 9/1990 | Kunimune et al. |
| 5,153,261 A | * | 10/1992 | Brooks .................. 525/28 |
| 5,539,054 A | * | 7/1996 | LaFleur .................. 525/125 |

FOREIGN PATENT DOCUMENTS

| | | | |
|---|---|---|---|
| JP | 05-154970 A | | 6/1993 |
| JP | 06-340049 | | 12/1994 |
| JP | 08-134428 | * | 5/1996 |
| JP | 08-134428 A | | 5/1996 |
| JP | 10-107093 A | | 4/1998 |
| JP | 11323271 | | 11/1999 |
| JP | 2000-229355 A | | 8/2000 |
| JP | 2000-246855 | | 9/2000 |
| JP | 2000-323271 | | 11/2000 |
| JP | 2004-010669 | | 1/2004 |
| JP | 2004-299101 | | 10/2004 |
| JP | 2004-356368 A | | 12/2004 |
| WO | WO 2005/097933 | * | 10/2005 |

OTHER PUBLICATIONS

Explanation of Circumstance Regarding an Accelerated Examination filed in corresponding Japanese patent application No. JP2005-341840 on Jul. 14, 2006.

* cited by examiner

[Fig.1]
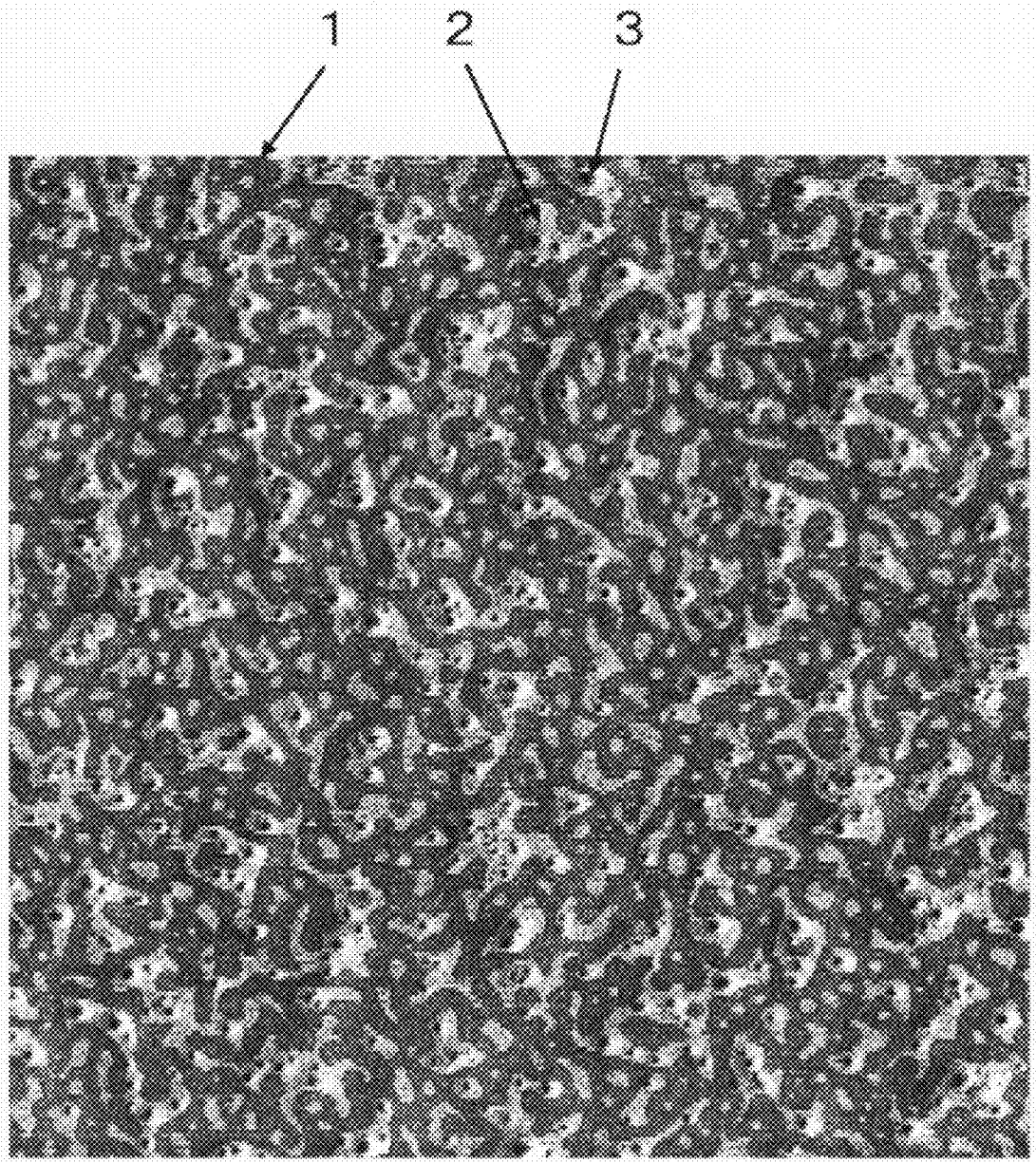

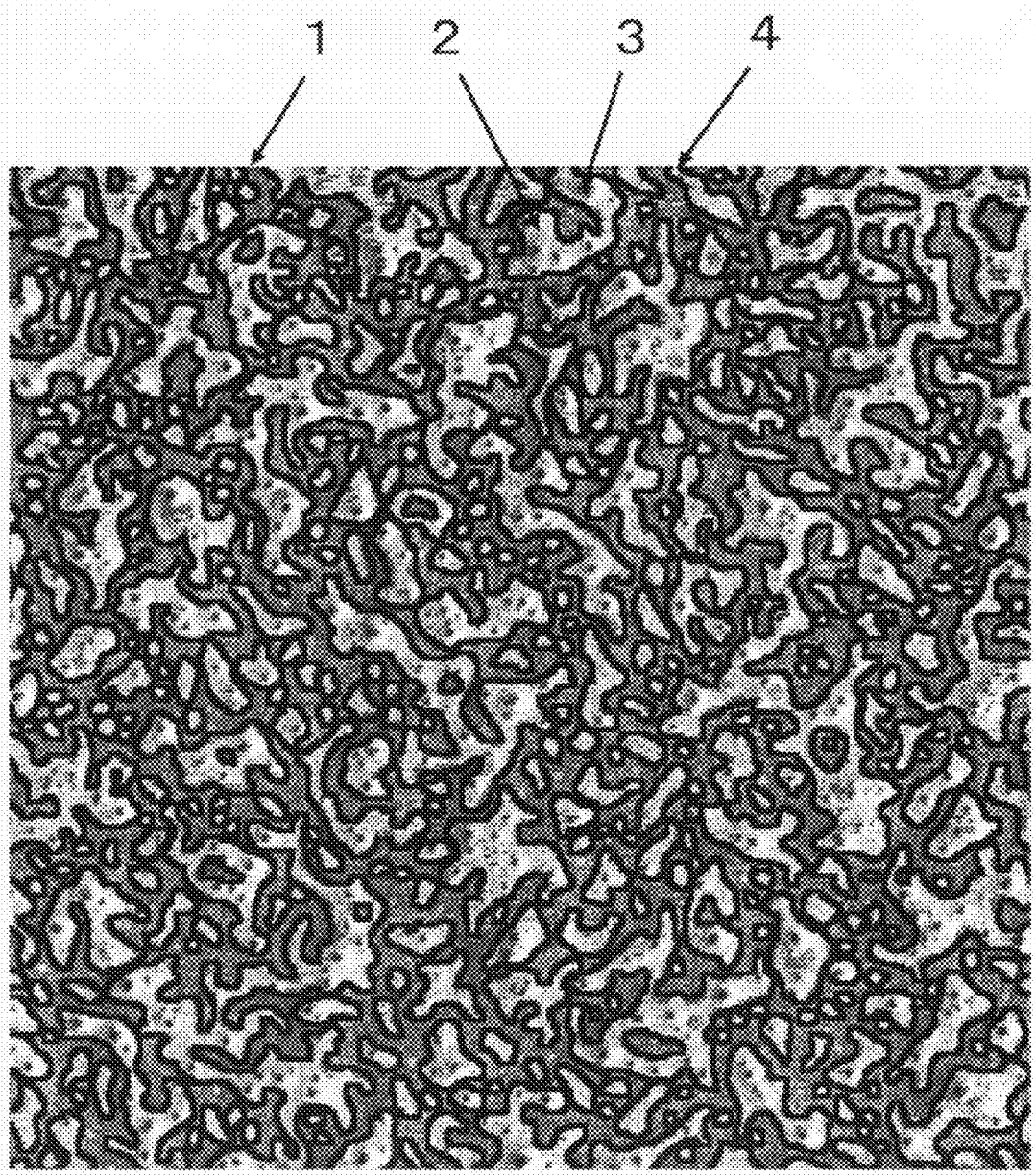
[Fig.2]

[Fig.3]
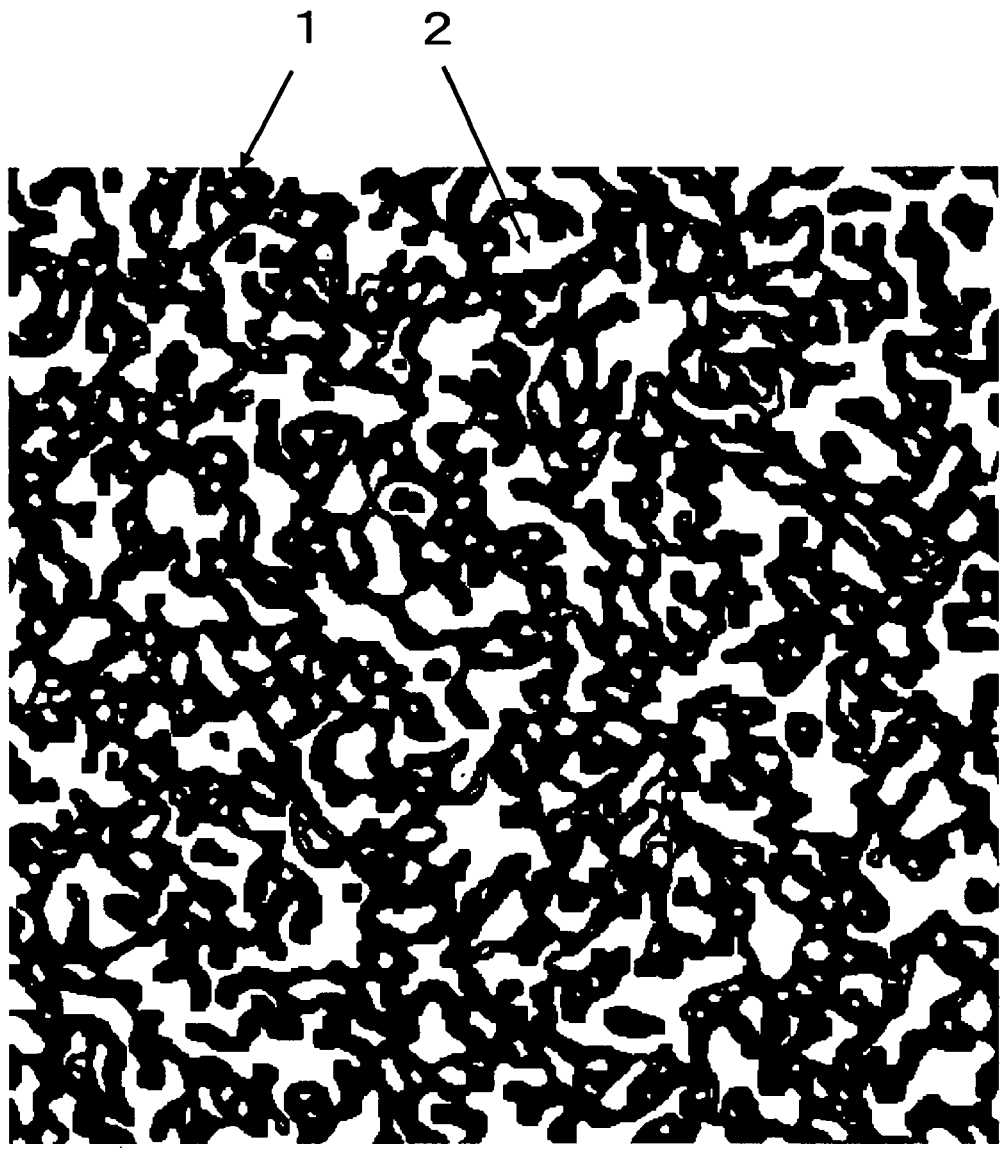

[Fig.4]
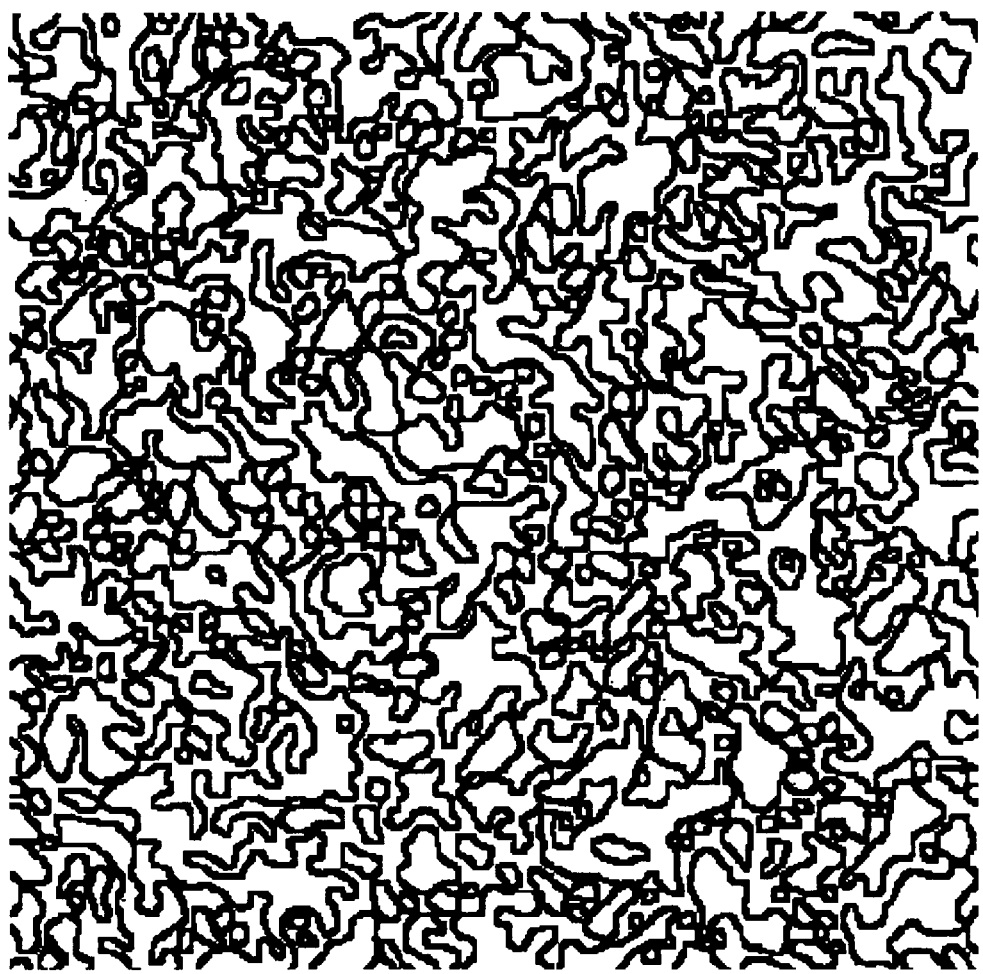

[Fig.5]
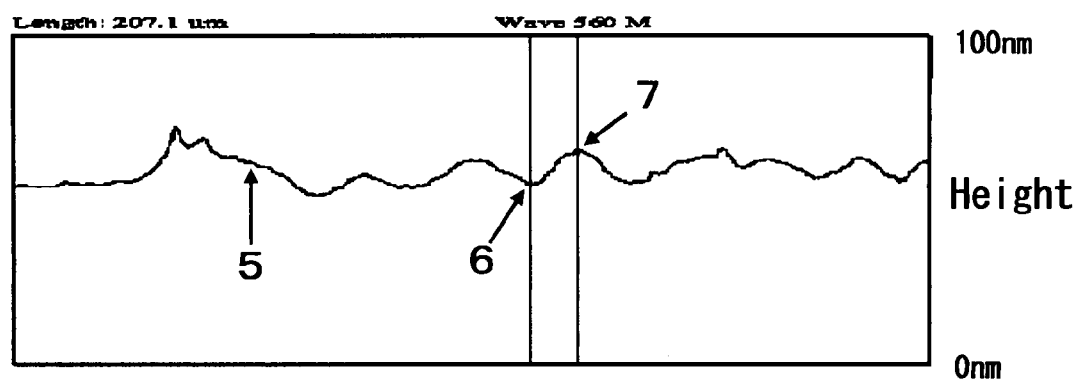

[Fig.6]
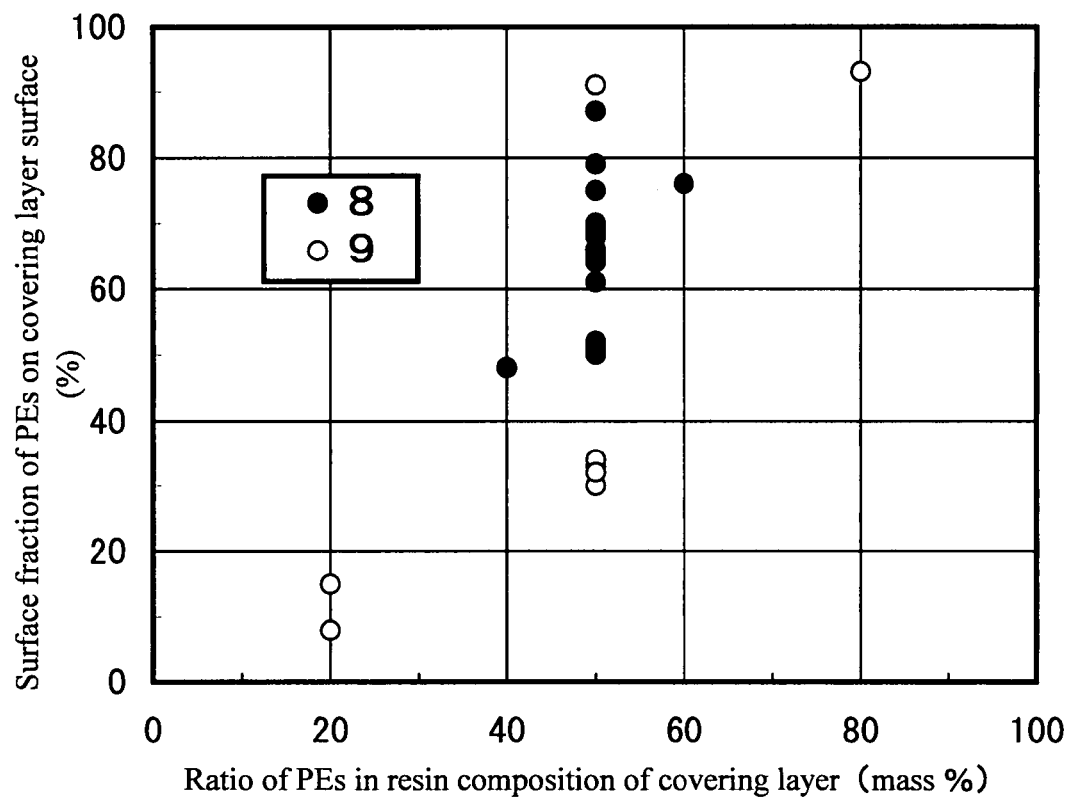

[Fig.7]
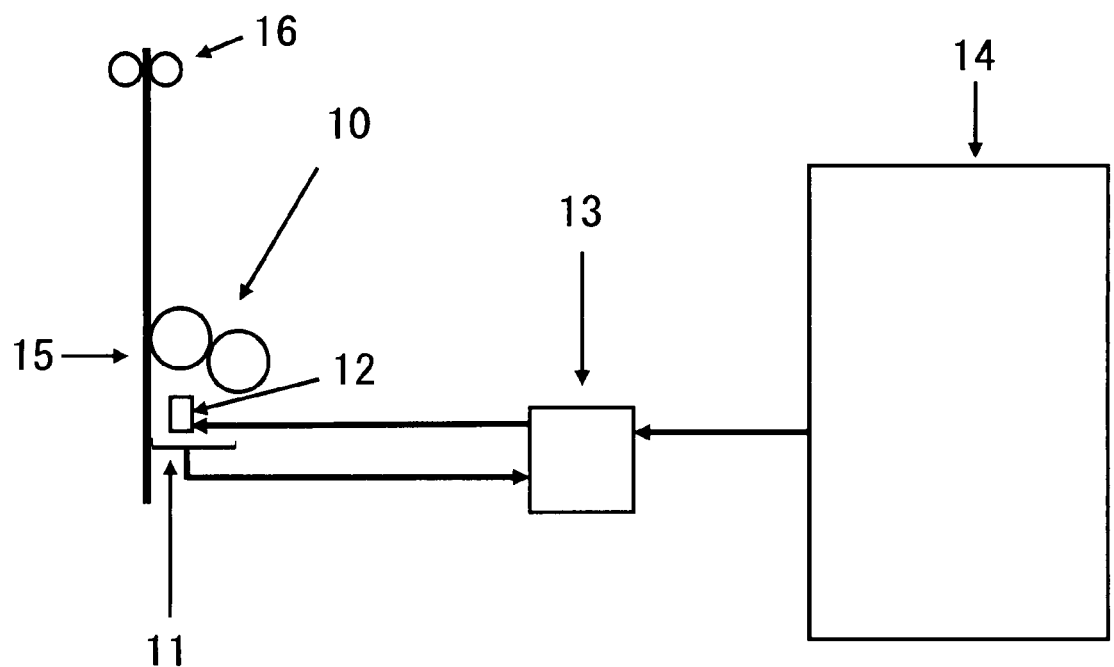

[Fig.8]
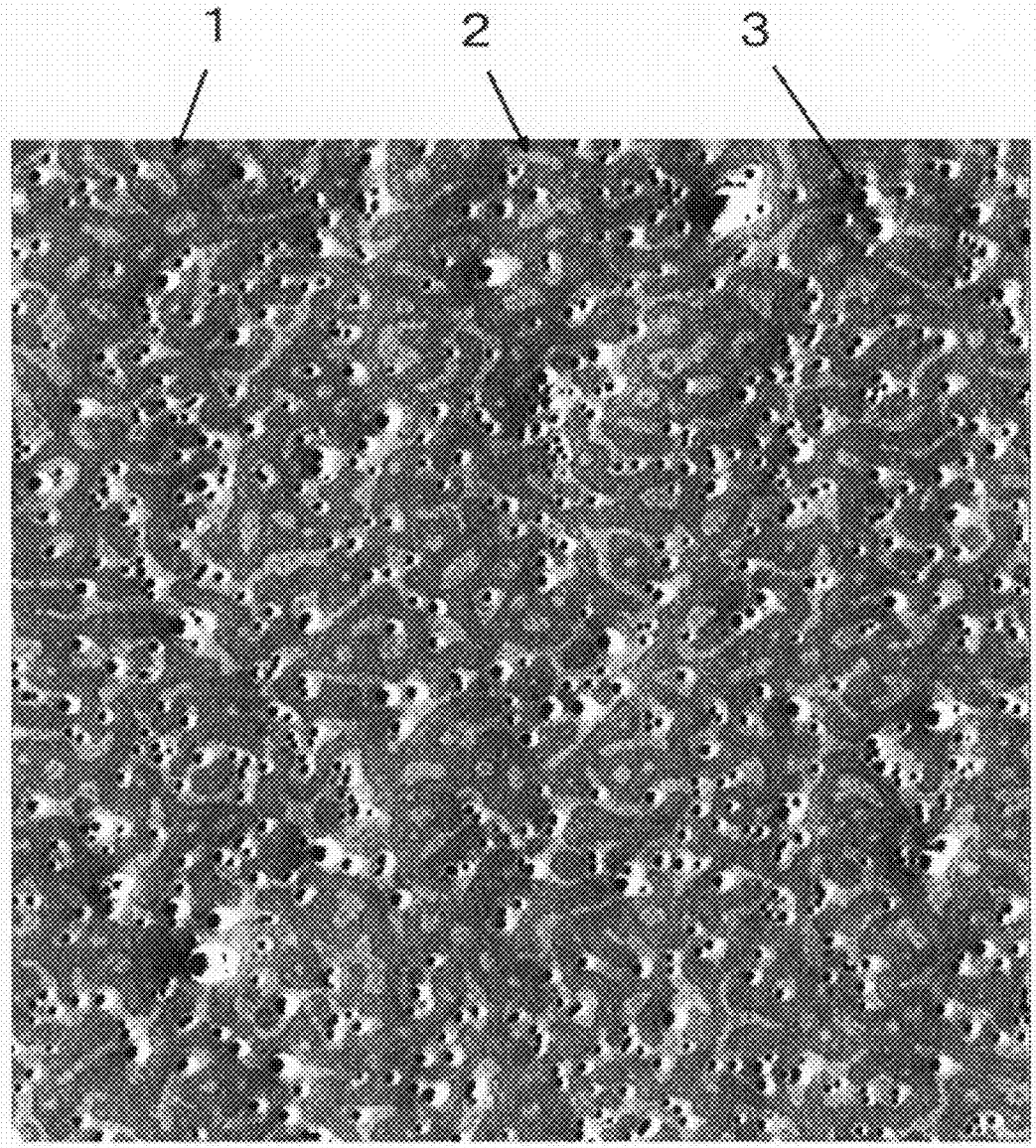

[Fig.9]
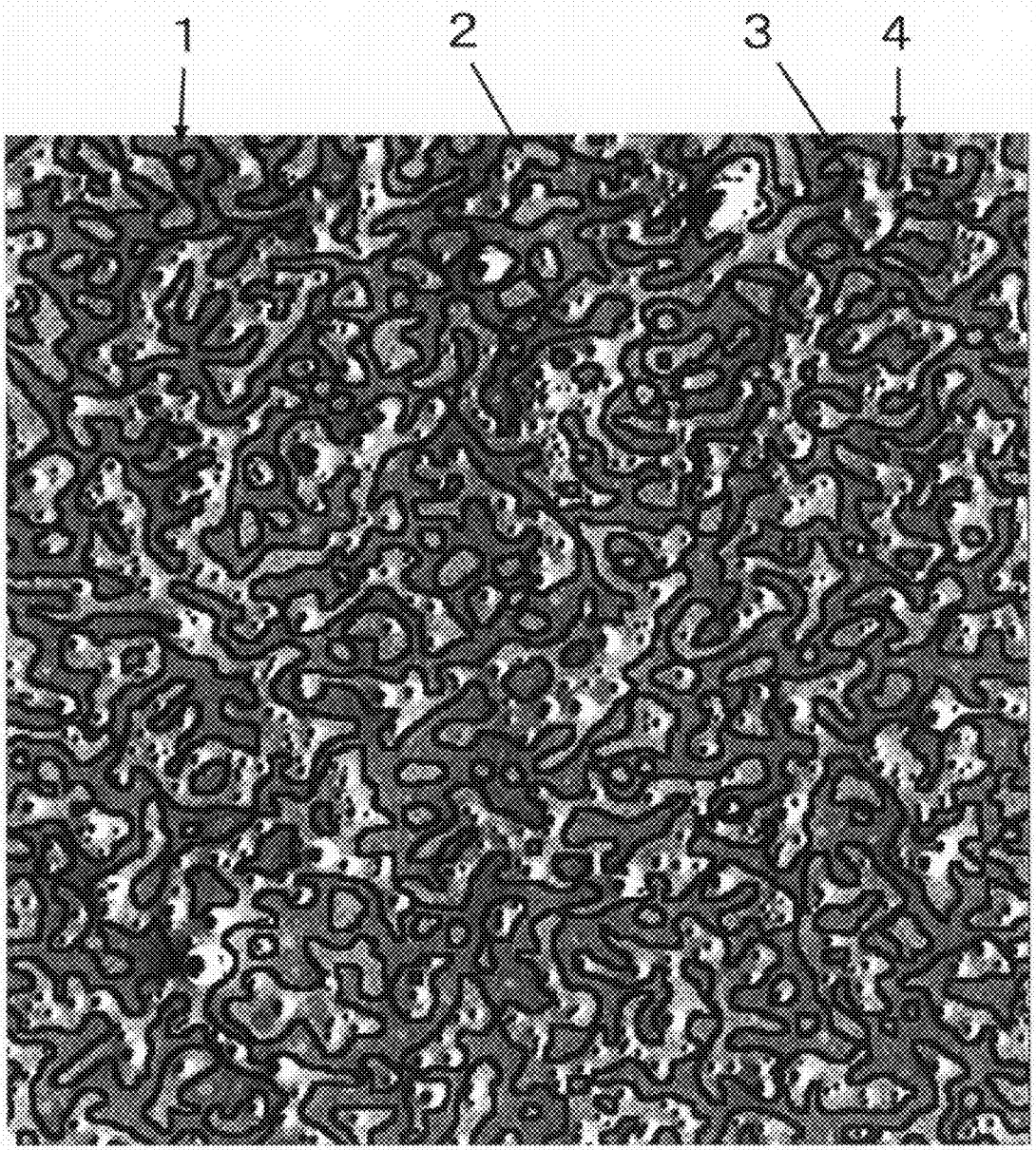

[Fig.10]
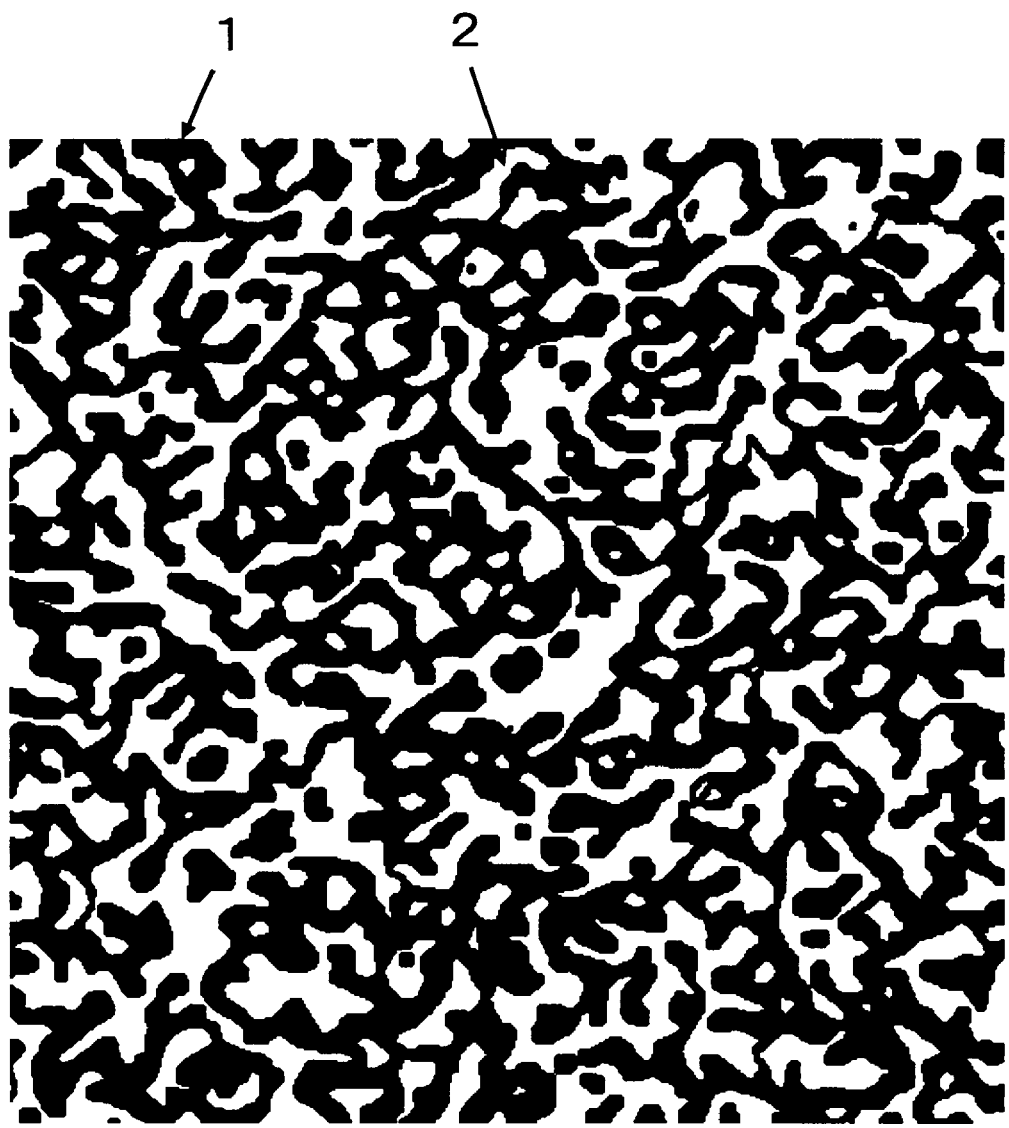

[Fig.11]
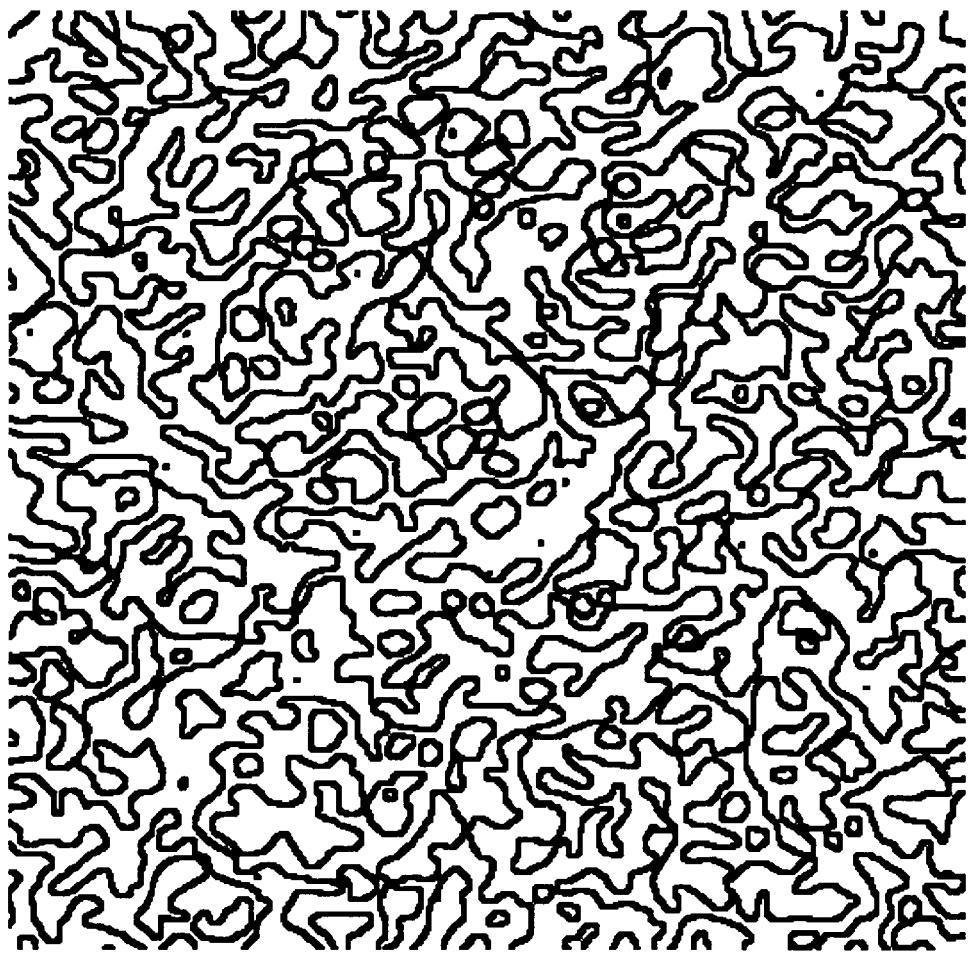

[Fig.12]
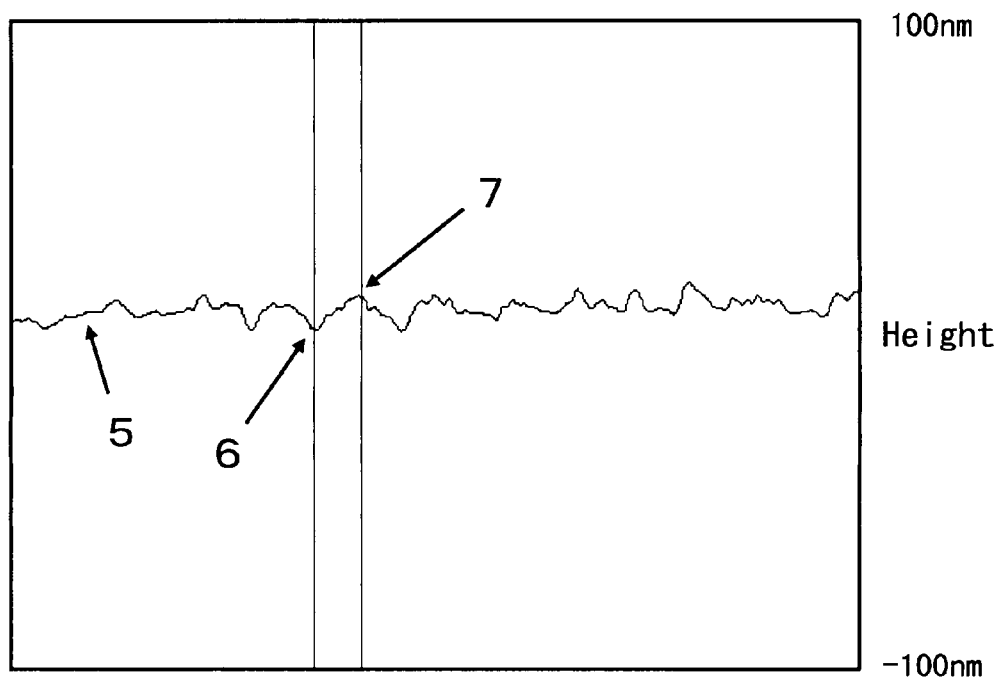

[Fig.13]
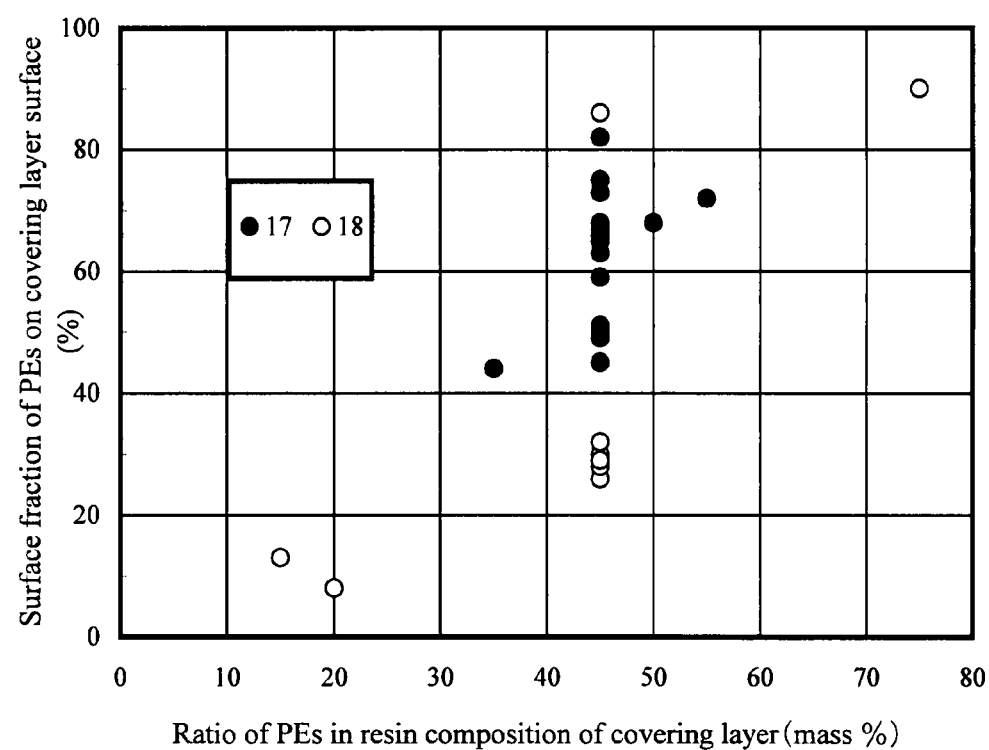

LAMINATED THERMOPLASTIC RESIN FILM AND LAMINATED THERMOPLASTIC RESIN FILM ROLL

This is a 371 national phase application of PCT/JP2005/021770 filed 28 Nov. 2005, claiming priority to Japanese Patent Applications No. 2004-343223 filed 29 Nov. 2004, No. 2005-219694 filed 28 Jul. 2005, and No. 2005-221426 filed 29 Jul. 2005, respectively, the contents of which are incorporated herein by reference.

FIELD OF THE INVENTION

The present invention relates to a laminated thermoplastic resin film formed with a covering layer having a unique phase separation structure and a laminated thermoplastic resin film roll formed by winding the laminated thermoplastic resin film mainly used for a display-related purpose which is excellent in adhesion to various functional layers (such as a hard coat layer, an optical diffusion layer, a prism layer, an infrared absorbing layer, a transparent conductive layer, and an anti-glare layer) of an antireflection film, an optical diffusion sheet, a prism sheet, an infrared absorbing film, a transparent conductive film, and an anti-glare film, and also excellent in blocking resistance and transparency, which is used for a base material of an optical functional film or an optical functional sheet.

BACKGROUND OF THE INVENTION

In general, transparent films comprising polyethylene terephthalate (PET), acryl, polycarbonate (PC), cellulose triacetate (TAC), polyolefin and the like are used as base materials of optical functional films used for components of displays such as Liquid Crystal Display (LCD) and Plasma Display Panel (PDP). When these base films are used for various optical functional films, a functional layer suitable for each purpose is laminated on each of the base films. For example, with regard to Liquid Crystal Display (LCD), there can be listed functional layers such as a protection film (hard coat layer) for preventing scratches on the surface, an antireflection layer (AR layer) for preventing reflection of outside light, a prism layer used for collection and diffusion of light, a light diffusion layer for improving brightness. Among these base materials, the biaxially oriented polyester films are widely used as a base material for various optical functional films due to transparency, dimensional stability and chemical resistance thereof.

In general, in a case of a biaxially oriented thermoplastic film such as a biaxially oriented polyester film and a biaxially oriented polyamide film, the film surface has a highly crystalline orientation, so that there is a defect that it lacks adhesion to various paints, adhesives, inks and the like. For this reason, there have been proposed various methods for providing an easy adhesion to a biaxially oriented thermoplastic resin film surface.

Further, a film devoid of a polar group, such as polyolefin film, is extremely poor in adhesion to various paints, adhesives, inks and the like, so that there has been proposed various methods for providing easy adhesion to a film surface after performing a preliminary physical or chemical treatment such as corona discharge treatment and flame treatment.

For example, a method of providing easy adhesion to a base film by providing a covering layer containing various resins such as a polyester, an acrylic, a polyurethane and acrylic graft polyester resin as main constituting components on a surface of a thermoplastic resin film which is a base material by using one of coating methods is generally known. Among the coating methods, industrially and widely performed methods include a method wherein corona discharge treatment is carried out on a thermoplastic resin film prior to completion of crystalline orientation directly or when necessary and then an aqueous coating liquid containing a dispersion in which the resin solution or the resin is dispersed with a dispersion medium is coated on a base material film, and after drying, the film is stretched at least in a uniaxial direction followed by being subjected to heat treatment to complete crystalline orientation of the thermoplastic resin film (so called inline coating method), and a method wherein a water-type or solvent-type coating liquid is coated on a thermoplastic resin film after production of the film followed by drying (so called offline coating method).

Year after year, displays such as LCD and PDP are getting larger and costs thereof are getting lower. In a step for producing an optical functional film or a optical functional sheet used as the material thereof, production speed has been increased. Accompanying such speeding up of production processes, stress resulting from hardening and contraction is more apt to occur at an interface between functional layers such as hard coat layer, a diffusion layer, and a prism layer and a base film. Therefore, there has arisen a problem that when cutting an optical functional film or an optical functional sheet in a specific size in order to produce a display, an end thereof is particularly easy to peel off if adhesion at the interface is insufficient. With respect to this tendency, as a size of a film wound into a roll and a production speed in production processes increase, effects of delamination (peeling) of an interface with an impact of cutting become conspicuous, so that a conventional level of adhesion is no longer sufficient.

Further, a processing agent to be used for forming the functional layer such as the prism layer and diffusion layer are often directly coated on a base material film without being diluted with an organic solvent from a viewpoint of reducing burdens on environment. Therefore, since an improvement effect of the organic solvent on wettability of the covering layer sometimes cannot be obtained sufficiently, a higher adhesion is required. On the other hand, in a usage which places importance on smoothness such as hard coating, in order to reduce viscosity of the processing agent to obtain a good leveling effect, the processing agent is often diluted with an organic solvent. In such a case, the covering layer of the laminated thermoplastic resin film is required to have an appropriate solvent resistance.

In order to enhance adhesion between a functional layer and a base film, a method using a resin having low glass transition temperature for a resin constituting a covering layer is generally employed. However, when using a resin having a low glass transition temperature, the blocking resistance tends to be lowered when winding the film sequentially into a roll and winding off the film from the film roll.

In recent years, processing machines for laminating functional layers such as a hard coat layer and a diffusion layer on a base film are getting larger in order to reduce costs, and diameters of easy adhesion film rolls used as base films are getting larger. Accompanying this, when winding the film by high tension in order to prevent roll misalignment, blocking will be more apt to occur particularly at an wound core of the roll since it is pressure-bonded by high pressure.

In order to improve blocking resistance, a method providing concavity and convexity on a film surface to reduce the contact area is generally employed. In order to provide concavity and convexity on the film surface, a method increasing a content of inorganic particles or organic particles to be contained in the covering layer or the base material film, or using particles having a large particle size is commonly used. However, a refractive index of generally available particles is different from a refractive index of a resin used for the covering layer, and with a step for stretching, a void is formed around the particles, so that lowering of light transmission of the film, increase in haze and the like occur in these methods. In particular, transparency which is required in a base material film of an optical functional film or an optical functional sheet is lowered. Namely, the new problems accompanying an increase in speed of the processes and in the diameter of the film roll made it extremely difficult to improve, by a conventional method, adhesion to and blocking resistance against the functional layers while maintaining transparency.

On the other hand, a use of information terminals outdoors, such as cellular telephones, PDAs and mobile type computers, is becoming more frequent. Further, materials used in a car which becomes high in temperature in summer, such as a touch panel used for car navigation and the like, are increasing. Therefore, a film which is small in fluctuation of qualities in such a severe environment at high temperature and humid, i.e., a film which is excellent in humidity- and heat-resistant adhesion is demanded for such a usage.

In particular, a biaxially oriented polyester film is known for having poor adhesion to a coating agent comprising an acrylic resin as a main component used for a prism lens, hard coating and the like. For this reason, various polyester films formed with a covering layer comprising a polyurethane resin and the like on a surface thereof have been proposed (e.g. refer to Patent Document 1: Japanese unexamined patent publication No. H6-340049). However, in a film formed with a covering layer comprising a polyurethane resin, even though adhesive strength to a functional layer such as hard coat layer is improved, adhesive strength to a polyester film which is a base material is not sufficient, resulting in a problem of insufficient adhesion at an interface between the covering layer and the functional layer. Additionally, the resin constituting the covering layer is low in degree of cross-linking and poor in humidity- and heat-resistant adhesion, so the demand of the market sometimes could not be satisfied sufficiently in a usage which strongly requires humidity- and heat-resistant adhesion.

Further, there have been proposed methods of improving adhesion between a base polyester film and a functional layer such as an ink by inline coating method wherein a resin composition layer comprising a polyester resin and a polyurethane resin as a main constituting component is provided on the base polyester film comprising biaxially oriented polyethylene terephthalate (e.g., refer to Patent Document 2: Examined patent publication No. 64-6025). More specifically, after a water dispersible coating liquid containing a copolymerized polyester resin and a polyurethane resin (=20/80; % by mass) was coated on a polyester film uniaxially-stretched in a longitudinal direction, the polyester film was introduced to a tenter and was subjected to drying, transversal stretching, and heat fixation at 220° C. to obtain an easy adhesion biaxially oriented polyester film.

However, even though adhesion was improved in the method described in Patent Document 2, the method could not simultaneously satisfy adhesion to a hard coat layer, a diffusion layer and a functional layer, blocking resistance, and transparency of base film demanded in recent years as a base film used for an optical functional film or an optical functional sheet. Additionally, due to a low degree of cross-linking of a resin constituting the covering layer, and poor humidity- and heat-resistant adhesion, it sometimes could not satisfy the demand of the market sufficiently in a usage wherein humidity- and heat-resistant adhesion was strongly required.

The present applicant proposed a laminated polyester film provided with a resin composition layer on a base film comprising biaxially oriented polyethylene terephthalate containing a polyester resin, a polyurethane resin, and inorganic particles having an appropriate particle size added thereto and which can sufficiently satisfy adhesion at a level required by the market and has fewer optical defects while maintaining transparency that is an extremely important characteristic as an optical base film (e.g. refer to Patent Document 3: Japanese unexamined patent publication No. 2000-323271, Patent Document 4: Japanese unexamined patent publication No. 2000-246855). Specifically, it discloses an easy-adhesion biaxially oriented polyester film obtained by coating a water dispersible coating liquid containing a copolymerized polyester resin, a polyurethane resin (=20/80; % by mass), two kinds of silica particles having different average particle sizes and an anionic surfactant on a polyester film uniaxially-stretched in a longitudinal direction, followed by introducing the polyester film into a tenter for subjecting it to drying, transversal stretching and heat fixation at 240° C.

The easy adhesion biaxially oriented polyester films obtained in Patent Documents 3 and 4 had excellent adhesion, blocking resistance and transparency, and optical defects thereof such as foreign matter and scratches were considerably improved, satisfying properties heretofore required. However, as described above, with reduction of costs and increasing sizes of displays in recent years, the request levels of adhesion between a base film and a functional layer such as a hard coat layer, a diffusion layer, and a prism layer as well as of blocking resistance required as a base film for an optical functional film or an optical functional sheet tend to be getting higher year by year; therefore, they can no longer satisfy the qualities demanded by the market today. Additionally, due to a low degree of cross-linking of a resin constituting the covering layer and poor humidity- and heat-resistant adhesion, the demand of the market sometimes could not be satisfied sufficiently in a usage wherein humidity- and heat-resistant adhesion is strongly required.

Additionally, the present applicant proposed an invention regarding an easy adhesion film roll with reduced fluctuation of an amount of coating in order to improve uniformity of adhesion (e.g. refer to Patent Document 5: Japanese unexamined patent publication No. 2004-10669). In Examples of Patent Document 5, there is described an easy adhesion biaxially oriented polyester film obtained by coating a water dispersible coating liquid containing a polyester resin, a polyurethane resin (=50/50; % by mass), silica particles having an average particle size of 1.4 μm and a fluorinated surfactant on a polyester film uniaxially-stretched in a longitudinal direction, followed by subjecting the polyester film to drying at 120° C. in a drying furnace, transversal stretching and subsequently treating by heat fixation at 220° C. The resultant film roll, had an excellent adhesion uniformly in an entire film roll, sufficiently satisfying the level required by the market. However, as described above, it can no longer satisfy the blocking resistance required in recent years sufficiently. Further, due to a low degree of cross-linking of a resin constituting covering layer and poor humidity- and heat-resistant adhesion, the demand of the market sometimes could not be satisfied sufficiently in a usage wherein humidity- and heat-resistant adhesion is strongly required.

Moreover, there is disclosed a biaxially stretched film obtained by coating a coating liquid containing 100 parts by mass of a polyester comprising telephthalic acid/isophthalic acid/trimellitic acid/sebacic acid as acid components and ethylene glycol/neopentyl glycol/1,4-butanediol as glycol components, 15 parts by mass of a methylol-type melamine cross-linker, and 0.7 part by mass of particles on a polyethylene terephthalate film uniaxially-stretched in a longitudinal direction, and further by subjecting it to transversal stretching, heat fixation, and relaxation treatment (e.g., refer to Patent Document 6: Japanese unexamined patent publication No. 2004-299101). However, even though this method provided an improved humidity- and heat-resistant adhesion, it was poor in initial adhesive strength to a functional layer such as a hard coat layer and could not satisfy sufficiently the quality required for an optical film in recent years.

Namely, conventional art is becoming no longer satisfactory enough in terms of adhesion for resisting high speed cutting which is demanded in recent years and in terms of blocking resistance for responding to the increasing size of a film roll while maintaining high transparency. Further, it was not satisfactory enough with respect to humidity- and heat-resistant adhesion which means less decrease in adhesion even in a harsh environment of high temperature and humid.

DISCLOSURE OF THE INVENTION

[Problems to be Solved by the Invention]

A first object of the present invention is to provide a laminated thermoplastic resin film which is highly excellent in adhesion and blocking resistance in order to solve the-above mentioned conventional problems. A second object of the present invention is to provide a laminated thermoplastic resin film which is highly excellent in humidity- and heat-resistant adhesion in addition to adhesion and blocking resistance. A third object of the present invention is to provide a laminated thermoplastic resin film which is highly excellent in transparency in addition to adhesion and blocking resistance. A fourth object of the present invention is to provide a laminated thermoplastic resin film roll which is highly excellent in adhesion, blocking resistance, humidity- and heat-resistant adhesion and is small in fluctuation (variation) of these qualities.

Means for Solving the Problems

The aforementioned objects can be achieved by the following measures.

Namely, a first aspect of the present invention in the laminated thermoplastic resin film of the present invention is a laminated thermoplastic resin film comprises a covering layer containing a copolymerized polyester resin and a polyurethane resin in one side or both sides of a thermoplastic resin film, wherein the covering layer having a microphase-separated or nanophase-separated structure in polyester phase A comprising a copolymerized polyester resin as a main component or polyurethane phase B comprising a polyurethane resin as a main component, and when the covering layer is observed by a scanning probe microscopy in phase measurement mode, area ratio (surface fraction of PEs) of polyester phase A (which indicates a dark phase in a phase image) of the surface of the covering layer defined in following formula (1) is 35% or more and less than 90% per measurement area of 5 µm×5 µm:

surface fraction of PEs(%)=(area of polyester phase A/measurement area)×100     (1)

A second aspect of the present invention is the laminated thermoplastic resin film according to the first aspect of the present invention, wherein the copolymerized polyester resin is crosslinked with at least one cross-linker selected from an epoxy cross-linker, a melamine cross-linker, and an oxazoline cross-linker.

A third aspect of the present invention is the laminated thermoplastic resin film according to the first aspect of the present invention, containing particles in the thermoplastic resin film or both the thermoplastic resin film and the covering layer.

A fourth aspect of the present invention is the laminated thermoplastic resin film according to the first aspect of the present invention, not essentially containing the particles in the thermoplastic resin film, but containing the particles in the covering layer alone.

A fifth aspect of the present invention is the laminated thermoplastic resin film according to the third or the fourth aspect of the present invention, wherein the particles are silica particles.

A sixth aspect of the present invention is the laminated thermoplastic resin film according to the third or fourth aspect of the present invention, wherein the particles in the covering layer are unevenly distributed either in polyester phase A or polyurethane phase B.

A seventh invention is the laminated thermoplastic resin film according to the first aspect of the present invention, wherein the thermoplastic resin film is a biaxially oriented polyester film or a biaxially oriented polyamide film.

An eighth aspect of the present invention is the laminated thermoplastic resin film according to the first aspect of the present invention, wherein a lower limit of the surface fraction of PEs is 40%. A ninth aspect of the present invention is the laminated thermoplastic resin film according to the first aspect of the present invention, wherein a lower limit of the surface fraction of PEs is 45%.

A tenth aspect of the present invention is the laminated thermoplastic resin film according to the first aspect of the present invention, wherein an upper limit of the surface fraction of PEs is 80%. An eleventh aspect of the present invention is the laminated thermoplastic resin film according to the first aspect of the present invention, wherein an upper limit of the surface fraction of PEs is 75%.

A twelfth aspect of the present invention is the laminated thermoplastic resin film according to the first aspect of the present invention, wherein, in a phase image obtained by observing a surface of the covering layer by the scanning probe microscopy in phase measurement mode in which a contour of an interface between the light phase and the dark phase is emphasized, a fractal dimension obtained from a boundary between the light phase and the dark phase (contour of the interface) using box-counting method is from 1.60 to 1.95 per measurement area of 5 µm×5 µm.

A thirteenth aspect of the present invention is the laminated thermoplastic resin film according to the first aspect of the present invention, wherein a hardness index of the covering layer as defined in a following description is from 3.0 to 15.0 nm.

Herein, the hardness index of the covering layer means an average value of measured values obtained when measuring, by a non-contact system for three-dimensional surface shape measurement, concavo-convex shapes of scratches on the surface of the covering layer made with a needle having a sapphire with a radius of 75 µm at a tip thereof by applying a load of 5 gf; the values were obtained by measuring difference of elevation between neighboring convex and concave portions at fifty different points.

A fourteenth aspect of the present invention is the laminated thermoplastic resin film according to the third or fourth aspect of the present invention, wherein a haze of the laminated thermoplastic resin film is 1.5% or less.

A fifteenth aspect of the present invention is the laminated thermoplastic resin film according to the fourteenth aspect of the present invention, wherein the laminated thermoplastic film is used as a base film of an optical functional film or an optical functional sheet.

A sixteenth aspect of the present invention is the laminated thermoplastic resin film according to the fifth aspect of the present invention, wherein the optical functional film or the optical functional sheet is anyone of a hard coating film, an antireflection film, an optical diffusion sheet, a prism sheet, a transparent conductive film, a near infrared absorbing film, and an electromagnetic wave absorbing film.

A seventeenth aspect of the present invention is the laminated thermoplastic resin film according to the first aspect of the present invention, wherein a functional layer comprising an acrylic resin as a main constituting component is laminated on at least one side of the covering layer.

An eighteenth aspect of the present invention is a laminated thermoplastic resin film roll formed by winding the thermoplastic resin film according to any one of the first to seventeenth aspects of the present invention comprising a covering layer containing a copolymerized polyester resin and a polyurethane resin on one side or both sides of a thermoplastic resin film sequentially into a roll with a size of 1000 m or more in length and 50 mm or more in width, wherein when an area ratio (surface fraction of PEs) of polyester phase A (which indicates a dark phase in phase image) on the surface of the covering layer was measured along a longitudinal direction of the film at intervals of 100 m, a difference between a maximum value and a minimum value of the surface fraction of PEs on the surface of the covering layer in a longitudinal direction is 15% or less.

Herein, with regard to the measurement of the surface fraction of PEs on the surface of the covering layer, when the laminated thermoplastic resin film roll is wound off and, with respect to a longitudinal direction (MD: machine direction) thereof, one end of a constant region where the film properties are stable is to be a first end and the other end is to be a second end, a first measurement is carried out within 2 m from the first end, and a final measurement is carried out within 2 m from of the second end, and measurements are also carried out at every 100 m from the point of the first measurement.

A nineteenth aspect of the present invention is the laminated thermoplastic resin film roll according to the eighteenth aspect of the present invention, wherein a difference between a maximum value and a minimum value of the surface fraction of PEs on the surface of the covering layer in width direction is 10% or less when the laminated thermoplastic resin film roll is wound off, and the film is divided equally into four in width direction to measure an area ratio (surface fraction of PEs) of polyester phase A (which indicates a dark phase in phase image) at a center of each.

EFFECT OF THE INVENTION

The laminated thermoplastic resin film of the present invention comprises two kinds of resins constituting the covering layer i.e. a copolymerized polyester resin and a polyurethane resin having a specific microphase-separated structure or a nanophase-separated structure in polyester phase A comprising a copolymerized polyester resin as a main component and polyurethane phase B comprising a polyurethane resin as a main component. It is excellent in adhesion to and blocking resistance against functional layers such as a hard coat layer, a diffusion layer and a prism layer since an area ratio of the polyester phase A on the surface of the covering layer (surface fraction of PEs) is within a specific range.

Further, in the covering layer, humidity- and heat-resistant adhesion is improved by crosslinking at least the copolymerized polyester resin with at least one cross-linker selected from an epoxy cross-linker, a melamine cross-linker, and an oxazoline cross-linker.

Further, blocking resistance, handleability, and scratch resistance are improved by including particles having a specific diameter only in the covering layer, or distributing the particles unevenly either in polyester phase A or polyurethane phase B of the surface of the covering layer, while transparency is maintained at a high level; thus, it is useful as a base film for an optical functional film or an optical functional sheet which is required to have transparency at a high level. In particular, when the silica particles are included in the covering layer, the silica particles are unevenly distributed in the polyurethane phase, so that the defect of polyurethane which is poor in blocking resistance is covered.

BRIEF DESCRIPTION OF THE DRAWINGS

FIG. 1 is an illustration diagram of a phase image obtained when a surface of a covering layer of a laminated thermoplastic resin film of the present invention was observed by a scanning probe microscopy in phase measurement mode.

FIG. 2 is an illustration diagram of the phase image in FIG. 1, wherein a contour of an interface between a light phase and a dark phase is emphasized by an image processing software program.

FIG. 3 is an illustration diagram of the phase image of FIG. 2 emphasizing a contour of the interface between light phase and dark phase, wherein the dark phase is filled by the image processing software program.

FIG. 4 is an illustration diagram of the phase image of FIG. 2 emphasizing the contour of the interface between the light phase and the dark phase, indicating a boundary between the light phase and the dark phase.

FIG. 5 is an illustration diagram showing surface profile of scratches made on the surface of the covering layer obtained when the surface shapes of the scratches were measured using a non-contact system for three-dimensional surface shape measurement in wave mode.

FIG. 6 is an illustration diagram showing that, in Examples 1-20 and Comparative Examples 1, 4 to 6, and 8 to 13, the surface fraction of PEs on the surface of the covering layer and PEs mass ratio of resin component of covering layer do not correspond to each other.

FIG. 7 is an illustration diagram showing placement of a coating liquid tray, a circulation tank, and a preparation tank, and a circulating path of the coating liquid.

FIG. 8 is an illustration diagram of a phase image wherein the surface of the covering layer of the laminated thermoplastic resin film of the present invention in another embodiment is observed by a scanning probe microscopy in phase measurement mode.

FIG. 9 is an illustration diagram of a phase image of FIG. 8, wherein the contour of the interface between the light phase and the dark phase is emphasized by an image processing software program.

FIG. 10 is an illustration diagram of the phase image of FIG. 9 emphasizing the contour of the interface between the light phase and the dark phase, wherein the phase image is filled by the image processing software.

FIG. 11 is an illustration diagram of the phase image of FIG. 9 which emphasizes the contour of the interface between the light phase and the dark phase, indicating a boundary between the light phase and the dark phase.

FIG. 12 is an illustration diagram showing a surface profile of a scratch different from that of FIG. 5 made on the surface of the covering layer obtained when measuring the surface shape of the scratch using a non-contact system for three-dimensional surface shape measurement in wave mode.

FIG. 13 is an illustration diagram showing that, in Examples 21 to 43 and Comparative Examples 14, 17 to 19 and 21 to 26, the surface fraction of PEs on the surface of the covering layer and PEs mass ratio of resin component of the covering layer do not correspond to each other.

DESCRIPTION OF THE NUMERALS

1: Dark phase (polyester phase A comprising a copolymerized polyester resin as a main component)
2: Light phase (polyurethane phase B comprising a polyurethane resin as a main component)
3: Projection derived from Particles
4: Line stressing the contour of the interface between the light phase and the dark phase.
5: Profile curve of concavity and convexity on the surface of the covering layer.
6: Valley of scratch
7: Top of scratch
8: Examples 1 to 20
9: Comparative Examples 1, 4 to 6, and 8 to 13
10: Coater
11: Coating liquid tray
12: Die
13: Circulation tank
14: Mixing tank
15: Base film
16: Pinch roll
17: Examples 21 to 43
18: Comparative Examples 14, 17 to 19, and 21 to 26

DETAILED DESCRIPTION

Definitions of adhesion, blocking resistance, transparency, and humidity- and heat-resistant adhesion described in PLOBLEMS in the present invention will be provided first.

"Adhesion" described in the present invention means an adhesion at an interface between an acrylic hard coat layer and a covering layer of a film; it is the adhesion obtained after forming the hard coat layer obtained by curing an solvent-reducible and light curable acrylic resin by ultraviolet light on a covering layer surface of the film and after repeating cross-cut peeling test (100 squares) using an adhesive tape for 10 times for each. In the present invention, adhesion of 80% or more defined by the following formula is determined as acceptable. Preferably it is 85% or more, particularly preferably 90% or more.

Adhesion(%)=(1−number of squares peeled off/100 squares)×100

Further, with respect to blocking resistance in the present invention, after covering layer surface of two pieces of film sample are superimposed on each other and are made to adhere to each other by applying a pressure of 1 kgf/cm² at 50° C. under an atmosphere of 60% RH for 24 hours followed by being peeled off, a film in a state of "being capable of easily being stripped off with no transition of the covering layer" is to be acceptable.

Further, the film which is highly excellent in transparency in the present invention means a film having a haze of 1.5% or less. It preferably has a haze of 1.0% or less.

Further, the humidity- and heat-resistant adhesion described in the present invention means adhesion at an interface between the acrylic hard coat layer and the covering layer of the film when, using a film sample obtained after the laminated thermoplastic resin film is kept in an environment at a temperature of 60° C. and a relative humidity of 90% for 1000 hours, forming a hard coat layer obtained by curing a non-solvent type light curable acrylic resin by ultraviolet light on a covering layer surface of the film for subjecting the film sample to cross-cut peeling test (100 squares) with an adhesive tape. In the present invention, adhesion of 71% or more defined by the following formula is determined acceptable.

Adhesion(%)=(1−number of squares peeled off/100 squares)×100

In the present invention, in order to obtain a laminated thermoplastic resin film having such an excellent adhesion and blocking resistance, it is important to develop a specific microphase-separated structure or a nanophase-separated structure on a surface of the covering layer. Such a specific phase separation structure is formed by selectively employing and controlling a resin composition of the coating liquid, type and concentration of the surfactant, an amount of coating, a drying condition, a heat fixation condition used for forming the covering layer and the like.

Further, in order to obtain the laminated thermoplastic resin film having humidity- and heat-resistant adhesion, it is important that a cross-linked structure is formed on a resin constituting the covering layer. Additionally, in order that the cross-linked structure is formed in the resin constituting the covering layer, type and an amount of cross-linker and conditions of heat treatment (conditions for curing) are to be selected as necessary.

First, an outline of a method for producing a laminated thermoplastic resin film of the present invention will be explained with reference to polyethylene terephthalate (hereinafter abbreviated as PET) as representative examples; however, the present invention is not limited to these representative examples.

After PET pellets which do not substantially include particles for a purpose of providing slipperiness are sufficiently vacuum-dried, they are fed into an extruder to be subjected to melt-extrusion in sheet form at 280° C. and cooling solidification to form an unoriented PET sheet. In this case, high-purity filtration is carried out in any place where the molten resin is kept at about 280° C. in order to remove foreign matter contained in the resin. The resultant unoriented sheet is stretched to from 2.5 to 5.0 times in a longitudinal direction with a roll heated to a temperature from 80 to 120° C. to obtain a uniaxial oriented PET film.

Then, an aqueous solution of the copolymerized polyester and the polyurethane resin is coated on one side or both sides of the uniaxial oriented PET film. In order to coat the aqueous coating liquid, methods such as reverse roll coating method, gravure coating method, kiss coating method, roll brush method, spray coating method, air knife coating method, wire-bar coating method, Pipe Doctor method, impregnation coating method and curtain coating method may be used. These methods may be used either alone or in combination thereof.

Next, with the both side edges of the film clipped, the film is introduced to hot air zone heated at 80 to 180° C., and after drying, they are stretched in width direction from 2.5 to 5.0 times. Subsequently, they are introduced to heat treatment zone at 220 to 240° C. to be subjected to heat treatment for 1 to 20 seconds to complete crystalline orientation. During this heat treatment step, when necessary, they may be subjected to relaxation treatment of 1 to 12% in width direction or in a longitudinal direction.

Hereinafter, a phase separation structure of a covering layer obtained in the present invention will be explained. Next, raw-materials and production condition used for the laminated thermoplastic resin film of the present invention will be explained in detail including condition factors to control the phase separation structure.

(1) Phase Separation Structure of the Covering Layer

In the present invention, covering layer has a microphase-separated or nanophase-separated structure in polyester phase A comprising a copolymerized polyester resin as a main component (hereinafter occasionally abbreviated as PEs phase) and polyurethane phase B comprising a polyurethane resin as a main component (hereinafter occasionally referred to as PU phase). It is characterized in that when observed by a scanning probe microscopy in phase measurement mode, an area ratio (surface fraction of PEs) of polyester phase A (which indicates a dark phase in phase image) of the surface of the covering layer defined by the following formula (1) is 35% or more and less than 90% per a measurement area of 5 μm×5 μm.

Surface fraction of PEs(%)=(area of polyester phase A/measurement area)×100　　(1)

This surface fraction of PEs on the surface of the covering layer has a following technical significance.

If the surface fraction of PEs is less than 35%, surface fraction of a phase comprising a polyurethane resin as a main component on the surface of the covering layer becomes relatively large so that frequency of decrease in blocking resistance will increase. On the other hand, if the surface fraction of PEs is 90% or more, a frequency of decrease in adhesion will increase, and in particular, decrease in adhesion to a non-solvent type hard coating agent will become conspicuous.

A lower limit of the surface fraction of PEs on the surface of the covering layer is, from a view point of blocking resistance, preferably 40%, more preferably 45%, particularly preferably 50%. On the other hand, an upper limit of the surface fraction of PEs is, from a viewpoint of adhesion to a functional layer comprising an acrylic resin, preferably 85%, more preferably 80%, particularly preferably 75%.

In the present invention, for an evaluation of phase separation structure of the surface of the covering layer, a scanning probe microscopy (SPM) in phase measurement mode (phase mode) is used. Phase mode means a mode for phase-lag measurement which is usually performed together with surface shape observation by dynamic force mode (DFM mode when using SPM produced by SII Nano Technology Inc.).

The principle of measurement regarding the evaluation of the phase separation structure of the covering layer by phase measurement mode (phase mode) of the scanning probe microscopy (SPM) will be briefly explained.

In the phase mode, phase-lags of cantilever vibration in DMF operation are detected. In DFM operation, measurement of the shape is carried out while a distance between a probe and a sample is controlled in order to make amplitude of vibration of cantilever in sympathetic vibration at a certain level. Here, if a signal to vibrate a bimorph (piezoelectric element) for vibrating the cantilever is called "input signal", in the phase measurement mode, a phase lag of an effective vibration signal of the cantilever in response to this "input signal" is detected simultaneously with the amplitude of vibration. The phase-lag sensitively responds to effects of surface properties, and the softer the sample surface, the larger the phase-lag becomes. By imaging the sizes of the phase-lags, observation of distribution of surface properties (referred to as phase image and the like) will be made possible. Therefore, when a plurality of resin phases having different properties are present, an evaluation of phase separation structure is made possible by this measurement method.

However, the evaluation of the phase separation structure of the covering layer may be carried out in a mode other than phase measurement mode as long as it is a mode for evaluating surface property distribution by a scanning probe microscopy such as frictional force measurement mode and viscoelasticity measurement mode, and it is important to select an observation mode capable of evaluating the phase separation structure with a highest sensitivity. In the phase measurement mode, not only phase-lags attributed to the difference of viscoelasticity of the covering layer, but also phase-lags attributed to difference in surface properties such as a degree of adsorbability may be detected.

The phase separation structure of the covering layer of the present invention, in terms of size, corresponds to a microphase-separated structure or a nanophase-separated structure. When PEs phase is regarded as a continuous structure having a long axis and a short axis, it mainly comprises a continuous structure wherein a width in a short axis direction is 1 μm at a maximum, and a length in a long axis direction is greater than 1 μm. Namely, relative to an entire area of the PEs phase, an area of the part having the continuous structure is 80% or more, preferably 85% or more, even more preferably 90% or more. Further, even if it is a PEs phase dispersed in an island shape which does not fall into the continuous structure described in the above definition, an end of the PEs phase having a continuous structure inside the covering layer appears on the surface.

The size of the continuous structure of the PEs phase is preferably 1 μm at a maximum in width in a short axis direction, more preferably 0.8 μm, even more preferably 0.6 μm, particularly preferably 0.4 μm in a short axis direction. A lower limit of the width in a short axis direction is not particularly limited, but it is preferably 0.01 μm at a narrowest point, particularly preferably 0.05 μm in order to maintain the continuous structure. On the other hand, the size of the continuous structure of the PEs phase is preferably more than 1 μm in length in a long axis direction, more preferably 1.5 μm or more, even more preferably 2.0 μm or more, particularly preferably 2.5 μm or more.

The phase separation structure in the covering layer of the present invention, as can be seen from representative examples shown in FIGS. 1 and 8, shows a complicate structure which can not be seen in nature, and it is difficult to define a form of phase separation unambiguously. The phase separation structure can be expressed in various aspects as described in the following.

For example, when a shape of the phase separation structure is expressed as a pattern, among descriptions in literatures, it is close to "dendritic structure" ("Kagakugo Daijiten (Dictionary of Chemical Terms)", page 226, published on Jun. 15, 1979 by Sankyo Publishing Co., Ltd.), "wave pattern structure" ("Patterns", page 168 to 169, published on 2002.10.1 by Nobarasha Co.), and "camouflage-tone".

Additionally, phase separation structure on the surface of the covering layer in the present invention resembles what is expressed as a tricontinuous structure in the field of morphology in polymer blending. Further, it can be expressed as an interpenetrating network structure formed by interwinding of a copolymerized polyester resin and a self-crosslinking polyurethane resin.

In terms of shape, self-similarity of the PEs phase can also be expressed quantitatively by using fractal dimension. For example, as shown in FIGS. 3 and 10, in a phase image stressing a contour of an interface between the light phase (polyester phase A) and the dark phase (polyurethane phase B) obtained by observing a surface of the covering layer by a scanning probe microscopy in phase measurement mode, it can be expressed quantitatively as an index indicating the complexity of a boundary between the light phase and the dark phase (contour of the interface) using fractal dimension calculated from the contour of the interface by using box-counting method.

When the fractal dimension in a unit area is 1, it means a straight line (one-dimension), and 2 means a solid face (two-dimension). Namely, it means that the closer to 2 the fractal dimension is, the more dense the structure is. On the other hand, it means that the closer to 1 the fractal dimension is, the more nondense the structure is.

Specifically, in a phase image wherein the contour of the interface between the light phase (polyester phase A) and the dark phase (polyurethane phase B) is emphasized, a fractal dimension of a boundary between the light phase and the dark phase (contour of the interface) is preferably from 1.60 to 1.95 per a measurement area of 5 μm×5 μm. An upper limit of the fractal dimension is more preferably 1.93, particularly preferably 1.90. On the other hand, the lower limit of the fractal dimension is more preferably 1.65, particularly preferably 1.70.

For example, the fractal dimensions of the boundary (contour of the interface) between the light phase (polyester phase A) and the dark phase (polyurethane phase B) on the surface of the covering layer shown in FIGS. 4 and 11 are 1.89 and 1.90, respectively. FIGS. 4 and 11 are diagrams which modify the phase image of FIGS. 1 and 8 showing a representative phase separation structure on a surface of a covering layer to emphasize the contour of the interface between the light phase and the dark phase and which indicates a boundary between the light phase and the dark phase.

In the present invention, in order to develop at a maximum the function of the copolymerized polyester resin and the polyurethane resin which are to be raw-materials of the covering layer, it is important that the covering layer has a microphase-separated structure or a nanophase-separated structure. It is because when the two resins are completely compatible, properties of the two resins are offset against each other, so that on the whole, excellent characteristics of the copolymerized polyester resin and the polyurethane resin may not be expected. In the covering layer of the present invention, as a phase separation structure which a PEs phase and a PU phase can take, it is possible for the phases to have a sea-island structure as a typical structure of so-called complex form wherein the PU phase is dispersed in the PEs phase and, and the PEs phase is dispersed in the PU phase. Not to mention, in this sea-island structure, if an amount of one resin phase is more than the other while the resins are in a incompatible state, an amount of the other resin is naturally reduced, so that so called an island will be formed. In the present invention, by controlling production conditions, it is possible to obtain a covering layer comprising such a sea-island structure having separate phases. To expect the effects of the present invention with this sea-island structure, it is necessary to further scrutiny the structure.

However, considering unevenness of sizes and unevenness of distribution shapes of the resin phases which form the island structure, effects of the shapes, the number and distribution shape of an island phase cannot be ignored; therefore, there is concern that properties of a resin constituting the sea structure have a considerable effect. In such a case, in order to maintain uniformity of the materials, it is considered advantageous to employ a phase separation structure wherein the entire phases look like being entangled with each other, which is the phase separation structure of the PEs phase and the PU phase of the present invention. A phase separation structure employing a kind of a sea-island structure of a PEs phase and a PU phase may be listed as a representative embodiment of the present invention.

Additionally, as another phase separation structure of the covering layer in the present invention, a core-shell structure may be employed. Such an example includes a structure wherein PEs phase is surrounded by a PU phase, and they are further surrounded by a PEs phase. However, in order to form such a core-shell structure, a highly advanced control is required. Moreover, it seems that an excellent material behavior may not be expected because of the employment of the core-shell structure. Further, as an embodiment of the phase separation structure, it is possible to employ a laminated structure wherein a PEs phase and a PU phase are orderly arranged alternately. However, although an arrangement wherein each phase is arranged in parallel at about equal intervals is ideal, when a width of the phase becomes larger, it becomes difficult to distribute PEs phase and PU phase evenly at an interface of the covering layer, consequently, it may effect on qualities of the laminated thermoplastic resin film. Due to subtle differences of production conditions, while it takes a form of sea-island structure, a core-shell structure and a laminated structure, it may have a form of a mixture thereof. However, in order to maintain qualities, it is important that the PEs phase and the PU phase have a certain size and they are mixed uniformly and evenly in the covering layer.

Polyester phase A comprising a copolymerized polyester resin as a main component and polyurethane phase B comprising a polyurethane resin as a main component have an irregular shape, respectively. These resin phases form a complex array structure provided irregularly, densely and evenly on a base material comprising a thermoplastic resin film. Further, it may be a structure wherein a surface of one resin phase is cut into by an other resin phase in an incompatible state. In FIGS. 3 and 10, the black part indicates polyester phase A while the white part indicates polyurethane phase B.

In arranging the two types of resin phases evenly in a separated state per unit area (e.g. 5×5 μm), if a size of one resin phase increases, a size of the other resin phase will be restricted. For this reason, there will be a great imbalance between the size of presences of the resin phases. As a result, it will be difficult to maintain a state wherein both of the resin phases are evenly arranged in a separated state in dispersion, so that there will be unevenness in the quality of the covering layer; thus, it is not preferable in terms of quality control.

In order to subject the both resin phases to phase separation and, at the same time, include them in the covering layer in an evenly mixed state, it is preferable that a shape of the PEs phase has a size of up to 1 μm in width in a short axis direction and 1 μm or more in length in a long axis direction. Of course, if there is not high requirement in quality, a relatively enlarged structure wherein a width in a short axis direction is about 6 μm at a maximum is also possible. This phase separation structure of the continuous phase (PEs phase) is developed as a specific microphase-separated structure or a nanophase-separated structure in a covering layer by selectively employing and controlling resin composition of coating liquid for forming a covering layer and type and concentration of the surfactant, an amount of coating, and conditions of drying and heat fixation of a coated layer and the like. In any case, an embodiment of phase separation structure of polyester phase A and polyurethane phase B on a surface of the covering layer shown in FIGS. 1 and 8 is a typical model in order to get the effect of the laminated thermoplastic resin film of the present invention.

Further, an importance of the phase separation structure will be explained in detail.

It is important that a covering layer in the laminated thermoplastic resin film of the present invention comprises a copolymerized polyester component and a polyurethane component as resin components and is phase-separated into a PEs phase comprising a copolymerized polyester resin as a main component and a PU phase comprising a polyurethane resin as a main component, and that at least the PEs phase has a continuous structure. By phase-separating the two kinds of resins evenly without mixing, a copolymerized polyester resin excellent in adhesion to a base material film comprising a thermoplastic resin film and a relatively good solvent resistance and a polyurethane resin having poor solvent resistance but excellent adhesion to a hard coat layer, a diffusion layer, and many resins such as an acrylate resin are made the most of the characteristics of each of the resins without being offset against each other.

Polyester phase A constituting the covering layer preferably consists of one copolymerized polyester resin alone, but may contain a polyurethane resin in an amount of 0.01 to 40% by mass. Further, polyester phase A may contain particles in an amount of 0.001 to 20% by mass. In polyester phase A, a surfactant may be occasionally attached to or contained in the resin. Similarly, polyurethane phase B preferably consists of one polyurethane resin alone, and may include particles, a surfactant and the like in about the amount described with regard to the copolymerized polyester resin. In particular, particles having high affinity with polyurethane resin may be selectively included unevenly in polyurethane phase B in a greater amount than in polyester phase A in a process of forming a covering layer.

In general, in a composition comprising a mixture of a copolymerized polyester resin and a polyurethane resin, both of the resins become a chemically uniform material, and a function of chemically complementing each other's properties or functions often develops. On the other hand, in a covering layer comprising the polyester phase and the polyurethane phase of the present invention, as described above, each of the polyester phase and the polyurethane phases are physically phase-separated to have a great imbalance between the presences of the resin phases, so that a structure wherein both of the resin phase are in a state of being separated and arranged evenly in dispersion is maintained. Each of the resins has a property with different function in a phase-separated state, for example, blocking resistance in the case of a copolymerized polyester resin and adhesion in the case of polyurethane resin via a surface of each of the resin phases. It is, so to speak, a development of physically complementing function, and this function or principle is rightly a novel technical matter which has not been acknowledged in the prior art at all.

A detailed generating mechanism of a phase separation structure of a covering layer in the present invention is unclear. However, it is easily understood from a comparison of each of the Examples and Comparative Examples that a microphase-separated structure or a nanophase-separated structure specific to covering layer is developed in a composition ratio of a copolymerized polyester resin and a polyurethane resin, percentage of dispersion medium of water and an alcohol, types of surfactant, impurities in a surfactant, pH of an aqueous coating liquid, composition of materials and characteristics of coating liquid such as an amount of coating by a subtle balance of conditions of time for drying and heat fixation treatment, temperature, and wind speed.

Further, reaction starting temperature of an isocyanate group contained in the polyurethane resin may also have a subtle effect. Herein, with regard to the phase separation structure, it should not be seen that both phases of what are called a PEs phase and a PU phase are away from each other in terms of distance with a physical boundary, but should be seen that they are in contact with each other without distance, and a great amount of copolymerized polyesters are distributed unevenly in the PEs phase, while a great deal of polyurethane resins are unevenly distributed in the PU phase and there is a boundary which is clearly distinguishable enough to look as if the two layers are separated. Additionally, in a case of the present invention, there is a possibility that the isocyanate group of the polyurethane resin is reacted on the border, showing a complicate separation structure.

The fact that the laminated thermoplastic film of the present invention has a covering layer comprising a PEs phase and a PU phase means that, for example, the laminated thermoplastic film has a function of an interface which acts equally upon a base material comprising the thermoplastic film and upon both of so-called a base material side and a functional layer side which are considered to be interposed between functional layers such as a hard coat layer and a diffusion layer. Therefore, both the PEs phase and the PU phase have a structure in which the two phases are separated from each other, and the PEs phase is in a state of exerting excellent properties of a copolymerized polyester resin it inherently possesses on both sides of the covering layer (an interface between base material and covering layer and an interface between covering layer and functional layer) to a maximum extent. Namely, PU phase is in a state of exerting excellent properties of a polyurethane resin it inherently possesses on the both sides to a maximum extent.

It is because in a laminated thermoplastic resin film having a covering layer, a surface of the covering layer has a microphase-separated structure or a nanophase-separated structure comprising a PEs phase and a PU phase so that copolymerized polyester resin of the PEs phase is exposed and properties or functions of the copolymerized polyester resin are exerted to a maximum extent and, similarly because polyurethane resin of the PU phase is exposed and the polyurethane resin exerts its inherent properties or functions to a maximum extent. Therefore, if each of the PEs phase and the PU phase on the surface of the covering layer is distributed in a specific range, properties or functions of both of the resins are exerted to a maximum extent. It is because, due to the unique structure of a laminated body, the properties or functions act reasonably on an interface between a base material and a covering layer and an interface between a covering layer and a functional layer.

Further, in the present invention, when particles are contained in a resin composition constituting a PEs phase and a PU phase, for example, in a case of silica particles, they are distributed unevenly in the PU phase. It is assumed to be because surface energy of the PU phase is closer to silica particles than that of the PEs phase. By containing silica particles unevenly in the PU phase, blocking resistance which is a shortcoming of the polyurethane resin is improved, and a content of the particles in an entire covering layer is reduced, so that it is a useful structure in order to exert a function of maintaining transparency.

Similarly, it is suggested that by selecting particles whose surface energy is closer to the copolymerized polyester, the particles may be selectively distributed unevenly in the PEs phase. While maintaining transparency, slipperiness and blocking performance are highly improved by a method of distributing the particles unevenly in either of the phase separation structures comprising PEs phase or the PU phase that can not be expected from the prior art. Therefore, the present invention is also significant in that it is capable of extending a range of application of material design of the microphase-separated structure or the nanophase-separated structure.

(2) Base Film

In the present invention, the thermoplastic resin film which is to be a base material is a film obtained by stretching, in a uniaxial direction, an unoriented sheet obtained by subjecting a thermoplastic resin to melt-extrusion or solution-extrusion in a longitudinal direction or in width direction, or subjecting the film to consecutive biaxial stretching or simultaneous biaxial stretching, followed by heat fixation treatment.

Additionally, the thermoplastic resin film may be subjected to surface activation treatment such as corona discharge treatment, glow discharge treatment, flame treatment, ultraviolet irradiation treatment, electron irradiation treatment, and ozone treatment within the range that does not impair the object of the present invention.

A thermoplastic resin film used as the base material of the laminated thermoplastic resin film of the present invention has a thickness within a range from 30 to 300 μm, and it may be determined as necessary according to a standard of the intended usage. An upper limit of a thickness of the thermoplastic resin film is preferably 250 μm, particularly preferably 200 μm. On the other hand, a lower limit of the film thickness is preferably 50 μm, particularly preferably 75 μm. If the film thickness is less than 50 μm, rigidity and mechanical strength will tend to be insufficient, while if the film thickness is more than 300 μm, an absolute amount of foreign matter present in the film increases, so that it tends to increase an optical defect. Additionally, cutting property when cutting the film in a given width will be poor and production costs thereof will become higher. Further, it will often be difficult to wind a film having a long length into a roll due to stronger rigidity.

As the thermoplastic resin, a polyolefin such as polyethylene (PE), polypropylene (PP), and polymethyl pentene (TPX), a polyester resin such as polyethylene terephthalate (PET), polyethylene-2,6-naphthalate (PEN), polytetramethylene terephthalate (PTT), polybutylene terephthalate (PBT), a polyamide (PA) resin such as nylon 6, nylon 4, nylon 66, and nylon 12, polyimide (PI), polyamide-imide (PAI), polyethersulfone (PES), polyether-etherketone(PEEK), polycarbonate (PC), polyarylate (PAR), cellulose propionate, polyvinyl chloride (PVC), polyvinylidene chloride, polyvinyl alcohol (PVA), polyether-imide(PEI), polyphenylene sulfide (PPS), polyphenylene oxide, polystyrene (PS), syndiotactic polystyrene, a norbornene polymer and the like are listed. Further, other than being used alone, these polymers may be a copolymer containing a small amount of copolymerized component or one or more than one kind of another thermoplastic resin may be blended therein.

Among these thermoplastic resins, polyethylene terephthalate, polypropylene terephthalate, polyethylene-2,6-naphthalate, syndiotactic polystyrene, a norbornene polymer, polycarbonate, polyarylate and the like are preferred. Additionally, a resin having a polar functional group such as polyester and polyamide is preferred in terms of adhesion to a covering layer.

Among them, a copolymer comprising, as a main component, polyethylene terephthalate, polyethylene-2,6-naphthalate, polybutylene terephthalate, polypropylene terephthalate or a constituting component of these resins is preferred, and in particular, a biaxially oriented film formed from polyethylene terephthalate is preferred.

For example, when a polyester copolymer comprising polyethylene terephthalate as a basic skeleton is used as a resin forming the thermoplastic resin film, a percentage of copolymerized component thereof is preferably less than 20 mol %. If it is 20 mol % or more, strength, transparency, and heat resistance of the film may become poor. As a dicarboxylic acid component which is used as the copolymerized component, there may be listed, for example, an aliphatic dicarboxylic acid such as adipic acid and sebacic acid, an aromatic dicarboxylic acid such as isophthalic acid, phthalic acid and 2,6-naphthalene dicarboxylic acid, and a polyfunctional carboxylic acid such as trimellitic acid and pyromellitic acid. Further, as a glycol component which is used as a copolymerized component, there may be listed, for example, a fatty acid glycol such as diethylene glycol, 1,4-butanediol, propylene glycol and neopentyl glycol; an aromatic glycol such as p-xylene glycol; an alicyclic glycol such as 1,4-cyclohexane dimethanol; and a polyethylene glycol having an average molecular weight of 150 to 20000.

The thermoplastic resin may contain various additives other than a catalyst within the range that does not prevent the effects of the present invention. As the additives, for example, inorganic particles, heat-resistant polymer particles, an alkali metal compound, an alkaline earth metal compound, a phosphorus compound, an antistatic agent, an ultraviolet absorber, a light resisting agent, a fire retardant, a heat stabilizer, an antioxidant, an anti-gelling agent, surfactant and the like may be listed.

The particles are used in order to provide appropriate surface concavity and convexity to a film surface in view of handleability (slipperiness, traveling performance, traveling performance, blocking performance, and easiness of releasing air introduced while winding the film) in winding into a roll or winding off the roll during production of the thermoplastic resin film.

As inorganic particles, there may be listed calcium carbonate, calcium phosphate, amorphous silica, a crystalline glass filler, kaolin, talc, titanium dioxide, alumina, silica-alumina composite oxide particle, barium sulfate, calcium fluoride, lithium fluoride, zeolite, molybdenum sulfide, mica and the like. Further, as the heat-resistant polymer particles, there may be listed cross-linked polystyrene particles, cross-linked acrylic resin particles, cross-linked methyl methacrylate particles, benzoguanamine-formaldehyde condensate particles, melamine-formaldehyde condensate particles, polytetra fluoroethylene particles and the like.

When using a polyester film as a base film, among the above particles, silica particles are most preferable in a usage strongly requiring transparency since it has a refractive index close to that of a polyester resin and easily obtain transparency. On the other hand, in a usage requiring opacity, a white pigment such as titanium oxide is preferred. Particles contained in the thermoplastic resin film may be of one kind or two or more kinds.

Type, an average particle size, and an amount of the above particles to be added may be determined from a point of a balance between transparency and handleability according to a usage of the film within a range that the average particle size is from 0.01 to 2 μm and the amount of the particles to be contained in the film is from 0.01 to 5.0% by mass. Further, when the laminated thermoplastic resin film of the present invention is used for a usage highly requiring transparency, particles which cause lowering of transparency are preferably not substantially contained in the thermoplastic resin film of the base material, and it is preferred to employ a structure containing the particles in the covering layer.

The above description of "particles . . . are . . . not substantially contained in the thermoplastic resin film of the base material" means that, for example, in a case of inorganic particles, when quantity of inorganic atoms is determined by fluorescent X-ray analysis, the content is 50 ppm or less, preferably 10 ppm or less, most preferably below detection limit. It is because even if the particles are not added actively in the base film, contaminant components derived from foreign matter and dirt attached on a line or a device during production process of a raw-material resin film may fall away to be contained in the film.

Further, layer constitution of a thermoplastic resin film used as a base material in the present invention may be of single layer, or may employ a laminated structure provided with functions which are unavailable from the single layer. When the laminated structure is employed, coextrusion method is preferred.

Hereinafter, method of producing a base film will be explained in detail with reference, as representative examples, to a case in which polyester is used as a raw-material of the thermoplastic resin film.

An intrinsic viscosity of polyester pellets used as a raw-material of the film is preferably within a range from 0.45 to 0.70 dl/g. If the intrinsic viscosity is less than 0.45 dl/g, an occurrence of rupture during production of the film will be more apt to occur. On the other hand, when the intrinsic viscosity is more than 0.70 dl/g, due to a great increase in filtration pressure, it becomes difficult to carry out high-purity filtration, so that productivity tends to be lowered easily.

When the film is used for an optical functional film or an optical functional sheet, foreign matter contained in the polyester, the raw material, which may cause optical defects are preferably removed. In order to remove foreign matter in the polyester, high-purity filtration is performed when subjecting the film to melt-extrusion at any place where the molten resin is kept about 280° C. A filtering medium used for high-purity filtration of the molten resin is not particularly limited, but in a case where the filtering medium is sintered stainless steel, it is preferred due to its excellent performance in removing aggregates comprising Si, Ti, Sb, Ge, and Cu as main components and a high-melting point organic material.

A filtered particle size of the filtering medium used for high-purity filtration of the molten resin (initial filtration efficiency: 95%) is preferably 15 μm or less. If the filtered particle size of the filtering medium is more than 15 μm, removal of foreign matter of 20 μm or larger tends to be insufficient. Carrying out the high-purity filtration of a molten resin by using a filtering medium having a filtered particle size (initial filtration efficiency 95%) of 15 μm less might reduce productivity, however, which is extremely important in order to obtain a film having fewer optical defects.

In a step for extruding a molten resin, even in a case of foreign matter which are fine enough to pass through the filtering medium, crystallization progresses around the foreign matter in a cooling step of sheet-shaped molten material and cause non-uniformity of orientation in an orientation step to generate a subtle difference in thickness to form a portion having a lens-like shape. In the part, light is refracted or scattered as if there were a lens, and when observed by the naked eye, the foreign matter look larger than an actual size. This subtle difference in thickness is observed as the difference between height of convex portion and depth of concave portion, and if the height of convex portion is 1 μm or more and depth of concave portion adjacent to the convex portion is 0.5 μm or more, an object having a size of 20 μm is recognized as having a size of 50 μm or more by the naked eye due to lens effect, and further, may occasionally be recognized as an optical defect having a size of 100 μm or more.

In order to obtain a highly transparent film, it is preferred that the particles are not contained in the base film, but in a case of a film containing smaller amount of particles and having higher transparency, optical defects by subtle concavity and convexity tend to look clearer. Also, a surface of a thicker film is less apt to be quenched than a thinner film, and crystallization tends to progress therein, so that it becomes necessary to quench the entire film during production of an unoriented sheet. As a method for quenching the unoriented sheet, a method of extruding a molten resin in a sheet form on a rotating cooling drum from a slit part of a die and quench the sheet-shaped molten material while making it adhere to the rotating cooling drum to obtain a sheet is preferred. As a method for cooling an air side of the unoriented sheet (an opposite side to a side which comes in contact with the cooling drum), a method of cooling by spraying high speed air flow is effective.

(3) Covering Layer

A laminated thermoplastic resin film of the present invention is produced by subjecting to a coating step wherein a laminated thermoplastic resin film provided with a covering layer having a microphase-separated structure or a nanophase-separated structure obtained by continuously forming through the coating step in which an aqueous coating liquid comprising resins including a copolymerized polyester resin and a polyurethane resin, dispersion media including water and an alcohol, and a surfactant as a main constituting component are continuously coated on either one side or both sides of a moving thermoplastic resin film, a drying step of drying a coated layer (covering layer), subsequently a stretching step of stretching at least in a uniaxial direction, followed by a heat fixation treatment step of further subjecting the stretched coated film to heat fixation treatment. Further, a cross-linked structure may be formed in a copolymerized polyester resin by mixing at least one cross-linker selected from an epoxy cross-linker, a melamine cross-linker, and an oxazoline cross-linker in the coating liquid and by carrying out heat treatment.

In this method for producing the laminated thermoplastic resin film provided with the covering layer having the microphase-separated structure or the nanophase-separated structure, a mass ratio of the copolymerized polyester resin A and the polyurethane resin B (A/B) is preferably from 30/70 to 70/30 and preferably satisfies following conditions (i) to (vi). The same applies to a case where a cross-linker is contained in the coating liquid.

(i) Transit time of the film from immediately after coating of the coating liquid to an inlet of a drying step is less than 2 seconds.

(ii) The drying step is carried out at a temperature of 120 to 150° C. for 0.1 to 5 seconds.

(iii) In the drying step, wind speed of drying air is at 30 m/second or more.

(iv) The heat fixation treatment step is categorized continuously into a plurality of heat fixation zones, and each zone is partitioned so as to be capable of independently controlling temperature; a first heat fixation zone which the film passes is at a temperature from 190 to 200° C., and a temperature of a heat fixation zone set at a maximum temperature is from 210 to 240° C.; and transit time of the film from an outlet of the first heat fixation zone to the heat fixation zone set at the maximum temperature (if there are a plurality of the zones, the heat fixation zone closest to the inlet) is 10 seconds or less.

(v) A nonionic surfactant or a cationic surfactant is blended in an amount of 0.01 to 0.18% by mass relative to the coating liquid.

(vi) A final amount of coating of the covering layer is from 0.005 to 0.20 g/m$^2$.

It is further preferable to satisfy following conditions (vii) to (ix) during production of the laminated thermoplastic resin film.

(vii) Transit time of the film from immediately after coating of the coating liquid to an inlet of a drying step is less than 1.5 seconds.

(viii) The drying step is carried out at a temperature of 130 to 150° C. for 0.5 to 3 seconds.

(ix) In the heat fixation treatment step, a temperature of a heat fixation zone set at a maximum temperature is from 225 to 235° C., and transit time of the film from the outlet of the first heat fixation zone to the heat fixation zone set at the maximum temperature (if there are plurality of the zones, the heat fixation zone closest to the inlet) is 5 seconds or less.

Further, by including fine particles in the covering layer laminated by the above-described inline coating method and forming appropriate concavity and convexity surface of the covering layer, slipperiness, winding performance, and scratch resistance are provided. For this reason, a high transparency of the film is maintained because it is unnecessary to include fine particles in the thermoplastic resin film.

When using the laminated thermoplastic resin film of the present invention as the base film for an optical functional film or an optical functional sheet, average surface roughness of three-dimensional center-plane (SRa) of the surface of the covering layer is preferably smooth at 0.002 to 0.010 μm. An upper limit of SRa is, in terms of transparency, more preferably 0.0080 μm, particularly preferably 0.0060 μm. On the other hand, a lower limit of SRa is, in terms of handleability such as slipperiness, winding performance and scratch resistance, more preferably 0.0025 μm, particularly preferably 0.0030 μm.

On a smooth surface of a covering layer with SRa of less than 0.002 μm, handleability such as blocking resistance, slipperiness and winding performance and scratch resistance are lowered, and thus it is not preferred. On the other hand, when SRa of the covering layer is more than 0.010 μm, haze becomes higher and transparency becomes poor, so that it is not preferred as a base material film for an optical functional film or an optical functional sheet.

In a preferred embodiment of the present invention, the covering layer has following four morphological and structural characteristics, and is obtained by following means.

(a) It is microphase-separated or nanophase-separated into polyester phase and polyurethane phase, and the polyester phase has a specific area ratio (surface fraction of PEs).

(b) Composition ratio of resin components of the covering layer may be differentiate between the surface and the inside.

(c) The covering layer has a cross-linked structure.

(d) When the covering layer contains particles, the particles are distributed unevenly either in the polyester phase or the polyurethane phase.

The polyester phase comprising a copolymerized polyester resin as a main component preferably has a continuous structure of up to 1 μm in width and more than 1 μm in length, and it is further preferably a structure wherein the copolymerized polyester phase and the polyurethane phase has a co-continuous structure. Within a range of surface fraction of PEs defined by the present invention, microscopically uniform adhesion is obtained if the polyester phase comprising a copolymerized polyester resin as a main component has a fine continuous structure of up to 1 μm in width and more than 1 μm in length.

In a phase separation structure dotted with points of more than 1 μm in width at a maximum in a polyester phase comprising a copolymerized polyester resin as a main component, the points which are poor in adhesion to functional layers such as a hard coat layer, a diffusion layer and a prism layer are locally formed. When the points which are poor in adhesion are formed on a surface of the covering layer, it may lead to macroscopic delamination with the points as the points of origin. In order to form the polyester phase into a fine continuous structure of up to 1 μm in width, it is important to suitably select a time necessary to reach from the transversal stretching zone to the maximum temperature of the heat fixation zone, and conditions of heat fixation. In particular, if a time required from transversal stretching zone to a zone which reaches a maximum temperature of the heat fixation zone is too long, phase separation of the covering layer will progress too much; as a result, there will be dotted points of the polyester phase comprising a copolymerized polyester resin as a main component which are more than 1 μm in width at a narrowest part thereof. Specific conditions of heat fixation when producing the laminated thermoplastic resin film of the present invention will be detailed later.

In order to control a final phase separation structure on the surface of the covering layer, a solvent evaporation rate in a drying step and a subsequent heat treatment to be described later are extremely important. By controlling the solvent evaporation rate in the drying step, composition ratio in a polyester component to a polyurethane component on the surface of the covering layer may be changed.

For example, when a mixed solvent of water/isopropyl alcohol is used, under a weak drying condition, a solvent remaining on the surface in a later stage of drying contains a larger percentage of water. Therefore, there will be a higher probability of a presence of polyurethane resin with relatively high hydrophilicity on the surface of the covering layer compared to when drying the covering layer under a strong condition. Further, a change of an amount of coating has an equal effect on controlling the solvent evaporation rate. Namely, when the amount of coating is increased, it will take longer to dry, so that the remaining solvent present on the coated face right before the drying contains a larger percentage of water. That is, the percentage of polyurethane component on the surface become higher compared to when there is a less amount of coating on the surface.

In the stretching step and the heat fixation treatment step, phase separation of the polyester component and the polyurethane component progresses, and when thermal crosslinking of either of the components starts, mobility of each phase decreases considerably so that the progress of the phase separation is inhibited. Namely, by controlling heating conditions in the stretching step and the heat fixation treatment step, the phase separation structure is controlled.

As described above, by controlling a percentage of presence of polyester/polyurethane on a surface in a drying step and by controlling the progress of phase separation in the stretching step and the heat fixation treatment step, it will be possible to precisely control a surface phase separation structure and a percentage of the presence of each phase. Further, by controlling surface energy of particles included in the covering layer, the particles are dispersed selectively in either the polyester phase comprising a copolymerized polyester resin as a main component or the polyurethane phase comprising a polyurethane resin as a main component.

The covering layer of the laminated thermoplastic resin film of the present invention comprises a copolymerized polyester resin and a polyurethane resin as main resin components. The copolymerized polyester resin alone has sufficient adhesion to a polyester base film, but is poor in adhesion to an acrylic resin which is used for prism lens and hard coating. Additionally, since it is a relatively fragile resin, cohesion failure in response to an impact of cutting readily occurs. On the other hand, if the covering layer comprises the polyurethane resin alone, it is relatively excellent in adhesion to a hard coat layer, a diffusion layer and an acrylate resin, but it is poor in adhesion to a polyester base film and also poor in blocking resistance. Therefore, it is necessary to include a great amount of particles or particles having a large particle diameter, or to increase a content of particles. As a result, haze of the film become higher, so that it is not preferable as a base material film for an optical functional film or an optical functional sheet which requires transparency particularly strongly.

(3-1) Step for Preparing Coating Liquid

In the present invention, a covering layer is formed by a coating method. Materials used in a coating liquid are a resin and either a dispersion medium or a solvent. In the present invention, the coating liquid for forming a covering layer is preferably aqueous. In the present invention, it is a preferred embodiment to use particles and a surfactant together with a resin component. Additionally, as necessary, an additive such as an antistatic agent, an ultraviolet absorber, an organic lubricant, an antibacterial agent, and a photooxidation catalyst may be used. Further, a catalyst may be added to the coating liquid in order to promote heat-crosslinking reaction of the resin; for example, various chemical substances such as an inorganic substance, a salt, an organic substance, an alkaline substance, an acidic substance and a metal-containing organic compound may be used. In order to control pH of the aqueous solution, an alkaline substance or an acidic substance may be added. The coating liquid is prepared by dispersing or dissolving the resin into a dispersion medium or a solvent while mixing, followed by using as necessary various additives other than particles and a surfactant, and diluting the mixture to a desired solid concentration.

Further, in the laminated film of the present invention, in order to evenly disperse a resin component and particles of a coating liquid, and further in order to remove foreign matter such as coarse particle aggregates and dusts generated in a process, the coating liquid is preferably subjected to microfiltration.

Types of filtering medium for microfiltration of the coating liquid is not particularly limited as long as it has the abovementioned capabilities, and there may be listed, for example, a filament type, a felt type, and a mesh type. Materials of the filtering medium for subjecting the coating liquid to microfiltration is not particularly limited as long as it has the abovementioned capabilities and does not affect negatively on the coating liquid, and there may be listed, for example, stainless steel, polyethylene, polypropylene, and nylon.

A filtering medium for subjecting the coating liquid to microfiltration preferably has a filtered particle size (initial filtration efficiency: 95%) of 25 μm or less, and more preferably has a filtration performance (filtered particle size) of 5 μm or less, particularly preferably 1 μm or less. Most preferred is a method using filters having different filtration performances in combination. When a filtering medium having a filtered particle size of more than 25 μm is used, removal of coarse aggregates tends to be insufficient. Therefore, coarse aggregates that could not have been removed by filtration expands by orientational stress during the uniaxial orientation or biaxially orientation step and are recognized as aggregates of 100 μm or more, readily causing optical defects.

Raw materials used for the coating liquid will be detailed hereinafter.

(a) Resin

With respect to constitution ratio of resin components of a covering layer formed on a base material comprising a thermoplastic resin film, when a coating liquid containing copolymerized polyester resin (A) and polyurethane resin (B) is prepared, mass ratio of resin (A) to resin (B) based on solid content ((A)/(B)) is preferably 70/30 to 30/70, particularly preferably within a range from 60/40 to 40/60. In the present invention, as a resin constituting the covering layer, a third resin other than a copolymerized polyester resin and a polyurethane resin may also be used. A cross-linker may be used, too.

In the present invention, a surface fraction of PEs on a surface of the covering layer and PEs mass ratio of a resin component of a covering layer do not correspond to each other as shown in FIG. 6 and FIG. 13. FIG. 6 clearly shows that even if PEs mass ratio of resin component of the covering layer is 50%, surface fraction of PEs on the surface of the covering layer changes from 30 to 91%. FIG. 13 clearly shows that even if PEs mass ratio of resin component of the covering layer is 45%, surface fraction of PEs on the surface of the covering layer changes from 26 to 86%. It suggests that a composition ratio of copolymerized polyester resin to polyurethane resin differs on the surface of the covering layer and inside thereof. Namely, it means that in the present invention, composition ratio of the copolymerized polyester resin to the polyurethane resin may be controlled at discretion in a direction of thickness of the covering layer.

Further, by determining a ratio of copolymerized polyester resin (A) to polyurethane resin (B) in the covering layer within the above range, hardness index of a surface of the covering layer falls into a range from 3.0 to 15.0 nm. If the hardness index of the surface of the covering layer is less than 3.0 nm, the covering layer becomes fragile. Therefore, in a processing step of cutting a functional layer comprising an acrylic resin as a constituting component such as a hard coat layer, a diffusion layer and a prism layer at a high speed in a predetermined size after formation thereof, it will be difficult to obtain sufficient adhesion against shear force during the cutting at a high speed. When hardness index on a surface of the covering layer is more than 15.0 nm, blocking resistance tends to be lowered. Additionally, coating performance and adhesion to a base material film and, further, solvent resistance tend to become insufficient.

A process of forming a phase separation structure of a water dispersible copolymerized polyester component and a hydrophilic polyurethane component in the present invention is estimated as follows. Both resin components mixed with a common solvent are in an uniformly dispersed or dissolved state in the coating liquid. After coating on a PET film, a coated face which has gone through a drying step is in a uniform state devoid of clear phase separation structure. Then, by heat treatment during a stretching step and a heat fixation treatment step, a phase separation structure develops. Namely, it is separated into a phase comprising a copolymerized polyester as a main component and a phase comprising a polyurethane as a main component. Further, with a progress of the phase separation, percentage of presence of a copolymerized polyester component having lower surface energy on the surface is estimated to become higher.

(Copolymerized Polyester Resin)

The copolymerized polyester resin used for the covering layer of the present invention preferably comprises as a constituting component an aromatic dicarboxylic acid component and, as a glycol component, ethylene glycol and a branched glycol. As the branched glycol component, for example, there may be listed 2,2-dimethyl-1,3-propanediol, 2-methyl-2-ethyl-1,3-propanediol, 2-methyl-2-butyl-1,3-propanediol, 2-methyl-2-propyl-1,3-propanediol, 2-methyl-2-isopropyl-1,3-propanediol, 2-methyl-2-n-hexyl-1,3-propanediol, 2,2-diethyl-1,3-propanediol, 2-ethyl-2-n-butyl-1,3-propanediol, 2-ethyl-2-n-hexyl-1,3-propanediol, 2,2-di-n-butyl-1,3-propanediol, 2-n-butyl-2-propyl-1,3-propanediol and 2,2-di-n-hexyl-1,3-propanediol.

A lower limit of a molar ratio of the branched glycol component is preferably 10% by mol, particularly preferably 20% by mol relative to total glycol components. On the other hand, an upper limit thereof is preferably 80% by mol, more preferably 70% by mol, particularly preferably 60 mol %. As necessary, diethylene glycol, propylene glycol, butanediol, hexanediol or 1,4-cyclohexane dimethanol or the like may be used together.

As an aromatic dicarboxylic acid component, terephthalic acid and isophthalic acid are most preferable. Another aromatic dicarboxylic acid, particularly aromatic dicarboxylic acid such as diphenyl carboxylic acid and 2,6-naphthalenedicarboxylic acid may be added within a range of 10% by mol or less relative to a total dicarboxylic acid component for copolymerization.

A copolymerized polyester resin used as a resin component of a covering layer in the present invention is preferably a water-soluble or water-dispersible resin. For this purpose, other than the dicarboxylic acid component, in order to provide water dispersibility to polyester, 5-sulfoisophthalic acid or an alkali metal salt thereof is preferably used within a range of 1 to 10% by mol; for example, sulfoterephthalic acid, 5-sulfoisophthalic acid, 4-sulfonaphthalene isophthalic acid-2,7-dicarboxylic acid and 5-(4-sulfophenoxy) isophthalic acid or an alkali metal thereof may be used.

(Polyurethane Resin)

As the polyurethane resin used for a covering layer of the laminated thermoplastic resin film of the present invention, a water-soluble or water-dispersible resin is preferably used. For example, a thermal reactive water-soluble urethane which is a resin containing a blocked isocyanate group wherein a terminal isocyanate group is blocked with a hydrophilic group (hereinafter abbreviated as blocked) may be used.

As a blocking agent of the isocyanate group, there may be listed a phenol containing a bisulfite and a sulfonate group, an alcohol, a lactam, an oxime, or an active methylene compound and the like. A blocked isocyanate group renders an urethane prepolymer hydrophilic or water-soluble. In a drying step or a heat fixation treatment step during production of a film, when thermal energy is given to the resin, a blocking agent separates from the isocyanate group, so that the resin fixes the water dispersible copolymerized polyester mixed in self-crosslinked network, and also reacts with a terminal group of the resin and the like. A resin during preparation of a coating liquid is poor in water resistance since it is hydrophilic, but after coating, drying, heat setting and a completion of thermal reaction, hydrophilic group in the urethane resin, i.e. the blocking agent gets separated so that a coated film excellent in water resistance is obtained.

Among the blocking agents, a bisulfite is most preferable for reasons that the blocking agent is separated from an isocyanate group at heat treatment temperature and in heat treatment time in a film production process and that it is industrially available. A chemical composition of a urethane prepolymer used in the resin includes (1) an organic polyisocyanate having two or more active hydrogen atoms in a molecule or a compound having two or more active hydrogen atoms in a molecule and having a molecular weight of 200 to 20,000; (2) an organic polyisocyanate having two or more isocyanate group in a molecule; or (3) a compound having a terminal isocyanate group obtained by reacting a chain extender having at least two active hydrogen atoms in a molecule.

Compounds generally known as the compound (1) are those containing two or more hydroxyl groups, carboxyl groups, amino groups or mercapto groups at an end or in a molecule, and a particularly preferred compound includes a polyether polyol, a polyether ester polyol and the like. Further, as the polyether polyol, for example, there may be listed an alkylene oxide such as an ethylene oxide and a propylene oxide, or a compound obtained by polymerizing styrene oxide and epichlorohydrin and the like, or a compound obtained by random polymerization, block polymerization or addition polymerization to a polyvalent alcohol thereof.

As the polyester polyol and the polyether ester polyol, there may be listed, mainly, a straight-chain or branched compound. It is obtained by condensing a saturated or unsaturated polyvalent carboxylic acid such as succinic acid, adipic acid, phthalic acid and a maleic acid anhydride, or the carboxylic acid anhydride with a saturated and an unsaturated polyvalent alcohol such as ethylene glycol, diethylene glycol, 1,4-butanediol, neopentyl glycol, 1,6-hexanediol and trimethylol propane; a polyalkylene ether glycol having a low-molecular weight such as polyethylene glycol and polypropylene glycol or a mixture of the alcohols.

Further, as the polyester polyol, there may be listed a polyester obtained from lactone and hydroxy acid. As the polyether ester polyol, a polyether ester obtained by additive polymerizingation of an ethylene oxide or a propylene oxide and the like with a polyester which has been produced in advance may be used.

As (2) the organic polyisocyanate, there may be listed an isomer of tolylene diisocyanate, an aromatic diisocyanate such as 4,4-diphenylmethane diisocyanate, an aromatic aliphatic diisocyanate such as xylylene diisocyanate, an alicyclic diisocyanate such as isophorone diisocyanate and 4,4-dicyclohexylmethane diisocyanate, an aliphatic diisocyanate such as hexamethylene diisocyanate, and 2,2,4-trimethyl hexamethylene diisocyanate, or a polyisocyanate obtained by adding one or more than two of the above compounds to trimethylol propane and the like in advance.

As (3) the chain extender having at least two active hydrogens, there may be listed a glycol such as ethylene glycol, diethylene glycol, 1,4-butanediol, and 1,6-hexanediol, polyvalent alcohols such as glycerin, trimethylol propane and pentaerythritol, a diamine such as ethylenediamine, hexamethylenediamine and piperazine, an amino alcohol such as monoethanolamine and diethanolamine, a thiodiglycols such as thiodiethylene glycol or water.

In order to synthesize a urethane prepolymer, a reaction is usually carried out at a temperature of 150° C. or less, preferably 70 to 120° C. for 5 minutes to a few hours by one-stage or multi-stage isocyanate polyaddition method using the chain extender. A ratio of isocyanate groups to active hydrogen atoms may be selected freely as long as it is 1 or more, but it is necessary that a free isocyanate group remains in a resultant urethane prepolymer. Further, a content of the free isocyanate group may be 10% by mass or less, but considering stability of urethane polymer aqueous solution after being blocked, it is preferably 7% by mass or less.

The resultant urethane prepolymer is preferably subjected to blocking using bisulfite. Mixed with bisulfite aqueous solution, it is reacted for about 5 minutes to 1 hour while being stirred well. A temperature for the reaction is preferably 60° C. or less. Then, it is diluted with water into an appropriate concentration to form a thermal reactive water-soluble urethane composition. The composition is prepared into an appropriate concentration and viscosity; normally, when heated at around 80 to 200° C., bisulfite in a blocking agent becomes dissociated and an active isocyanate group is regenerated to obtain a property that polyurethane polymer is generated by polyaddition reaction in a molecule of a prepolymer or between the molecules, or initiate addition to another functional group.

A typical example of resin (B) containing the blocked isocyanate group explained above includes Elastron which is a commercial name of a product produced by Dai-Ichi Kogyo Seiyaku Co Ltd. Elastron is one in which isocyanate groups are blocked by sodium bisulfite, and is water-soluble due to presence of a carbamoyl sulfonate group with strong hydrophilicity at a molecular end.

(b) Cross-Linker

In the present invention, in order to improve moisture and heat resistance of the covering layer, a covering layer containing a resin having a cross-linked structure is formed by adding a cross-linker to the coating liquid, and carrying out heat treatment. As the cross-linker, at least one kind selected from an epoxy cross-linker, a melamine cross-linker, and an oxazoline cross-linker is used. The cross-linker may be selected in consideration of affinity with a copolymerized polyester resin used for the coating liquid and humidity- and heat-resistant adhesion required for a covering layer.

In particular, where high humidity- and heat-resistant adhesion is required, among the above cross-linkers, the epoxy cross-linker or the melamine cross-linker is preferred. The epoxy cross-linker is not particularly limited, but for example, water-soluble epoxy cross-linkers produced by Nagase Kasei Kogyo K. K. (Denacol Series; EX-521, EX-512, EX-421, EX-810, EX-811, EX-851 and the like) are commercially available. As the melamine cross-linker, for example, Sumitex Resin series produced by Sumitomo Chemical Co., Ltd. (M-3, MK, M-6, MC and the like) and methylated melamine resins produced by SANWA Chemical Co., Ltd (MW-22, MX-706 and the like) are commercially available. As the oxazoline cross-linker, for example, EPOCROS series available from Nippon Shokubai Co. Ltd. (WS-700) and NX Linker FX and the like produced by Shin-nakamura Chemical Corporation are commercially available.

The above cross-linkers are preferably blended in the coating liquid for forming a covering layer such that a content thereof becomes preferably from 5 to 40% by mass, more preferably from 10 to 30% by mass relative to a total amount of the copolymerized polyester resin and the cross-linker in the covering layer (100% by mass). If the content of the cross-linker becomes more than 40% by mass, the covering layer tends to be fragile, and in a processing step after forming a functional layer such as a hard coat layer and a diffusion layer comprising an acrylate resin, adhesion enough to resist cutting at a high speed may not be obtained sufficiently. On the other hand, if a content of the cross-linker is less than 5% by mass, durability required in recent years may not be obtained. In the coating liquid, a catalyst may be added as required in order to promote cross linkage.

(c) Solvent

In the present invention, a solvent includes not only a liquid for dissolving a resin, but it includes, in a broad sense, a dispersion medium used for dispersing a resin in particle form. In order to implement the present invention, various solvents such as an organic solvent and an aqueous solvent may be used.

A solvent used for the coating liquid is preferably a mixture wherein water and an alcohol such as ethanol, isopropyl alcohol, and benzyl alcohol are mixed in an amount of 30 to 50% by mass relative to the entire coating liquid. Further, if it is less than 10% by mass, an organic solvent other than an alcohol may be mixed within such a range that it is capable of being dissolved. However, in the coating liquid, a total of the alcohols and other organic solvents is to be less than 50% by mass.

If an amount of the organic solvents to be added is less than 50% by mass relative to the entire solvent, there is an advantage that an appearance of the coated layer is improved compared to adding water alone, as well as an improvement of drying property during coating and drying. When an amount of the organic solvent to be added is 50% by mass or more relative to the entire solvent, evaporation rate of the solvent becomes faster, and a concentration of the coating liquid is to change readily during coating. As a result, viscosity of the coating liquid becomes higher and coating performance becomes lower, which may cause poor appearance of the coated film. Further, due to volatilization of the organic solvent, there will be a higher risk of fire and the like. Additionally, if an amount of the organic solvent to be added is less than 30% by mass relative to the entire solvent, a ratio of water relatively increases and a polyurethane component having high hydrophilicity is segregated on the surface of the covering layer, so that it will be difficult to obtain the surface fraction of PEs on the surface of the covering layer in a final resultant laminated thermoplastic resin film within the range defined by the present invention.

(d) pH Adjustment of Coating Liquid

In the present invention, a coating liquid used for forming a covering layer preferably has a pH within a range of 5 or more and less than 8. If pH of the coating liquid is less than 5, surface fraction of PEs tends to get larger than the range defined by the present invention, and tends to be poor in adhesion. On the other hand, if pH of the coating liquid is 8 or more, a conspicuous aggregation may occur depending on type of particles and haze will be higher and transparency will be deteriorated, so that it is not preferable. A pH adjustment agent is not particularly limited as long as it does not affect negatively on adhesion, blocking resistance, and coating performance or as long as the effect is negligible. For example, sodium hydrogen carbonate or sodium carbonate may be used in case of increasing pH, while an acetic acid and the like may be used in case of lowering pH.

(e) Concomitant Use of Surfactant

When the aqueous coating liquid is coated on a surface of the base film, a surfactant is generally used in order to improve wettability to the film and to coat the coating liquid uniformly. In the present invention, other than the purpose, a surfactant may be used in order to control a particular surface fraction of PEs in a covering layer.

Type of the surfactant is not particularly limited as long as it is capable of obtaining an excellent coating performance and a surface fraction of PEs defined in the present invention.

Among surfactants, in order to obtain an excellent coating performance with a slight amount of addition, a fluorinated surfactant is preferred. Further, in order to obtain surface fraction of PEs defined in the present invention, a cationic surfactant or a nonionic surfactant is preferably blended in an amount of 0.01 to 0.18% by mass relative to the coating liquid.

When an anionic surfactant is used, as shown above, compatibility with a copolymerized polyester and a polyurethane may occasionally be enhanced, so that it will be difficult to obtain the phase separation structure defined in the present invention. An amount of the surfactant to be added may be suitably selected within a range that does not inhibit adhesion to a functional layer such as a hard coat layer and a diffusion layer and that an excellent coating performance is obtained. For example, in a case of a fluorinated surfactant, it is preferably from critical micelle concentration relative to pure water to 30 times as much the concentration. If it is more than 30 times the critical micelle concentration, particles contained in the coating liquid tend to be readily aggregated, so that haze of the resultant laminated film becomes higher, and thus it is not preferable as a base film for an optical functional film or an optical functional sheet. Further, there may be a case that a surfactant component bleeds out on the surface of the covering layer to affect negatively on adhesion. On the other hand, if it is not more than the critical micelle concentration, an excellent coating performance may not be obtained. Additionally, it will be difficult to control surface fraction of PEs within the range defined in the present invention.

(Purification of Surfactant)

A surfactant used in the present invention is preferably a purified surfactant. Many of surfactants on the market, in general, contain a slight amount of impurities. In particular, polyethylene glycol which is an impurity may occasionally inhibit obtaining an excellent phase separation structure depending on a content thereof. In order to prevent it, it is preferred to use a surfactant purified by a pretreatment for removing impurities therefrom.

As the pretreatment step for removing impurities, a method is not particularly limited as long as it does not change qualities of the surfactant and is capable of removing impurities. For example, there may be listed a following method:

a method wherein at least a surfactant and polyethylene glycol are dissolved in a soluble organic solvent and the mixture is kept still under a low temperature to subject the surfactant which is a main component to saturated precipitation followed by filtration, thereby obtaining a surfactant with improved purity. In a case of a perfluoroalkyl ethylene oxide adduct-based surfactant, it is heat-dissolved into isopropyl alcohol on a warm bath at 30° C. followed by being kept still at 0° C. for about 24 hours to filtrate and remove deposition, thereby obtaining a surfactant with improved purity.

(f) Particles

It is important that the laminated thermoplastic resin film of the present invention has a haze of 1.5% or less when used as a base film for an optical functional film or an optical functional sheet where transparency is highly required. The haze is further preferably 1.0% or less. The haze of more than 1.5% is not preferred because when the film is used as a lens film for LCD, abase film for backlight and the like, a definition of a screen will be lowered.

In order to make a haze of the laminated thermoplastic resin film of the present invention 1.5% or less, particles are preferably not contained in the base film. When the particles are not contained in the base film, in order to improve scratch resistance of the covering layer and handleability thereof when winding into a roll or winding off (such as slipperiness, traveling performance, blocking performance, easiness of releasing air introduced while winding the film), particles with an appropriate size are preferably contained in the covering layer in a specific amount to form a moderate concavity and convexity on the surface of the covering layer.

As the particles, particles having affinity with a copolymerized polyester resin or a polyurethane resin is preferred, and preferably there is difference in the affinity with the two resins to the extent that the particles are distributed unevenly in either of the two phases. By distributing the particles unevenly in one of the phase-separated resins, particles are concentrated in moderation, so that by adding a relatively small amount of the particles, namely, an excellent blocking resistance is obtained without increasing the haze to a large degree.

As the particles contained in the covering layer, there may be listed inorganic particles such as calcium carbonate, calcium phosphate, amorphous silica, a crystalline glass filler, kaolin, talc, titanium dioxide, alumina, silica-alumina complex oxide particle, barium sulfate, calcium fluoride, lithium fluoride, zeolite, molybdenum sulfide, mica, and heat-resistant polymer particles such as cross-linked polystyrene particles, cross-linked acrylic resin particles, cross-linked methacrylic acid methyl-based particles, benzoguanamine-formaldehyde condensate particles, melamine-formaldehyde condensate particles, and polytetra fluoroethylene particles.

Among these particles, silica particles are preferable in view of following points.

A first advantage is that since refractive index thereof is relatively close to a resin component of the covering layer, so that a highly transparent film is readily obtained. A second advantage is that silica particles are characterized by a tendency to be distributed unevenly in a phase separated polyurethane resin phase, and properties specific to a polyurethane resin such as a poor blocking resistance of the polyurethane resin phase present on the surface of the covering layer is complemented. It is assumed to be because surface energy of the silica particle and the polyurethane resin are closer than that of copolymerized polyester resin and thus they have high affinity.

A shape of the particles is not particularly limited, but particle having a shape close to spherical shape is preferred in view of providing smoothness.

A content of the particles in the covering layer is preferably 20% by mass or less, more preferably 15 & by mass or less, particularly preferably 10% by mass or less relative to the covering layer. If the content of the particles in the covering layer is more than 20% by mass, transparency is deteriorated, in addition, adhesion of the film tends to be insufficient. On the other hand, a lower limit of the content of the particles is to be preferably 0.1% by mass, more preferably 1% by mass, particularly preferably 3% by mass relative to the covering layer.

Two or more kinds of particles having different average particle sizes may be contained in the covering layer. Further, a same kind of particles having different average particle sizes may be included, too. In any case, it is acceptable if an average particle size and a total content of the particles are within the above ranges. When coating the coating liquid, it is preferable to provide a filtering medium for subjecting the coating liquid to microfiltration just before coating in order to remove coarse aggregates of particles in the coating liquid.

Further, an average particle size of the particles is preferably from 20 to 150 nm, more preferably from 40 to 60 nm. If the average particle size is less than 20 nm, it will be difficult to obtain sufficient blocking resistance, and scratch resistance will tend to be deteriorated. On the other hand, if the average particle size of the particles becomes more than 150 nm, the haze becomes higher and the particles will readily drop out, so that it is not preferable.

In the present invention, sufficient blocking resistance and scratch resistance may not be obtained with particles A having an average particle size of 20 to 150 nm alone. Therefore, in order to further improve blocking resistance and scratch resistance, it is preferable to use a small amount of particles B having a larger average particle size together. The average particle size of particles B having a larger average particle size is preferably from 160 to 1000 nm, more preferably from 200 to 800 nm. If the average particle size of particles B is less than 160 nm, scratch resistance, slipperiness, and winding performance may be deteriorated. On the other hand, if the average particle size of particles B is more than 1000 nm, haze tends to become higher. Particles B are preferably aggregate particles in which primary particles are aggregated, and from a point of scratch resistance, particles whose average particle size in aggregated state is not less than 4 times larger than an average particle size of primary particles is preferably used.

When using two kinds of particles, for example, a ratio of content of particles A (average particle size: 20 to 150 nm) to particles B (average particle size: 160 to 1000 nm) in the covering layer (A/B) is to be from 5 to 30, and a content of particles B is to be from 0.1 to 1% by mass relative to a solid content of the covering layer. Controlling the content of two kinds of particles having the specific diameters within the above range is preferable for optimizing average surface roughness of three-dimensional center-plane of the surface of the covering layer and for balancing transparency, handleability and blocking resistance. If the content of particles B becomes more than 1% by mass relative to the covering layer, the haze will tend to rise sharply.

Measurement of the average primary particle size and the average particle size of the particles are carried out by a following method.

The particles are photographed by an electron microscope at a magnification wherein a size of a smallest particle becomes 2 to 5 mm, and a largest particle diameter of each of 300 to 500 particles is measured and an average value thereof is determined to be an average primary particle size or an average particle size. To obtain an average particle size of the particles in the covering layer of the laminated film, transmission electron microscope (TEM) is used to photograph a cross section of the laminated film at a magnification of 120,000 times so as to obtain a largest diameter of a particle present in the cross section of the covering layer. An average particle size of particles B comprising aggregates is measured by taking photographs of 300 to 500 particles in a cross section of the covering layer of the laminated film using an optical microscope at a magnification of 200 times, thereby measuring a largest diameter thereof.

(3-2) A Coating Step

A step for coating the aqueous coating liquid is preferably carried out by inline coating method wherein coating is performed during a production step of the film. More preferably, the aqueous coating liquid is coated on a base film before completion of crystalline orientation. A solid concentration in the aqueous coating liquid is preferably 30% by mass or less, particularly preferably 10% by mass or less. A lower limit of the solid concentration is preferably 1% by mass, more preferably 3% by mass, particularly preferably 5% by mass. A film coated with the aqueous coating liquid is introduced to a tenter for orientation and heat fixation and is heated therein to form a stable coating by heat-crosslinking reaction to be made into a polyester laminated film.

(Amount of Coating)

An amount of coating when being undried (hereinafter abbreviated as wet amount of coating) is preferably 2 g/m$^2$ or more and less than 10 g/m$^2$. In order to obtain a designed dry amount of coating (amount of coating of final covering layer) when the wet amount of coating is less than 2 g/m$^2$, a solid concentration of the coating liquid needs to be increased. When a solid concentration of the coating liquid is increased, viscosity of the coating liquid will become higher, so that streak-shaped coated spots tend to be formed. On the other hand, if the amount of coating is 10 g/m$^2$ or more, the coating liquid tends to be subject to an influence of drying air in a drying furnace, so that the unevenness of coating is readily formed. In order to prevent shortcomings due to adhesion of dusts, it is preferable to coat the coating liquid under an environment with a degree of cleanness of class 5000 or less.

A final amount of coating (amount of solid content per unit area of the film) of the covering layer is preferably controlled within a range from 0.005 to 0.20 g/m$^2$. In prior art, it is difficult to obtain sufficient adhesion if the amount of coating is less than 0.05 g/m$^2$. However, when the covering layer has a specific phase separation structure, a laminated film excellent in adhesion to a functional layer and a base film is obtained even if an amount of coating is less than 0.05 g/m$^2$. If the amount of coating is less than 0.005 g/m$^2$, adhesion becomes insufficient. If the amount of coating is less than 0.05 g/m$^2$, particles having an average particle size of 60 nm or less are preferably used. If the average particle size of the particles becomes more than 60 nm, the particles will easily drop out from the covering layer. When the particles are distributed unevenly in the polyurethane phase, the particles are less apt to drop out as long as the amount of coating is 0.005 g/m$^2$ or more. On the other hand, if the amount of coating becomes more than 0.20 g/m$^2$, polyurethane resin components segregated on the surface of the covering layer increase, so that blocking resistance becomes lower.

A thickness of the covering layer can be measured by cutting a cross section of the covering layer by a microtome to observe by an electron microscope, but when the covering layer is soft, it may be deformed when being cut. For convenience, if the amount of coating is already known, the thickness is calculated from a density of the covering layer. For example, when the density of the covering layer is 1 g/cm$^3$, and if the amount of coating is 1 g/m$^2$, the thickness will be around 1 μm. The density of the covering layer is estimated by calculating a density of each material from the kind of resin and particles constituting the covering layer, and multiplying the density of each material by a mass ratio of the material and figuring out a sum thereof, thereby a thickness of the covering layer is estimated.

(3-3) Drying Step

In a method for producing a laminated thermoplastic resin film of the present invention, after the coating of the coating liquid on a base film, a thinly coated coating film is dried. In general, when the coating film is dried after the coating of the coating liquid, in many cases, a preheat zone of a tenter is used for drying. In this case, it generally takes at least about 5 seconds from the coating to the start of the drying, although the time also depends on a size of film-forming equipment and a running speed of the film. During the time, a balance between water and an alcohol which are solvents of the coating liquid is disrupted, so a polyurethane component having high hydrophilicity will be readily segregated on the surface of the covering layer. Therefore, in a laminated thermoplastic resin film to be obtained finally, it will be difficult to control the surface fraction of PEs on the surface of the covering layer within a specific range. A significant point of the present invention is that a drying furnace (pre-dryer) used solely for drying a coating film is positioned as close to an outlet of the coating equipment in a direction of movement of the film as possible, and that the polyester film is dried immediately after the coating liquid is coated thereon.

In the drying furnace, a temperature of drying air blowing on a coated face is preferably 120° C. or more and less than 150° C. Additionally, a wind speed is preferably 30 m/second or more. A further preferable drying temperature is 130° C. or more and less than 150° C. If the drying temperature is less than 120° C. or if the wind speed is less than 30 m/second, a drying speed becomes slow, so that a balance between water and an alcohol which are solvents of the coating liquid is disrupted and a percentage of water in the covering layer will tend to increase. Therefore, a polyurethane component having high hydrophilicity is segregated on the surface of the covering layer, so that it will be difficult to obtain a surface fraction of PEs defined in the present invention in a laminated thermoplastic resin film which is to be obtained finally. On the other hand, when the drying temperature is 150° C. or more, crystallization of the base film will tend to occur easily, so that an occurrence of rupture during transversal stretching becomes more frequent.

Further, in the drying furnace, drying is preferably performed for 0.1 to 5 seconds while maintaining a temperature at 120° C. or more and less than 150° C. The drying time is more preferably from 0.5 to 3 seconds. If the drying time is less than 0.1 second, the drying of the paint film becomes insufficient, so that when passing through rolls positioned between a drying step and a transversal stretching step, the film will tend to contaminate the roll easily with an insufficiently dried coated face thereof. On the other hand, if the drying time becomes more than 5 seconds, the crystallization of the base film will apt to occur, so that an occurrence of rupture during transversal stretching will become more frequent.

Immediately after the coating film is dried in the drying furnace at a temperature of 120° C. or more and less than 150° C., the laminated film having the covering layer is preferably cooled down nearly to a room temperature. If the laminated film comes out of the drying furnace and comes in contact with the rolls which are at around a room temperature while the surface temperature of the laminated film is still high at 100° C. or more, scratch will be more likely to occur due to contraction of the film.

When a wind speed inside the drying furnace is set at 30 m/second or more, strong drying air blows on an undried coated face in the drying furnace, so that a drying unevenness will apt to generate. However, in the present invention, by discharging air in a same or greater volume than the volume of blowing air outside the drying furnace, it will be possible to dry at a wind speed of 30 m/second or more. Further, it is important that the discharged air is made to flow to an opposite side of a coater to prevent generation of irregularity on the coated face due to the discharged air at the coater.

It is important that a transit time of the film from immediately after the coating to entering the drying furnace is less than 2 seconds, preferably less than 1.5 seconds. If the time from coating to entering the drying furnace is 2 seconds or more, a balance between water and an alcohol which are solvents of the coating liquid is disrupted, so that a polyurethane component having high hydrophilicity will apt to be segregated on the surface of the covering layer. Therefore, in a laminated thermoplastic resin film to be obtained finally, it will be difficult to make the surface fraction of PEs on the surface of the covering layer within a specific range.

In order to maintain the transit time of the film from immediately after coating to a entrance to the drying furnace for less than 2 seconds, it is necessary to suitably select a running speed of the film, and it is preferable that a coater and an inlet of the drying furnace are positioned as close to each other as possible. In the drying furnace, in order to prevent incorporation of dusts from the drying air, air purified by a HEPA filter is preferably used. The HEPA filter to be used then is preferably a filter with nominal filtration accuracy of 0.5 μm or more having a capability of removing 95% or more dusts.

A drying step is preferably constituted by what are called drying zones divided into 2 to 8 zones wherein conditions of drying temperature and drying time are sequentially changed in each zone. Particularly preferably, multi-staged drying equipment divided into 3 to 6 zones is employed. For example, when the coating liquid is coated on one side or both sides of a uniaxial orientated thermoplastic resin film and then the film is dried by a multi-staged furnace positioned directly above the coater, a following method is preferred.

For example, when drying is performed in four stages, it is carried out in a drying furnace divided into 4 drying zones. Among such method is one in which the drying is carried out at a temperature of 125 to 140° C. for 0.1 to 4 seconds in a first drying zone, at a temperature of 55 to 100° C. for 0.1 to 4 seconds in a second drying zone, at a temperature of 35 to 55° C. for 0.1 to 4 seconds in a third drying zone, and at a temperature of 25 to 35° C. for 0.1 to 4 seconds in a fourth drying zone.

There is some fluctuation of a numerical range of the drying conditions depending on a solid concentration of the coating liquid, and the above representative conditions do not limit the numerical range. Further, it is important that when heat drying is carried out, air volume is changed in each stage.

For example, a following method is preferred.

In the first drying zone, a wind speed of drying air is set at 20 to 50 m/second, supply air volume of the drying air at 100 to 150 m$^3$/second, and exhaust air volume at 150 to 200 m$^3$/second. From the second drying zone to the fourth drying zone, supply air volume is set at 60 to 140 m$^3$/second, exhaust air volume at 100 to 180 m$^3$/second. In any drying zone, they are set in such a manner that the drying air does not flow into the coater side, and next, with the film side edges clipped, the film is introduced to hot air zone at a temperature of 100 to 140° C., and wind speed of 10 to 20 m/second, followed by stretching in width direction to from 2.5 to 6 times.

Further, drying temperature and a total drying time may be suitably adjusted from 0.1 to 5 seconds, preferably from 0.5 seconds to less than 3 seconds while the temperature is maintained from 120° C. to 150° C. The appropriate values in each zone in the drying step is determined on a production floor in consideration of conditions such as concentration of dispersion liquid, an amount of coating, running speed of a moving film which has been coated, temperature of hot air, wind speed, and air volume.

(3-4) Heat Fixation Treatment Step

In a method for producing a laminated thermoplastic resin film of the present invention, transversal stretching step, heat fixation treatment step, and cooling step are divided sequentially into 10 to 30 zones, and each zone is partitioned to enable temperature control independently and is designed to prevent a sharp temperature change between each zone. In particular, by increasing the temperature step by step from a last half of the transversal stretching zone to a zone set at a maximum heat fixation temperature, a sharp temperature rise between neighboring zones is suppressed. In the present invention, when producing a laminated thermoplastic resin film having a unique phase separation structure on a surface of a covering layer, temperature control is very important particularly in a drying step and a heat fixation treatment step. Additionally, in order to form a cross-linked structure on a resin constituting the covering layer, temperature in the heat fixation treatment step is extremely important, and the temperature greatly affects a speed of cross-linking reaction. The embodiment will be detailed below.

As described above, in the heat fixation treatment step of the present invention, conditions of phase separation of the covering layer depend on heat treatment conditions. Namely, it is important to suitably set a maximum temperature of the heat fixation treatment step, a time required to reach the maximum temperature, and a time required to reach from a temperature at which phase separation of the covering layer starts to progress conspicuously to a maximum temperature in the heat fixation treatment step.

A temperature in each heat fixation zone in the heat fixation treatment step is slightly different depending on a kind of resin constituting a thermoplastic resin film which is a base film, but it is suitably set within a temperature range from 100 to 260° C. In the following, an explanation will be provided with reference to an example in which polyethylene terephthalate, a typical thermoplastic resin, is used as a base film.

The maximum temperature in the heat fixation treatment step is preferably controlled from 210 to 240° C.; more preferably, a lower limit thereof is 225° C., and an upper limit thereof is 235° C. In general, in an early stage of the heat fixation treatment, it is often the case that the heat fixation is carried out at a relatively high temperature from 210 to 240° C., and in later stages, the temperature is lowered in each stage sequentially from 100 to 200° C.

If the maximum temperature of the heat fixation treatment step is less than 210° C., it tends to be difficult to form a microphase-separated structure or a nanophase-separated structure on the covering layer. Therefore, it will be difficult to obtain sufficient adhesion between a base film and a functional layer which can resist delamination at an interface due to an impact during cutting at a high speed required in recent years. Further, since a heat shrinkage rate of a resultant laminated film gets large, it is not preferable.

When the maximum temperature in the heat fixation treatment step becomes more than 240° C., the surface fraction of PEs on the surface of the covering layer becomes large, so adhesion to a functional layer such as a hard coat layer, a diffusion layer, a prism layer, and a print layer printed with an ultraviolet curable ink is apt to become low. Further, since a time required to reach from a temperature at which phase separation of the covering layer starts to progress conspicuously to a maximum temperature of heat fixation treatment becomes longer, there will be dotted points wherein a narrowest part of the polyester phase comprising a copolymerized polyester resin as a main component is more than 1 μm in width. As a result, a part poor in adhesion to the functional layers such as the hard coat layer, the diffusion layer, the prism layer, and the print layer printed with ultraviolet curable ink is locally formed, which may lead to macroscopic delamination starting from the part as the points of origin.

Specifically, the time required to reach from a temperature at which the phase separation of the covering layer starts to progress conspicuously to the maximum temperature of heat fixation treatment is preferably set as described in the following.

In the present invention, a transit time of the film from the zone set at the temperature at which the phase separation of the covering layer starts to progress conspicuously to an inlet of the zone set at the maximum temperature in the heat fixation treatment step is preferably 3 seconds or more and less than 20 seconds, particularly preferably 4 seconds or more and less than 15 seconds.

If the transit time is less than 3 seconds, a time for developing the phase separation structure defined in the present invention may become insufficient. On the other hand, if the transit time is 20 seconds or more, a phase separation will progress excessively, so that it will tend to be in a state where there are dotted points wherein a narrowest part of the polyester phase comprising a copolymerized polyester resin as a main component is more than 1 μm in width. As a result, parts having poor adhesion to functional layers such as a hard coat layer, a diffusion layer, a prism layer, a print layer printed with UV ink are formed locally, which may lead to macroscopic delamination starting from the parts as the points of origin.

In the present invention, the temperature at which the phase separation of the covering layer starts to progress conspicuously is estimated to be about 200° C. within a range of a composition of the coating liquid shown in Examples of the present invention. However, the temperature is different depending on a resin component of the covering layer, so it is not limited to this estimated temperature.

In the following, the heat fixation treatment step will be explained further in detail.

In general, the transversal stretching step, the heat fixation treatment step, and the cooling step are divided into 10 to 30 zones and the temperature is controlled in each zone independently, in order to prevent a sharp temperature change between neighboring zones. In particular, from a last half of the transversal stretching zone to the zone set at the maximum temperature of the heat fixation treatment step, it is preferable that a sharp temperature change between each of the heat fixation zones is prevented by increasing a temperature of each zone step by step in a direction of movement of the film.

In the present invention, it is important that the transit time of the film from the zone set at a temperature at which a phase separation of the covering layer starts to progress conspicuously to an inlet of the zone set at the maximum temperature of the heat fixation treatment step is increased swiftly and uniformly. In order to increase the temperature swiftly, a method increasing heat transfer efficiency in each heat fixation zone such as a method increasing wind speed of hot air blowing on the film is effective. However, generally a temperature irregularity is apt to be generated by the method, so that irregularities may generate in a state of phase separation of the covering layer, or foreign matter such as an oligomer adhering in a slight amount in the equipment inside the heat fixation zone rise up, and the rising foreign matter may adhere to the film, leading to an optical defect.

On the other hand, if the wind speed is too slow, sufficient speed of temperature rise may not be obtained. Therefore, in the present invention, the wind speed is preferably at 10 m/second or more and less than 20 m/second. In order to rise the temperature of the laminated film swiftly and uniformly, a method wherein nozzles for spraying hot air are placed at a relatively short interval of 500 mm or less is effective. In a case where the nozzles for spraying hot air are placed at an interval of 500 mm or less, for example, when the nozzles are placed at intervals of 300 mm, 350 mm, and 400 mm, it is disadvantageous for maintenance of equipment, but it is important for completing the present invention. The number of the nozzle for 1 zone which corresponds to one stage is to be about 6 to 12, and the number is determined in consideration of the conditions of the intervals of the nozzles, ventilation air volume, and ventilation time. Here, wind speed described in the present invention means a wind speed at the film surface facing an outlet of a hot air blowing nozzle measured using a thermal anemometer (Anemomaster Model 6161 produced by Japan Kanomax Co.).

A preferred embodiment of a heat fixation treatment step according to the present invention will be shown in the following.

The heat fixation treatment step is sequentially divided into a plurality of heat fixation zones, and each zone is partitioned so as to enable temperature control independently. The heat fixation zones are preferably divided in steps of 2 to 10 stages wherein heat fixation zones are sequentially arranged, preferably steps of 4 to 8 stages, and a temperature of the laminated film is preferably controlled in each of the heat fixation zones divided in a plurality of stages.

For example, in a case of a polyester film having a covering layer, as described below, there can be listed a method wherein the film passes through the heat fixation zones divided in 6 stages sequentially, and is subjected to heat fixation treatment under a temperature subtly different in each stage followed by trimming of both side edges of uncoated part of the film. The temperature for the heat fixation treatment is to be 200° C. in a first heat fixation zone, 225° C. in a second heat fixation zone, 230° C. in a third heat fixation zone, 230° C. in a fourth heat fixation zone, 210° C. in a fifth heat fixation zone, 170° C. in a sixth heat fixation zone, and 120° C. in a seventh heat fixation zone. Further, the film is subjected to relaxation treatment of 3% in width direction in the sixth heat fixation zone.

The stage described above corresponds to one heat fixation zone. As just described, it is preferable that there is subtle difference in a temperature in the heat fixation zone of each stage, namely, difference in temperature of about 5 to 40° C. The setting of difference in temperature is decided at discretion in consideration of various factors such as a running speed of a thermoplastic resin film having a covering layer, air volume and thickness of the covering layer.

When used as a base film of an optical functional film such as a lens film and a diffuser plate or an optical functional sheet, even if it is a relatively thick film having a film thickness of 100 μm or more, a film length thereof is normally at least 1000 m or more, sometimes 2000 m or more in a wound roll shape, and it will be fed into a processing step for laminating a prism layer and a diffusion layer.

In the present invention, when an area ratio (surface fraction of PEs) of polyester phase A (which indicates a dark phase in phase image) on the surface of the covering layer is measured in a longitudinal direction of the film at intervals of 100 m, difference between a maximum value and a minimum value of the surface fraction of PEs on the surface of the covering layer in a longitudinal direction is preferably 15% or less, more preferably 10% or less. By making the difference between the maximum value and the minimum value of the surface fraction of PEs on the surface of the covering layer in a longitudinal direction 15% or less, a laminated thermoplastic resin film roll having stable adhesion and blocking resistance is obtained.

In order to control the difference between the maximum value and the minimum value of the surface fraction of PEs on the surface of the covering layer in a longitudinal direction at 15% or less, it is important to maintain constant conditions of film-forming such as a composition of the coating liquid, coating conditions, drying conditions and heat fixation conditions during production of a laminated thermoplastic resin film roll of the present invention. However, particularly a ratio of mix solvent used for a coating liquid is apt to fluctuate, so ingenuity for maintaining the ratio of the mixed solvent constant is important in reducing the fluctuation of the surface fraction of PEs of the film roll in a longitudinal direction. In the present invention, for example, by a method shown hereinafter, a range of the fluctuation of the surface fraction of PEs may be controlled to 15% or less. However, a method for maintaining the ratio of the mixed solvent constant is not limited to the following method.

It is effective for stabilizing a concentration ratio of the mixed solvent to increase a capacity of a circulation tank (FIGS. 7. 13) relative to a capacity of a tray for coating liquid (FIGS. 7. 11). Specifically, as shown in FIG. 7, when the capacity of the tray for the coating liquid is 1, a capacity ratio of the circulation tank is preferably 10 or more, particularly preferably 50 or more. If the capacity ratio (capacity of circulation tank/capacity of tray for coating liquid) is less than 10, in other words, if the capacity of the circulation tank is too small, fluctuation of the concentration ratio of the mixed solvent is likely to become large.

Further, when the capacity of the circulation tank is 1, the capacity ratio of a preparation tank (FIGS. 7. 14) is preferably 10 or more, particularly preferably 20 or more. This enables to keep the capacity of the circulation tank during operation constant when supplying the coating liquid from the preparation tank to the circulation tank.

It is also effective for reducing the fluctuation of the surface fraction of PEs of the film roll in a longitudinal direction to increase the accuracy of applicator roll (circularity and cylindricity) of coating equipment.

As shown in JIS B 0621, the circularity of the applicator roll is an index represented by difference between radiuses of two concentric circles by minimum zone method determined using a recording-type circularity measurement device. A unit for circularity of the roll is mm. Cylindricity of the applicator roll is an index represented by ½ of a maximum difference of measured values obtained when a stand with a micrometer with the roll placed on a surface plate thereof is made to move in a direction of an axis line and to perform a measurement in various measurement planes over an entire length while a probe is put on top of the roll. A unit for cylindricity is mm.

In the present invention, by improving the roll accuracy (circularity and cylindricity), irregularity of thickness of the coated layer in a direction of length may be reduced. Specifically, it is preferred that the roll accuracy (circularity and cylindricity) is less than 5/1000 mm.

Further, when coating the coating liquid, by making surface finish of each of the roll of a reverse coater 0.3 S or less and making accuracy (circularity and cylindricity) of applicator roll and metering roll less than 5/1000 mm and 2/1000 mm or more, fluctuation of an amount of wet coating may be suppressed and irregularity of a paint film may be suppressed too. Preferably, a coating roll having an applicator roll and a metering roll whose accuracy (circularity and cylindricity) is 3/1000 mm is used.

By making a tension of the film 4000 to 10000 N/width of an original fabric (width of original fabric is from 1 to 2 m), planarity of the film is maintained in an industrial scale and transcript amount of the coating liquid becomes uniform. Tension of the film differs depending on a thickness of the film, and planarity of a relatively thin film is maintained by applying lower tension.

If the tension of the film becomes more than 10000N/width of original fabric, original fabric of the film may be deformed or ruptured. On the other hand, when the tension of the film is less than 4000 N/width of the original fabric, planarity of the film during coating may become insufficient or film meandering may occur. As a result, transcript amount of the coating liquid becomes uneven in a direction of length of the film, and the amount of wet coating of the film fluctuates widely, so that irregularity of thickness of the coated layer will become larger.

In order to control difference between a maximum value and a minimum value of the surface fraction of PEs of the film roll in width direction 10% or less, it is important to reduce irregularity of thickness of the coated layer of the film roll in width direction. For this purpose, it is effective to improve planarity thereof in width direction during coating. Specifically, after coating by a reverse roll, only both side edges of the film are gripped using an pinch roll (FIGS. 7, 16). By gripping the both side edges of the film with the pinch roll, planarity of the film in an industrial scale is improved so that the amount of wet coating of the film in width direction is stabilized. This may reduce irregularity of the coated layer of the film roll in width direction. If both side edges of the film are not gripped with the pinch roll, the amount of wet coating of the film in directions of width and length fluctuate widely, so that irregularity of thickness of the coated layer becomes large.

EXAMPLES

Next, composition, effects and production method of the laminated thermoplastic resin film of the present invention will be explained using Examples and Comparative Examples, but needless to say, the present invention is not limited to these Examples. Further, a following method was used for properties and evaluation of each of the films in Examples.

(1) Surface fraction of PEs (1-1) Evaluation of Phase Separation Structure

Evaluation of phase separation of the covering layer structure was performed using scanning probe microscopy (SPI3800N system/SPA300 produced by SII Nano Technology Inc.) in phase measurement mode (phase mode). In a phase image, the larger the phase-lag is, the lighter the phase image is expressed, while the smaller the phase-lag is, the darker the phase-image is. A smaller phase-lag means that it is harder or adhesiveness thereof is smaller than other phases. In a covering layer of a laminated thermoplastic resin film of the present invention, a dark phase is polyester phase A and a light phase is a polyurethane layer.

Principle of measurement of phase measurement mode in a scanning probe microscopy is described in PDF document in section on Phase in "1-2. Application (in each mode)" on the website of SII NanoTechnology Inc. (http://www.siint.com/technology/probe_applications.html).

As a main cantilever used for the measurement, DF3 (spring constant: about 1.6 N/m) was used, and in order to prevent lowering of sensitivity and resolution due to contamination of a probe, a new one is always used. Further, an observation was carried out in resolution of 512×512 pixel or more, and an observation field was 5 µm×5 µm. Measurement parameters such as a rate of decrease of amplitude, scanning rate, and scanning frequency of the cantilever are set to such conditions that observation by line scanning is performed with a best sensitivity and resolution.

The phase mode image obtained as above (bitmap format, 512×512 pixel) was read into an image processing software program (Photoshop ver 7.0 produced by Adobe), and was shown on a display in such a manner that a size of the image was 205 mm×205 mm (refer to FIGS. 1 and 8). Next, with a pencil tool of the software program (master diameter: 3 px), a black line was drawn on a boundary between a light phase and a dark phase to clarify the border between two phases (refer to FIGS. 2 and 9). Further, using a fill tool of the software, the dark phase was filled in black and the light phase was filled in white for binarization (refer to FIGS. 3 and 10). At the time, dark spots in the light phase having a diameter of 2 mm or less in size on the screen were judged as particles distributed unevenly in the light phase, and were filled in white. For example, when using silica particles, uneven distribution in the light layer could be recognized.

(1-2) Measurement of Surface Fraction of PEs (1-2-1) Image Analysis Method

With respect to the binarized image, a histogram wherein brightness (black and white) was determined as horizontal axis and a degree as longitudinal axis was displayed using the software, and an area ratio of the black part was calculated to obtain a surface fraction of PEs.

(1-2-2) Paper Weight Method

Measurement of the surface fraction of PEs can be performed using paper weight method besides the image analysis method. The process of measurement is as follows.

The phase mode image obtained as above was saved as a bitmap format digital image. Next, the image was printed out on A4 size high-quality paper by a printer (DocuPrint C830 produced by Xerox). With respect to the printed image (200 mm×200 mm), in a bright room under a light of 500 lux, a boundary of the light phase and the dark phase in the image checked with eyes was clarified with 4B pencil. In this case, the dark phase having a diameter of 0.1 µm or less present in the light phase were confirmed to be the particles included in the covering layer unevenly distributed in the light phase, so that a boundary was not drawn and was regarded as being included in the light phase. After that, the light phase and the dark phase were divided by cutting on the boundary clarifying the phases using a utility knife, and the mass of the paper for the light phase (polyurethane layer (B)) and the dark phase (polyester phase A) was measured to calculate the mass ratio of the dark phase (polyester phase A) by %, which was determined to be the surface fraction of PEs.

(1-2-3) Range of Fluctuation on the Surface Fraction of PEs (Difference Between Maximum Value and Minimum Value)

(a) Longitudinal Direction of a Film Roll

A laminated thermoplastic resin film roll having a length of 1000 m or more and a width of 50 mm or more was wound off, and an area ratio (surface fraction of PEs) of polyester phase A (which indicates a dark phase in phase image) on the surface of the covering layer was measured in following spots with respect to a longitudinal direction (MD) of the film to calculate difference between a maximum value and a minimum value of the obtained surface fraction of PEs.

With respect to measurement of the surface fraction of PEs on the surface of the covering layer, when one end of a constant region where the film properties are stable is to be a first end and the other end is to be a second end, a first measurement was carried out within 2 m from the first end, and a final measurement was carried out within 2 m from the second end, and at the same time, measurements were conducted at every 100 m from the point of the first measurement, too.

(b) Width Direction of the Film Roll

A laminated thermoplastic resin film roll with a length of 1000 m or more and a width of 50 mm or more was wound off, with respect to a width direction (TD) of the film, the film was divided equally in width direction into 4 to measure an area ratio (surface fraction of PEs) of polyester phase A (which indicates a dark phase in phase image) on a surface of the covering layer at a central part of each, thereby obtaining difference between a maximum value and a minimum value of a surface fraction of PEs on a surface of the covering layer in width direction. The measurement may be carried out with a jumbo roll before the film in the width direction is slit into narrow sizes.

(2) Presence or Absence of a Point Where a Width of Polyester Phase A is More Than 1 µm at a Minimum In the printed phase mode images of the 10 different points of measurement obtained above, presence or absence of a point wherein a width of polyester phase A comprising a copolymerized polyester resin as a main component in a short axis direction is more than 1 µm at a narrowest part thereof was examined.

(3) Fractal Dimension

Using the scanning probe microscopy (SPI3800N system/SPA300 produced by SII Nano Technology Inc.), the phase mode image (bitmap format, 512×512 pixel) obtained in phase measurement mode (phase mode) was read into an image processing software program (Photoshop ver 7.0 produced by Adobe) and was shown on a display in such a manner that a size of the image was 205 mm×205 mm (refer to FIGS. 1 and 8). Next, with a pencil tool of the software (master diameter: 3 px), a black line was drawn on a boundary between a light phase and a dark phase to clarify the border between two phases (refer to FIGS. 2 and 9). At the time, dark spots in the light phase having a diameter of 2 mm or less in size on the screen were judged as particles distributed unevenly in the light phase, and the boundary was not drawn on the part. For example, when silica particles were used, uneven distribution in the light phase could be confirmed.

The image with a clearly drawn boundary was saved in bitmap format image and was subjected to fractal dimension analysis by box-counting method, and the obtained fractal dimension value was determined as an index indicating the complexity of the boundary of the phase separation. For the analysis by the box-counting method, software program of AT-Image ver.3.2 was used. Specifically, the saved bitmap image was opened on the image analysis software program (AT-Image ver 3.2), and from image extraction on a menu thereof, binarization process by brightness histogram was carried out (refer to FIG. 6). A threshold value for binarization was determined to be 8. With respect to the image which had been subjected to binarization process, fractal dimension was selected from image measurement on the menu to obtain fractal dimension thereof. At the time, for calculation of fractal dimension by least squares method, a resulted counting obtained from boxes with a length of 6 to 63 pixels on a side were used.

Herein, the analysis of fractal dimension by box-counting method is a publicly known method, and with respect to a use of other image analysis software or program for dimensional analysis, other software program having similar functions may be used as long as reproducibility of the analysis result can be obtained sufficiently. Other software programs is include, for example, image analysis software programs such as "Fractal analysis system ver.3.33 produced by National Institute of Livestock and Grassland Science of National Agriculture and Food Research Organization" and "PopImaging Ver.3.40 produced by Digital being kids Co., Ldt.".

(4) Measurement of Haze

Based on JIS K7136, using haze meter (NDH2000 produced by Nippon Denshoku Industries Co., Ltd.), haze was measured at three different points of the film sample, and an average value thereof was used.

(5) Adhesion to Light Curable Acrylic Hard Coat Layer (5-1) Adhesion to Light-Curable and Solvent-Dilutable Acrylic Hard Coat Layer On a covering layer side of the film sample, a coating agent comprising 50 parts by mass of hard coating agent (Seikabeam EXF01 (B) produced by Dainichiseika Color & Chemicals Mfg. Co., Ltd.), 25 parts by mass of toluene, and 25 parts by mass of methyl ethyl ketone mixed and stirred well was coated with wire bar, and was dried for one minute at 70° C. to remove the solvent, thereby obtaining a hard coating film having a hard coat layer with a thickness of 3 µm under conditions of 200 mJ/cm$^2$ with a high-pressure mercury lamp, a radiation distance of 15 cm, and a running speed of 5 m/minute.

An opposite side of the resultant hard coat layer of the hard coating film was attached on a glass plate having a thickness of 5 mm with a two-sided tape attached. Next, 100 slashes in square shape penetrating the hard coat layer and the covering layer to reach the base film was made using a cutter guide with a spacing of 2 mm. Then, an adhesive tape (No. 405; 24 mm in width produced by Nichiban Co., Ltd.) was attached on the side having slashes in square shape. When the tape was attached, air remaining at the interface was pushed out with an eraser to make them completely adhere to each other, and then the adhesive tape was peeled off swiftly in a vertical direction. Further, a new adhesive tape was attached again in a same manner and was peeled off in a vertical direction swiftly in a same manner. This operation of peeling off the adhesive tape was repeated for a total of 10 times to measure adhesion with visual observation by a following formula. Herein, a square partially peeled off is included in the number of squares peeled off.

$$\text{Adhesion}(\%) = (1 - \text{number of squares peeled off}/100 \text{ squares}) \times 100$$

(5-2) Adhesion to Non-Solvent Type and Light-Curable Acrylic Hard Coat Layer

About 5 g of a hard coating agent (Seikabeam EXF01 (B) produced by Dainichiseika Color & Chemicals Mfg. Co., Ltd.) was put on a glass plate with a thickness of 5 mm which was kept clean, and a covering layer surface of the film sample and a hard coating agent were superimposed in a manner that they were in contact with each other, and they were pressure-bonded from above the film sample with a hand-operated loaded rubber roller having a width of 10 cm and a diameter of 4 cm in a manner that the hard coating agent was stretched. Then, from the film surface side, ultraviolet light was exposed by a high-pressure mercury lamp under conditions of 500 mJ/cm$^2$, a radiation distance of 15 cm, and a running speed of 5 m/minute to cure the hard coat layer.

Next, the film sample having the hard coat layer was peeled off from the glass plate to obtain a hard coating film. An opposite side of the hard coat layer of the hard coating film was attached on a glass plate having a thickness of 5 mm with a two-sided tape attached. Next, 100 slashes in square shape penetrating the hard coat layer and the covering layer to reach the base film was made using a cutter guide with a spacing of 2 mm. Then, an adhesive tape (No. 405; 24 mm in width produced by Nichiban Co., Ltd.) was attached on the slashes in square shape. When the tape was attached, air remaining at the interface was pushed out by an eraser to make them completely adhere to each other, and then the adhesive tape was peeled off swiftly in a vertical direction. Further, a new adhesive tape was attached again in a same manner and was peeled off in a vertical direction swiftly in a same manner. This operation of peeling off the adhesive tape was repeated for a total of 10 times to measure adhesion by visual observation by a following formula. Herein, a square partially peeled off was counted into the number of squares peeled off.

Adhesion(%)=(1−number of squares peeled off/100 squares)×100

(6) Blocking Resistance

Covering layer surfaces of two film samples were superimposed with each other and were made to stick with each other under a pressure of 1 kgf/cm² at 50° C. and an atmosphere of 60% RH for 24 hours followed by delamination, and the condition of delamination was judged based on following standards.

○: No transition of the covering layer was observed, and the layer faces were subject to delamination easily.

Δ: Delamination sound occurred and one of the covering layer surfaces was partially transferred to the other.

x: Two films adhered to each other and could not be detached, or even if they could be detached, the base polyester film was cleaved.

(7) Hardness Index of the Covering Layer

On a covering layer of the film sample, a scratch was made using a surface property tester (HEIDON14 produced by Shintoa Scientific Co., Ltd.). As the needle for making the scratch, a genuine needle having a sapphire with a radius of 75 μm at an end thereof was used. A running speed of the needle was 150 mm/minute and a load was 5 gf.

Surface shape of the scratches made on the covering layer was measured using a non-contact system for three-dimensional surface shape measurement (Micromap550 produced by Micromap) under following conditions to display profile data. Representative examples are shown in FIGS. 5 and 12. From the obtained data of the scratch shape, an average value of difference of elevation of 30 neighboring convex and concave portions were calculated, and the value was determined as hardness index of the covering layer. In the calculation, a projection having a height of 30 nm or more was excluded based on judgment that it was a projection attributed to particles included in a covering layer or a thermoplastic resin film. Additionally, a projection having a height of 1 nm or less was excluded due to influence of noise.

(Measurement Conditions)

Profile mode: wave mode
Objective lens: magnification of 10 times
Resolution: 160×160 pixel
Measured length: 207.1 nm Example 1

(1) Preparation of Coating Liquid

A coating liquid used for the present invention was prepared by a following method. Ninety-five parts by mass of dimethyl terephthalate, 95 parts by mass of dimethyl isophthalate, 35 parts by mass of ethylene glycol, 145 parts by mass of neopentyl glycol, 0.1 part by mass of zinc acetate and 0.1 part by mass of antimony trioxide was fed into a reaction container for ester-exchange reaction at 180° C. for 3 hours. Next, 6.0 parts by mass of 5-sodium sulfoisophthalate was added for esterification reaction at 240° C. for 1 hour followed by polycondensation reaction at 250° C. under a reduced pressure (10 to 0.2 mmHg) for 2 hours to obtain a copolymerized polyester resin having a number average molecular weight of 19,500 and a softening point of 60° C.

7.5 parts by mass of 30% by mass aqueous dispersion of the resultant copolymerized polyester resin (A), 11.3 parts by mass of 20% by mass aqueous solution of self-crosslinking polyurethane resin (B) containing an isocyanate group blocked with sodium bisulfite (Elastron H-3, produced by Dai-Ichi Kogyo Seiyaku Co Ltd.), 0.3 parts by mass of a catalyst for Elastron (Cat 64 produced by Dai-Ichi Kogyo Seiyaku Co Ltd.), 39.8 parts by mass of water and 37.4 parts by mass of isopropyl alcohol are mixed together. Then, 0.6 parts by mass of 10% by mass aqueous solution of a fluorinated nonionic surfactant (MEGAFACE F142D produced by Dainippon Ink and Chemicals Incorporated), 2.3 parts by mass of 20% by mass aqueous dispersion of colloidal silica (Snowtex OL produced by Nissan Chemical Industries, Ltd.; average particle size of 40 nm) as particle A and 0.5 parts by mass of 3.5% by mass aqueous dispersion of dry-method silica (Aerosil OX50 produced by Nippon Aerosil Co., Ltd.; average particle size of 200 nm, average primary particle size of 40 nm) as particle B were added. Next, pH of the coating liquid was adjusted to 6.2 with 5% by mass of sodium hydrogen carbonate aqueous solution and the mixed solution was subjected to microfiltration using a felt-type polypropylene filter having a filtered particle size of 10 μm (initial filtration efficiency: 95%) to prepare coating liquid A. As the surfactant, one pretreated by following method was used.

In the surfactant, isopropyl alcohol (IPA) was added and the mixture was heat-dissolved on a warm bath at 30° C. to prepare a 15% by mass of IPA solution of the surfactant. The solution was filtrated with quantitative filter paper (No. 5C produced by Advantec Toyo Kaisha, Ltd.) to remove insoluble matter and dusts in the solution. After the filtration of the solution, the solution was put in a sealed glass container to keep still in a freezer at 0° C. for 24 hours. After a lapse of 24 hours, a solution including deposited solid matter was subjected to suction filtration using the quantitative filter paper. The solid matter on the filter paper was vacuum-dried to obtain solid matter, and the solid matter was diluted with water into 10% by mass aqueous solution to be used as the pretreated surfactant.

The surfactant obtained in the pretreatment was analyzed using methanol as a developer by plastic sheet coated with TLC (Silica Gel 60 Produced by Merck). Sample spots were colored with iodine vapor, and as a result, it was confirmed that a spot equivalent of polyethylene glycol was not detected.

(2) Production of Laminated Polyester Film

As a raw-material polymer, polyethylene terephthalate (PET) resin pellets with intrinsic viscosity of 0.62 dl/g without including particles were dried under reduced pressure at 135° C. for 6 hours (1 Torr). Next, the dried PET resin pellets were fed into an extruder to be subjected to melt-extrusion into a sheet form at about 285° C., followed by rapid quench and solidification on a metal roll wherein the surface temperature thereof was maintained at 20° C. to obtain a cast film. At the time, as a filtering medium to remove foreign matter in the molten resin, a filtering medium of sintered stainless-steel with filtered particle size of 15 μm (initial filtration efficiency: 95%) was used.

The resultant cast film was heated by heated rolls and a infrared heater to 95° C., and was stretched in a longitudinal direction to 3.5 times using rolls having different speeds of rotation, thereby obtaining a uniaxial oriented PET film. Next, coating liquid A was subjected to microfiltration by a felt-type polypropylene filtering medium with filtered particle size (initial filtration efficiency: 95%) of 10 μm, and was coated on one side of the uniaxial oriented PET film by reverse-roll method. At the time, as application rolls and metalling rolls of a coater, rolls formed with a surface of 0.2 S or less by ultra-hard chromium zinc finish having circularity and cylindricity of 3/1000 mm were used.

After that, the coated surface was dried in a drying furnace placed right above the coater divided into 4 zones comprising a first zone (at 135° C. for 1.0 second), a second zone (at 65° C. for 2.2 seconds), a third zone (at 40° C. for 1.8 seconds), and a fourth zone (at 30° C. for 1.8 seconds). The amount of coating was determined in such a manner that a final solid content was to be 0.08 g/m$^2$. Transit time of the film from the coating to the inlet of the drying furnace was 0.8 seconds. At the time, wind speed of drying air in the first zone was set at 30 m/second, supply air volume of the drying air 130 m$^3$/second, exhaust air volume 170 m$^3$/second, supply air volume from the second zone to the fourth zone 100 m$^3$/second, and the exhaust air volume 150 m$^3$/second so as not to allow the drying air to flow into a side of the coater. Tension of the film was determined to be 7000 N/original fabric, and both ends of the film were gripped with pinch roll from coating to an inlet of the drying furnace.

Further, during the coating, coating equipment wherein a ratio of a capacity of a tray for coating liquid, capacity of the circulation tank and a capacity of the preparation tank had a following relationship was used.
(a) Ratio of capacity of tray for coating liquid to capacity of circulation tank=1/50
(b) Ratio capacity of circulation tank to capacity of preparation tank=1/40

Next, with both side edges of the film clipped, the film was introduced to hot air zone heated at a temperature of 120° C. and a speed of 15 m/second, and was stretched to 4.3 times in width direction. Then, while a width after stretched in width direction was maintained, it sequentially passed through a first heat fixation zone (temperature: 200° C.), a second heat fixation zone (temperature: 225° C.), a third heat fixation zone (temperature: 230° C.), a fourth heat fixation zone (temperature: 230° C.), a fifth heat fixation zone (temperature: 210° C.), a sixth heat fixation zone (temperature: 170° C.), and a seventh heat fixation zone (temperature: 120° C.). In the sixth heat fixation zone, relaxation treatment of 3% was carried out in width direction. Then, uncoated part of both side edges of the film were trimmed, and the film was wound by a winding device and was further divided equally into four in width direction and slit to obtain a laminated polyester film roll having a width of 1000 mm, film length of 1000 m, and a film thickness of 125 μm. Wind speed of each of the heat fixation zones was 15 m/second, and transit time of each zone was 4.5 seconds, and spacing between nozzles spraying hot air was 350 mm, and the number of nozzles per 1 zone was 8.

Properties and characteristics of the film are shown in Table 4. Further, a maximum value and a minimum value of the surface fraction of PEs of the resultant laminated polyester film roll in a longitudinal direction and in width direction; a maximum value and a minimum value of haze thereof, and a maximum value and a minimum value of adhesion to the hard coat layer are shown in Table 5. With respect to blocking resistance, all the measurement points were ○.

Example 2

The laminated polyester film was obtained in a same manner as Example 1 except that the coating liquid was changed to coating liquid B in which 10% by mass aqueous solution of fluorinated cationic surfactant (Phthagent 310 produced by Neos Company Limited) pretreated in a same manner as Example 1 was used as the surfactant used for the coating liquid.

Example 3

The laminated polyester film was obtained in a same manner as Example 1 except that in the heat fixation treatment step, temperature of each of the heat fixation zones was set at 190° C. in the first heat fixation zone, 205° C. in the second heat fixation zone, 220° C. in the third heat fixation zone, and 220° C. in the fourth heat fixation zone.

Example 4

The laminated polyester film was obtained in a same manner as Example 1 except that the coating liquid was changed to following coating liquid C wherein mass ratio of copolymerized polyester resin to polyurethane resin was changed to 60/40.

(Preparation of Coating Liquid C)
9.0 parts by mass of 30% by mass aqueous dispersion of the copolymerized polyester resin (A) used in Example 1, 9.0 parts by mass of 20% by mass aqueous solution of polyurethane resin (B) used in Example 1, 0.3 parts by mass of catalyst for Elastron (Cat 64 produced by Dai-Ichi Kogyo Seiyaku Co Ltd.), 40.6 parts by mass of water, and 37.3 parts by mass of isopropyl alcohol were mixed together. Further, 0.6 parts by mass of the aqueous solution of the surfactant used in Example 1, 2.3 parts by mass of 20% by mass aqueous dispersion of colloidal silica (Snowtex OL produced by Nissan Chemical Industries, Ltd.; average particle size of 40 nm) as particle A, and 0.5 parts by mass of 3.5% by mass aqueous dispersion of dry-method silica (Aerosil OX50 produced by Nippon Aerosil Co., Ltd.; average particle size of 200 nm, average primary particle size of 40 nm) as particle B were added followed by being subjected to pH adjustment with 5% by mass aqueous solution of sodium hydrogen carbonate, and passed through filters with filtration performance of 5 μm and 1 μm sequentially to give coating liquid C.

Example 5

The laminated polyester film was obtained in a same manner as Example 1 except that the coating liquid was changed to following coating liquid D wherein mass ratio of copolymerized polyester resin to polyurethane resin was changed to 40/60.

(Preparation of Coating Liquid D)
6.0 parts by mass of 30% by mass aqueous dispersion of the copolymerized polyester resin (A) used in Example 1, 13.5 parts by mass of 20% by mass aqueous solution of polyurethane resin (B) used in Example 1, 0.3 parts by mass of a catalyst for Elastron (Cat 64 produced by Dai-Ichi Kogyo Seiyaku Co Ltd.), 38.9 parts by mass of water, and 37.5 parts by mass of isopropyl alcohol were mixed together. Further, 0.6 part by mass of the 10% by mass aqueous solution of the surfactant used in Example 1, 2.3 parts by mass of 20% by mass aqueous dispersion of colloidal silica (Snowtex OL produced by Nissan Chemical Industries, Ltd.; average particle size of 40 nm) as particle A, and 0.5 parts by mass of 3.5% by mass aqueous dispersion of dry-method silica (Aerosil OX50 produced by Nippon Aerosil Co., Ltd.; average particle size of 200 nm, average primary particle size of 40 nm) as particle B were added followed by being subjected to pH adjustment to 6.2 with 5% by mass aqueous solution of sodium hydrogen carbonate, and passed through filters with filtration performance of 5 μm and 1 μm sequentially to give coating liquid D.

Example 6

The laminated polyester film was obtained in a same manner as Example 1 except that the amount of coating was determined in a manner that the final solid content was to be 0.12 g/m².

Example 7

A laminated polyester film was obtained in a same manner as Example 1 except that following coating liquid E wherein the amount of surfactant was changed to 0.03% by mass was used.

(Preparation of Coating Liquid E)

In preparation of the coating liquid in Example 1, the amount of 10% by mass aqueous solution of fluorinated nonionic surfactant (MEGAFACE F142D produced by Dainippon Ink and Chemicals Incorporated) was changed to 0.3 parts by mass, the amount of water to 38.2 parts by mass, and the amount of isopropyl alcohol to 39.3 parts by mass.

Example 8

The laminated polyester film was obtained in a same manner as Example 1 except that following coating liquid F wherein the amount of surfactant in the coating liquid was changed to 0.10% by mass was used.

(Preparation of Coating Liquid F)

In preparation of the coating liquid in Example 1, the amount of 10% by mass aqueous solution of fluorinated nonionic surfactant (MEGAFACE F142D produced by Dainippon Ink and Chemicals Incorporated) was changed to 1.0 part by mass, an amount of water to 37.5 parts by mass, and the amount of isopropyl alcohol to 39.3 parts by mass.

Example 9

The laminated polyester film was obtained in a same manner as Example 1 except that the transit time of the film from the coating to the inlet of the drying furnace was changed to 0.7 seconds and the drying time to 0.8 seconds, and further that the transit time for each zone in the heat fixation treatment step was changed to 3.5 seconds and the film thickness to 100 μm.

Example 10

The laminated polyester film was obtained in a same manner as Example 1 except that the transit time of the film from the coating to the inlet of the drying furnace was changed to 1.0 second and the drying time to 1.9 seconds, and further that the transit time for each zone in the heat fixation treatment step was changed to 6.6 seconds and the film thickness to 188 μm.

Example 11

The laminated polyester film was obtained in a same manner as Example 1 except that the coating liquid was changed to coating liquid G wherein pH of the coating liquid was adjusted to 7.9 using 5% by mass of sodium carbonate aqueous solution.

Example 12

The laminated polyester film was obtained in a same manner as Example 1, except that the covering layer was coated on both sides of the uniaxial orientation polyester film. Transit time of the film from the coating to the inlet of the drying furnace transit time was 0.8 seconds for one side and 1.0 second for the other side.

Example 13

The laminated polyester film was obtained in a same manner as Example 1 except that the amount of coating was determined so that the final solid content was to be 0.02 g/m².

Example 14

The laminated polyester film was obtained in a same manner as Example 1 except that coating liquid H in which the surfactant had not been pretreated was used. The phase separation structure between the copolymerized polyester resin and the polyurethane resin on a surface of the covering layer of the resultant laminated polyester film by scanning probe microscopy (SPM) could be detected but was somewhat unclear.

Example 15

The laminated polyester film was obtained in a same manner as Example 1, except that following coating liquid I in which mass ratio of dispersion medium of the coating liquid (water/IPA) was changed to 50/50 was used.

(Preparation of Coating Liquid I)

7.5 parts by mass of 30% by mass aqueous dispersion of the polyester resin (A) used in Example 1, 11.3 parts by mass of 20% by mass aqueous solution of polyurethane resin (B) used in Example 1, 0.3 parts by mass of a catalyst for Elastron (Cat 64 produced by Dai-Ichi Kogyo Seiyaku Co Ltd.), 30.4 parts by mass of water, and 46.8 parts by mass of isopropyl alcohol were mixed together. Further, 0.6 parts by mass of the 10% by mass aqueous solution of the surfactant used in Example 1, 2.3 parts by mass of 20% by mass aqueous dispersion of colloidal silica (Snowtex OL produced by Nissan Chemical Industries, Ltd.; average particle size of 40 nm) as particle A, and 0.5 parts by mass of 3.5% by mass aqueous dispersion of dry-method silica (Aerosil OX50 produced by Nippon Aerosil Co., Ltd.; average particle size of 200 nm, average primary particle size of 40 nm) as particle B were added followed by being subjected to pH adjustment to 6.2 with 5% by mass aqueous solution of sodium hydrogen carbonate, and passed through filters with filtration performance of 5 μm and 1 μm sequentially to give coating liquid I.

Example 16

A laminated polyester film having a thickness of 125 μm was obtained in a same manner as Example 1 except that coating liquid J in which pH of the coating liquid was changed to 4.6 with acetic acid was used.

Example 17

The laminated polyester film was obtained in a same manner as Example 1 except that coating liquid K wherein polyurethane resin (B) was changed to a following polyurethane resin was used. The polyurethane resin was obtained by a following method.

(Preparation of Polyurethane Resin)

Ninety-three parts by mass of polyester diol (OHV: 111.8 eq/ton, AV:1.1 eq/ton) comprising a composition of adipic acid//1.6-hexanediol/neopentyl glycol (molar ratio: 4//3/2) and 22 parts by mass of xylylene diisocyanate were mixed to react under nitrogen stream at 95 to 100° C. for 1 hour, thereby obtaining an urethane prepolymer (NCO/OH ratio: 1.50, free isocyanate group: theoretical value of 3.29% by mass, actual measurement value of 3.16% by mass).

Next, the resultant urethane prepolymer was cooled to 60° C., and 4.5 parts by mass of methyl ethyl ketoxime was added to react at 60° C. for 50 minutes, thereby obtaining a partially blocked urethane prepolymer containing 1.3% by mass of free isocyanate. Continuously, the urethane prepolymer was cooled to 55° C., and a mixed solvent comprising 9 parts by mass of isopropyl alcohol and 140 parts by mass of methanol was added, and they were evenly mixed. Subsequently, 9.3 parts by mass of 50% by mass aqueous solution of sodium bisulfite and 5.4 parts by mass of 30% by mass aqueous solution of N-methyl taurine were added and stirred intensively. After a lapse of about 30 minutes, the mixture started to exhibit water-solubility, and 2 hours later, free sodium bisulfite became almost zero, and the reaction finished. Then, water was added thereto to obtain a 20% by mass aqueous solution which were clouded and viscous.

Comparative Example 1

(1) Preparation of Coating Liquid L 33.7 parts by mass of dimethyl terephthalate, 20.0 parts by mass of dimethyl isophthalate, 9.1 parts by mass of sodium-5-sulfodimethyl isophthalate, 40.0 parts by mass of ethylene glycol, 10.0 parts by mass of diethylene glycol, and 0.049 parts by mass of calcium acetate monohydrate were mixed and the mixture was subjected to ester exchange at 200 to 230° C. until a theoretical amount of methanol was distilled. Next, 0.09 parts by mass of orthophosphoric acid was added to polymerize under a reduced pressure at 280° C., thereby obtaining a copolymerized polyester resin.

Hundred and ninety-two parts by mass of polyether containing a sulfonate group wherein polyether of ethylene oxide which started from allyl alcohol was sulfonated with sodium metabisulfite (content of $SO_3$: 8.3% by mass, content of polyethylene oxide: 83% by mass), 1013 parts by mass of polytetramethylene adipate (number average molecular weight: 2,250), and 248 parts by mass of polypropylene oxide polyether started with bisphenol A (number average molecular weight: 550) were mixed and were subjected to dehydration under vacuum at 100° C.

The mixture was made to be at 70° C., and a mixture of 178 parts by mass of isophorone diisocyanate and 244 parts of hexamethylene-1,6-diisocyanate was added thereto, and a resultant mixture was stirred at 80° C. to 90° C. until a content of isocyanate thereof became 5.6% by mass. The prepolymer was cooled to 60° C., and 56 parts by mass of biuret polyisocyanate obtained from 3 mol of hexamethylene diisocyanate and 1 mol of water and 175 parts by mass of bisketimine obtained from isophorone diamine and acetone were sequentially added to obtain an aqueous dispersion of polyurethane.

The copolymerized polyester resin and polyurethane aqueous dispersion were blended in such a manner that a solid content of each of them became 20 parts by mass and 80 parts by mass respectively to prepare an aqueous dispersion with 10% by mass of solid concentration to give coating liquid L. Here, a surfactant was not blended in the coating liquid.

(2) Production of Laminated Polyester Film

Next, after polyethylene terephthalate resin pellets devoid of particles having intrinsic viscosity of 0.66 dl/g were dried as raw material polymer under a reduced pressure (1 Torr) at 135° C. for 6 hours, they were fed into an extruder to be subjected to melt-extrusion into a sheet form at about 285° C., followed by rapid quench and solidification on a metal roll wherein the surface temperature thereof was maintained at 60° C. to obtain a cast film. At the time, as a filtering medium to remove foreign matter in the molten resin, in a same manner as Example 1, a filtering medium of sintered stainless-steel with filtered particle size of 15 μm (initial filtration efficiency: 95%) was used.

The cast film was heated by heated rolls and an infrared heater to 95° C., and was stretched in a longitudinal direction to 3.5 times by rolls having different speeds of rotation, thereby obtaining a uniaxial oriented PET film. Next, the coating liquid L was subjected to microfiltration by a felt-type polypropylene filtering medium with filtered particle size (initial filtration efficiency: 95%) of 10 μm, and was coated on one side of the uniaxial oriented PET film by reverse-roll method. Next, with both side edges of the film clipped, the film were introduced to hot air zone heated at 110° C., and after drying, the film was stretched in width direction to 3.5 times. At the time, wind speed in the tenter was 15 m/second, and drying time was 20 seconds. A time from coating on the film to an inlet of the tenter was 10.0 seconds. An amount of coating was determined so as to obtain 0.15 g/m$^2$ as a final solid content.

Next, while a width of the film stretched in width direction was maintained, the film sequentially and continuously passed through a first heat fixation zone (200° C.), a second heat fixation zone (205° C.), a third heat fixation zone, a fourth heat fixation zone (210° C.), a fifth heat fixation zone (215° C.), a sixth heat fixation zone (220° C.), and a seventh heat fixation zone (170° C.). Further, in the seventh heat fixation zone, the film was subjected to relaxation treatment of 3% in width direction, followed by trimming of uncoated part of both ends of the film, thereby obtaining a laminated polyester film having a thickness of 125 μm. Wind speed of each of the heat fixation zones was 15 m/second, and transit time of each zone was 4.5 seconds, and spacing between nozzles spraying hot air was 700 mm, and the number of nozzles per 1 zone was 4.

On a surface of the covering layer of the resultant laminated polyester film, phase separation structure between a copolymerized polyester resin and a polyurethane resin was unclear.

Comparative Example 2

(1) Preparation of Coating Liquid M 3.0 parts by mass of 30% by mass aqueous dispersion of copolymerized polyester resin (A) used in Example 1, 18.0 parts by mass of 20% by mass aqueous solution of polyurethane resin (B) used in Example 1, 0.3 parts by mass of a catalyst for Elastron (Cat 64 produced by Dai-Ichi Kogyo Seiyaku Co Ltd.), 70.7 parts by mass of water, and 4.7 parts by mass of isopropyl alcohol were mixed. Further, 0.6 parts by mass of 10% by mass aqueous solution of dodecyl benzene sulfonate as a surfactant, 2.3 parts by mass of 20% by mass aqueous dispersion of a colloidal silica (Snowtex OL produced by Nissan Chemical Industries, Ltd.; average particle size of 40 nm) as particle A, 0.5 parts by mass of 3.5% by mass aqueous dispersion of a dry-method silica (Aerosil OX50 produced by Nippon Aerosil Co., Ltd.; average particle size of 200 nm, average primary particle size of 40 nm) as particle B were added thereto to obtain coating liquid M. PH of coating liquid M was 4.8 since pH adjustment was not performed.

(2) Production of Laminated Polyester Film

Next, after the polyethylene terephthalate resin pellets devoid of particles used in Example 1 having intrinsic viscosity of 0.62 dl/g were dried under a reduced pressure (1 Torr) at 135° C. for 6 hours, they were fed into an extruder to be subjected to melt-extrusion into a sheet form at about 285° C., followed by rapid quench and solidification on a metal roll wherein the surface temperature thereof was maintained at 20° C. to obtain a cast film. At the time, as a filtering medium to remove foreign matter in the molten resin, a filtering medium of sintered stainless-steel with filtered particle size of 15 μm (initial filtration efficiency: 95%) was used.

The resultant cast film was heated by heated rolls and a infrared heater to 95° C., and was stretched in a longitudinal direction to 3.5 times by rolls having different speeds of rotation, thereby obtaining a uniaxial oriented PET film. Next, coating liquid M was subjected to microfiltration by a felt-type polypropylene filtering medium with filtered particle size (initial filtration efficiency: 95%) of 10 μm, and was coated on one side of the uniaxial oriented PET film by reverse-roll method.

Next, with both edges of the film clipped, the film was introduced to hot air zone heated at a 80° C., and after a coated surface was dried, the film was stretched to 4.0 times in width direction. At the time, wind speed in the tenter was 15 m/second, and drying time was 20 seconds. A time from coating to an inlet of the tenter was 10.0 seconds. An amount of coating was determined so as to obtain 0.10 $g/m^2$ as a final solid content. Further, a laminated polyester film having a thickness of 125 μm was obtained in a same manner as Comparative Example 1 except that temperature in the heat fixation treatment step was 200° C. in the first heat fixation zone, 210° C. in the second heat fixation zone, 220° C. in the third heat fixation zone, 225° C. in the fourth heat fixation zone, 230° C. in the fifth heat fixation zone, 235° C. in the sixth heat fixation zone, and 240° C. in the seventh heat fixation zone, and further that relaxation treatment in width direction was not carried out.

On a surface of the covering layer of the resultant laminated polyester film, a phase separation structure between a copolymerized polyester resin and a polyurethane resin could not be observed.

Comparative Example 3

(1) Preparation of Coating Liquid N 7.5 parts by mass of 30% by mass aqueous dispersion of copolymerized polyester resin (A) used in Example 1, 11.3 parts by mass of 20% by mass aqueous solution of polyurethane resin (B) used in Example 1, 0.3 parts by mass of catalyst for Elastron (Cat 64 produced by Dai-Ichi Kogyo Seiyaku Co Ltd.), 40.5 parts by mass of water and 39.5 parts by mass of isopropyl alcohol were mixed together. Additionally, 0.6 parts by mass of 10% by mass aqueous solution of fluorinated nonionic surfactant (MEGAFACE F142D produced by Dainippon Ink and Chemicals Incorporated) which had not been pretreated, and 0.03 parts by mass of 3.5% by mass aqueous dispersion of aggregate silica (Sylysia 310 produced by Fuji Silysia Chemical Ltd.; average particle size of 1.4 μm) as particle A were added, while particle B was not used, to give coating liquid N. pH adjustment of coating liquid N was not carried out. PH of coating liquid N was 4.6.

(2) Production of Laminated Polyester Film

Polyethylene terephthalate resin pellets devoid of particles used in Example 1 having intrinsic viscosity of 0.62 dl/g were fed into an extruder as raw material polymer to be subjected to melt-extrusion into a sheet form at about 285° C., followed by rapid quench and solidification on a metal roll wherein the surface temperature thereof was maintained at 20° C. to obtain a cast film. At the time, as a filtering medium to remove foreign matter in the molten resin, a filtering medium of sintered stainless-steel with filtered particle size of 15 μm (initial filtration efficiency: 95%) was used.

The resultant cast film was heated by heated rolls and a infrared heater to 95° C., and was stretched in a longitudinal direction to 3.5 times by rolls having different speeds of rotation, thereby obtaining a uniaxial oriented PET film. Next, the coating liquid L was subjected to microfiltration by a felt-type polypropylene filtering medium with filtered particle size (initial filtration efficiency: 95%) of 10 μm, and was coated on one side of the uniaxial oriented PET film by reverse-roll method.

After the coating, the film was introduced to a drying furnace to dry at a temperature of 120° C. for 3.2 seconds. An amount of coating was determined in a manner that it was to be 0.08 $g/m^2$ as a final solid content. Transit time of the film from the coating to the inlet of the drying furnace transit time was 3.2 seconds. Further, wind speed of the first zone of the drying furnace was 15 m/second, and with respect to wind speed from the second to fourth zone, in a same manner as Example 1, supply air volume of drying air was to be 70 $m^3$/second in each zone from the first drying zone to the fourth drying zone, and exhaust air was to be ventilated naturally before and after drying furnace.

Continuously, transversal stretching was carried out in a same manner as Example 1 except that transversal stretching ratio was changed to 4.0 times, and heat fixation and relaxation treatment in width direction were carried out in a same manner as Comparative Example 1, thereby obtaining a laminated polyester film having a thickness of 125 μm. On a surface of the covering layer of the resultant laminated polyester film, the phase separation structure between a copolymerized polyester resin and a polyurethane resin could not be observed.

Comparative Example 4

The laminated polyester film having a thickness of 125 μm was obtained in a same manner as Example 1 except that the transit time of the film from the coating of coating liquid A on the film to the inlet of the drying furnace was set to be 3.2 seconds.

Comparative Example 5

3.0 parts by mass of 30% by mass aqueous dispersion of copolymerized polyester resin (A) used in Example 1, 18.0 parts by mass of 20% by mass aqueous solution of polyurethane resin (B) used in Example 1, 0.3 parts by mass of catalyst for Elastron (Cat64 produced by Dai-Ichi Kogyo Seiyaku Co Ltd.), 37.3 parts by mass of water, and 37.8 parts by mass of isopropyl alcohol were mixed together. Further, 0.6 parts by mass of 10% by mass aqueous solution of the surfactant used in Example 1, 2.3 parts by mass of 20% by mass aqueous dispersion of colloidal silica (Snowtex OL produced by Nissan Chemical Industries, Ltd.; average particle size of 40 nm) as particle A, and 0.5 part by mass of 3.5% by mass aqueous dispersion of dry-method silica (Aerosil OX50 produced by Nippon Aerosil Co., Ltd.; average particle size of 200 nm, average primary particle size of 40 nm) as particle B were added, and pH thereof was adjusted to 6.2 with 5% by mass aqueous solution of sodium hydrogen carbonate to give coating liquid O. The laminated polyester film having a thickness of 125 μm was obtained in a same manner as Example 1 except that the coating liquid O was used as a coating liquid.

Comparative Example 6

12.0 parts by mass of 30% by mass aqueous dispersion of copolymerized polyester resin (A) used in Example 1, 4.5 parts by mass of 20% by mass aqueous solution of polyurethane resin (B) used in Example 1, 0.3 parts by mass of catalyst for Elastron (Cat64 produced by Dai-Ichi Kogyo Seiyaku Co Ltd.), 42.3 parts by mass of water and 37.2 parts by mass of isopropyl alcohol were mixed together, and further, 0.6 parts by mass of 10% by mass aqueous solution of the surfactant used in Example 1, 2.3 parts by mass of 20% by mass aqueous dispersion of colloidal silica (Snowtex OL produced by Nissan Chemical Industries, Ltd.; average particle size of 40 nm) as particle A, and 0.5 parts by mass of 3.5% by mass aqueous dispersion of dry-method silica (Aerosil OX50 produced by Nippon Aerosil Co., Ltd.; average particle size of 200 nm, average primary particle size of 40 nm) as particle B were added and pH thereof was adjusted to 6.2 with a 5% by mass aqueous solution of sodium hydrogen carbonate to give coating liquid P. The laminated polyester film having a thickness of 125 μm was obtained in a same manner as Example 1 except that the coating liquid P was used as a coating liquid.

Comparative Example 7

The laminated polyester film having a thickness of 125 μm was obtained in a same manner as Example 1, except that a temperature in each of the heat fixation treatment steps was set at 190° C. in the first heat fixation zone, 195° C. in the second heat fixation zone, and 200° C. from the third heat fixation zone to the fifth heat fixation zone. A phase separation structure between the copolymerized polyester resin and the polyurethane resin on the surface of the covering layer of the resultant laminated polyester film could not be observed.

Comparative Example 8

The laminated polyester film having a thickness of 125 μm was obtained in a same manner as Example 1 except that the wind speed in the drying furnace was set at 15 m/second.

Comparative Example 9

The laminated polyester film having a thickness of 125 μm was obtained in a same manner as Example 1 except that the amount of coating was determined so that the final solid content was to be 0.20 g/m².

Comparative Example 10

The laminated polyester film having a thickness of 125 μm was obtained in a same manner as Example 1 except for a use of coating liquid Q in which pH of the coating liquid was adjusted to 9.0 with 5% by mass sodium carbonate aqueous solution.

Comparative Example 11

The laminated polyester film having a thickness of 125 μm was obtained in a same manner as Example 1, except that coating liquid R prepared without blending a surfactant was used as the coating liquid.

Example 18

7.5 parts by mass of 30% by mass aqueous dispersion of copolymerized polyester resin (A) used in Example 1, 11.3 parts by mass of 20% by mass aqueous solution of polyurethane resin (B) used in Example 1, 0.3 parts by mass of catalyst for Elastron (Cat 64 produced by Dai-Ichi Kogyo Seiyaku Co Ltd.), 40. 5 parts by mass of water and 39.5 parts by mass of isopropyl alcohol were mixed together. Further, 0.6 parts by mass of 10% by mass aqueous solution of the surfactant used in Example 1, and 4.3 parts by mass of 3.5% by mass aqueous dispersion of aggregate silica (Sylysia 310 produced by Fuji Silysia Chemical Ltd.; average particle size of 1.4 μm) as particle A were added, and pH thereof was adjusted to 6.2 with 5% by mass aqueous solution of sodium hydrogen carbonate, and the mixture sequentially passed through filters having filtration performance of 5 μm and 1 μm to give coating liquid S. Particle B was not blended in coating liquid. The laminated polyester film having a thickness of 125 μm was obtained in a same manner as Example 1 except that the coating liquid S was used.

Comparative Example 12

The laminated polyester film having a thickness of 125 μm was obtained in a same manner as Example 1, except for a use of coating liquid T prepared in a manner that the solid content of the surfactant alone in the coating liquid was to be 0.60% by mass.

Example 19

The laminated polyester film having a thickness of 125 μm wherein uncoated part of both side edges of the film were trimmed was obtained in a same manner as Example 1 except that temperature in each heat fixation treatment step was to be 200° C. in the first heat fixation zone, 210° C. in the second heat fixation zone, 215° C. in the third heat fixation zone, 220° C. in the fourth heat fixation zone, 225° C. in the fifth heat fixation zone, 230° C. in the sixth heat fixation zone, and 170° C. in the seventh heat fixation zone, and that relaxation treatment of 3% in width direction was carried out in the seventh heat fixation zone.

Comparative Example 13

The laminated polyester film was obtained in a same manner as Example 1 except that 7.5 parts by mass of 30% by mass aqueous dispersion of copolymerized polyester resin (A) used in Example 1, 11.3 parts by mass of 20% by mass aqueous solution of polyurethane resin (B) used in Example 1, 0.3 parts by mass of catalyst for Elastron (Cat64 produced by Dai-Ichi Kogyo Seiyaku Co Ltd.), 51.0 parts by mass of water and 26.2 parts by mass of isopropyl alcohol were mixed together, and further that 0.6 parts by mass of 10% by mass aqueous solution of the surfactant used in Example 1, 2.3 parts by mass of 20% by mass aqueous dispersion of colloidal silica (Snowtex OL produced by Nissan Chemical Industries, Ltd.; average particle size of 40 nm) as particle A and 0.5 parts by mass of 3.5% by mass aqueous dispersion of dry-method silica (Aerosil OX50 produced by Nippon Aerosil Co., Ltd.; average particle size of 200 nm, average primary particle size of 40 nm) as particle B were added thereto, and that pH of the mixture was adjusted to 6.2 with 5% by mass aqueous solution of sodium hydrogen carbonate ti give coating liquid U and that coating liquid U was used.

Example 20

The laminated polyester film roll having a film length of 2000 m, a width of 1000 m, and a thickness of 125 μm was obtained in a same manner as Example 1 except for a use of coating equipment wherein a ratio of a capacity of tray for coating liquid, capacity of circulation tank, and a capacity of preparation has following conditions:
(a) Capacity of tray for coating liquid/capacity of circulation tank=1/5;
(b) Capacity of circulation tank/capacity of preparation tank= 1/50;
(c) Circularity and cylindricity of application roll and metalling roll: 6/1000 mm; and
(d) Pinch roll is not provided between a coater and a drying furnace.

Composition and characteristics of the coating liquid in Examples 1 to 20 and Comparative Examples 1 to 13 are shown in Table 1, conditions of coating and drying in Table 2, heat fixation conditions in Table 3, and properties and characteristics of the film are shown in Table 4. Further, a maximum value and a minimum value of the surface fraction of PEs of the resultant laminated polyester film roll in a longitudinal direction and in width direction; a maximum value and a minimum value of haze thereof, and a maximum value and a minimum value of adhesion to the hard coat layer are shown in Table 5. With respect to blocking resistance, all the measurement points were ○.

TABLE 1

| | Composition of coating liquid | | | | | | | | | | |
|---|---|---|---|---|---|---|---|---|---|---|---|
| | Resin | Particles A | | Particles B | | Solvent | | Surfactant | | Coating liquid | |
| | Mass ratio of copolymerized PEs/PU | Average particle diameter μm | Amount added mass % | Average particle diameter μm | Amount added mass % | Mass ratio of water/IPA | Type | Pretreated/unpretreated | Amount blended mass % | pH | Solid content mass % |
| Example 1 | 50/50 | 0.04 | 0.45 | 0.20 | 0.02 | 60/40 | nonionic | pretreated | 0.06 | 6.2 | 5.30 |
| Example 2 | 50/50 | 0.04 | 0.45 | 0.20 | 0.02 | 60/40 | cationic | pretreated | 0.06 | 6.2 | 5.30 |
| Example 3 | 50/50 | 0.04 | 0.45 | 0.20 | 0.02 | 60/40 | nonionic | pretreated | 0.06 | 6.2 | 5.30 |
| Example 4 | 60/40 | 0.04 | 0.45 | 0.20 | 0.02 | 60/40 | nonionic | pretreated | 0.06 | 6.2 | 5.30 |
| Example 5 | 40/60 | 0.04 | 0.45 | 0.20 | 0.02 | 60/40 | nonionic | pretreated | 0.06 | 6.2 | 5.30 |
| Example 6 | 50/50 | 0.04 | 0.45 | 0.20 | 0.02 | 60/40 | nonionic | pretreated | 0.06 | 6.2 | 5.30 |
| Example 7 | 50/50 | 0.04 | 0.45 | 0.20 | 0.02 | 60/40 | nonionic | pretreated | 0.03 | 6.2 | 5.30 |
| Example 8 | 50/50 | 0.04 | 0.45 | 0.20 | 0.02 | 60/40 | nonionic | pretreated | 0.10 | 6.2 | 5.30 |
| Example 9 | 50/50 | 0.04 | 0.45 | 0.20 | 0.02 | 60/40 | nonionic | pretreated | 0.06 | 6.2 | 5.30 |
| Example 10 | 50/50 | 0.04 | 0.45 | 0.20 | 0.02 | 60/40 | nonionic | pretreated | 0.06 | 6.2 | 5.30 |
| Example 11 | 50/50 | 0.04 | 0.45 | 0.20 | 0.02 | 60/40 | nonionic | pretreated | 0.06 | 7.9 | 5.30 |
| Example 12 | 50/50 | 0.04 | 0.45 | 0.20 | 0.02 | 60/40 | nonionic | pretreated | 0.06 | 6.2 | 5.30 |
| Example 13 | 50/50 | 0.04 | 0.45 | 0.20 | 0.02 | 60/40 | nonionic | pretreated | 0.06 | 6.2 | 5.30 |
| Example 14 | 50/50 | 0.04 | 0.45 | 0.20 | 0.02 | 60/40 | nonionic | unpretreated | 0.06 | 6.2 | 5.30 |
| Example 15 | 50/50 | 0.04 | 0.45 | 0.20 | 0.02 | 50/50 | nonionic | pretreated | 0.06 | 6.2 | 5.30 |
| Example 16 | 50/50 | 0.04 | 0.45 | 0.20 | 0.02 | 60/40 | nonionic | pretreated | 0.06 | 4.6 | 5.30 |
| Example 17 | 50/50 | 0.04 | 0.45 | 0.20 | 0.02 | 60/40 | nonionic | pretreated | 0.06 | 6.2 | 5.30 |
| Example 18 | 50/50 | 1.4 | 3.0 | 0.20 | 0.02 | 60/40 | nonionic | pretreated | 0.06 | 6.2 | 5.30 |
| Example 19 | 50/50 | 0.04 | 0.45 | 0.20 | 0.02 | 60/40 | nonionic | pretreated | 0.06 | 6.2 | 5.30 |
| Example 20 | 50/50 | 0.04 | 0.45 | 0.20 | 0.02 | 60/40 | nonionic | pretreated | 0.06 | 6.2 | 5.30 |
| Comparative Example 1 | 20/80 | — | — | — | — | 100/0 | nonionic | — | — | — | 10.00 |
| Comparative Example 2 | 20/80 | 0.04 | 0.36 | 0.20 | 0.04 | 95/5 | anionic | unpretreated | 0.06 | 4.8 | 10.93 |
| Comparative Example 3 | 50/50 | 1.4 | 0.02 | — | — | 60/40 | nonionic | unpretreated | 0.06 | 4.6 | 4.87 |
| Comparative Example 4 | 50/50 | 0.04 | 0.45 | 0.20 | 0.02 | 60/40 | nonionic | pretreated | 0.06 | 6.2 | 5.30 |
| Comparative Example 5 | 20/80 | 0.04 | 0.45 | 0.20 | 0.02 | 60/40 | nonionic | pretreated | 0.06 | 6.2 | 5.30 |
| Comparative Example 6 | 80/20 | 0.04 | 0.45 | 0.20 | 0.02 | 60/40 | nonionic | pretreated | 0.06 | 6.2 | 5.30 |
| Comparative Example 7 | 50/50 | 0.04 | 0.45 | 0.20 | 0.02 | 60/40 | nonionic | pretreated | 0.06 | 6.2 | 5.30 |
| Comparative Example 8 | 50/50 | 0.04 | 0.45 | 0.20 | 0.02 | 60/40 | nonionic | pretreated | 0.06 | 6.2 | 5.30 |
| Comparative Example 9 | 50/50 | 0.04 | 0.45 | 0.20 | 0.02 | 60/40 | nonionic | pretreated | 0.06 | 6.2 | 5.30 |
| Comparative Example 10 | 50/50 | 0.04 | 0.45 | 0.20 | 0.02 | 60/40 | nonionic | pretreated | 0.06 | 9.0 | 5.30 |
| Comparative Example 11 | 50/50 | 0.04 | 0.45 | 0.20 | 0.02 | 60/40 | — | — | — | 6.2 | 5.30 |
| Comparative Example 12 | 50/50 | 0.04 | 0.45 | 0.20 | 0.02 | 60/40 | nonionic | pretreated | 0.60 | 6.2 | 5.30 |
| Comparative Example 13 | 50/50 | 0.04 | 0.45 | 0.20 | 0.02 | 72/28 | nonionic | pretreated | 0.06 | 6.2 | 5.30 |

TABLE 2

| | Conditions of coating and drying | | | | |
|---|---|---|---|---|---|
| | Transit time from immediately after coating to inlet of drying step (second) | Drying temperature (°C.) | Drying time (second) | Wind speed (m/s) | Final amount of coating (g/m²) |
| Example 1 | 0.8 | 135 | 1.0 | 30 | 0.08 |
| Example 2 | 0.8 | 135 | 1.0 | 30 | 0.08 |
| Example 3 | 0.8 | 135 | 1.0 | 30 | 0.08 |
| Example 4 | 0.8 | 135 | 1.0 | 30 | 0.08 |
| Example 5 | 0.8 | 135 | 1.0 | 30 | 0.08 |
| Example 6 | 0.8 | 135 | 1.0 | 30 | 0.12 |
| Example 7 | 0.8 | 135 | 1.0 | 30 | 0.08 |
| Example 8 | 0.8 | 135 | 1.0 | 30 | 0.08 |
| Example 9 | 0.7 | 135 | 0.8 | 30 | 0.08 |
| Example 10 | 1.0 | 135 | 1.9 | 30 | 0.08 |
| Example 11 | 0.8 | 135 | 1.0 | 30 | 0.08 |
| Example 12 | 0.8/1.0 | 135 | 1.0 | 30 | 0.08 |
| Example 13 | 0.8 | 135 | 1.0 | 30 | 0.02 |
| Example 14 | 0.8 | 135 | 1.0 | 30 | 0.08 |
| Example 15 | 0.8 | 135 | 1.0 | 30 | 0.08 |
| Example 16 | 0.8 | 135 | 1.0 | 30 | 0.08 |
| Example 17 | 0.8 | 135 | 1.0 | 30 | 0.08 |
| Example 18 | 0.8 | 135 | 1.0 | 30 | 0.08 |
| Example 19 | 0.8 | 135 | 1.0 | 30 | 0.08 |
| Example 20 | 0.8 | 135 | 1.0 | 30 | 0.08 |
| Comparative Example 1 | 10 | 110 | 20 | 15 | 0.15 |
| Comparative Example 2 | 10 | 80 | 20 | 20 | 0.10 |
| Comparative Example 3 | 3.2 | 120 | 1.0 | 15 | 0.08 |
| Comparative Example 4 | 3.2 | 135 | 1.0 | 30 | 0.08 |
| Comparative Example 5 | 0.8 | 135 | 1.0 | 30 | 0.08 |
| Comparative Example 6 | 0.8 | 135 | 1.0 | 30 | 0.08 |
| Comparative Example 7 | 0.8 | 135 | 1.0 | 30 | 0.08 |
| Comparative Example 8 | 0.8 | 135 | 1.0 | 15 | 0.08 |
| Comparative Example 9 | 0.8 | 135 | 1.0 | 30 | 0.20 |
| Comparative Example 10 | 0.8 | 135 | 1.0 | 30 | 0.08 |
| Comparative Example 11 | 0.8 | 135 | 1.0 | 30 | 0.08 |
| Comparative Example 12 | 0.8 | 135 | 1.0 | 30 | 0.08 |
| Comparative Example 13 | 0.8 | 135 | 1.0 | 30 | 0.08 |

TABLE 3

| | Heat fixation conditions | | | | | | | |
|---|---|---|---|---|---|---|---|---|
| | Heat fixation temperature (°C.) | | | | | | | Transit time in each zone (second) |
| | zone #1 | zone #2 | zone #3 | zone #4 | zone #5 | zone #6 | zone #7 | |
| Example 1 | 200 | 225 | 230 | 230 | 210 | 170 | 120 | 4.5 |
| Example 2 | 200 | 225 | 230 | 230 | 210 | 170 | 120 | 4.5 |
| Example 3 | 190 | 205 | 220 | 220 | 210 | 170 | 120 | 4.5 |
| Example 4 | 200 | 225 | 230 | 230 | 210 | 170 | 120 | 4.5 |
| Example 5 | 200 | 225 | 230 | 230 | 210 | 170 | 120 | 4.5 |
| Example 6 | 200 | 225 | 230 | 230 | 210 | 170 | 120 | 4.5 |
| Example 7 | 200 | 225 | 230 | 230 | 210 | 170 | 120 | 4.5 |
| Example 8 | 200 | 225 | 230 | 230 | 210 | 170 | 120 | 4.5 |
| Example 9 | 200 | 225 | 230 | 230 | 210 | 170 | 120 | 3.5 |
| Example 10 | 200 | 225 | 230 | 230 | 210 | 170 | 120 | 6.6 |
| Example 11 | 200 | 225 | 230 | 230 | 210 | 170 | 120 | 4.5 |
| Example 12 | 200 | 225 | 230 | 230 | 210 | 170 | 120 | 4.5 |
| Example 13 | 200 | 225 | 230 | 230 | 210 | 170 | 120 | 4.5 |
| Example 14 | 200 | 225 | 230 | 230 | 210 | 170 | 120 | 4.5 |
| Example 15 | 200 | 225 | 230 | 230 | 210 | 170 | 120 | 4.5 |
| Example 16 | 200 | 225 | 230 | 230 | 210 | 170 | 120 | 4.5 |
| Example 17 | 200 | 225 | 230 | 230 | 210 | 170 | 120 | 4.5 |
| Example 18 | 200 | 225 | 230 | 230 | 210 | 170 | 120 | 4.5 |
| Example 19 | 200 | 210 | 215 | 220 | 225 | 230 | 170 | 4.5 |
| Example 20 | 200 | 225 | 230 | 230 | 210 | 170 | 120 | 4.5 |
| Comparative Example 1 | 200 | 205 | 210 | 213 | 215 | 220 | 170 | 4.5 |
| Comparative Example 2 | 200 | 210 | 220 | 225 | 230 | 235 | 240 | 4.5 |
| Comparative Example 3 | 200 | 205 | 210 | 213 | 215 | 220 | 170 | 4.5 |
| Comparative Example 4 | 200 | 225 | 230 | 230 | 210 | 170 | 120 | 4.5 |
| Comparative Example 5 | 200 | 225 | 230 | 230 | 210 | 170 | 120 | 4.5 |

TABLE 3-continued

|  | Heat fixation conditions | | | | | | | |
| --- | --- | --- | --- | --- | --- | --- | --- | --- |
|  | Heat fixation temperature (° C.) | | | | | | | Transit time |
|  | zone #1 | zone #2 | zone #3 | zone #4 | zone #5 | zone #6 | zone #7 | in each zone (second) |
| Comparative Example 6 | 200 | 225 | 230 | 230 | 210 | 170 | 120 | 4.5 |
| Comparative Example 7 | 190 | 195 | 200 | 200 | 200 | 170 | 120 | 4.5 |
| Comparative Example 8 | 200 | 225 | 230 | 230 | 210 | 170 | 120 | 4.5 |
| Comparative Example 9 | 200 | 225 | 230 | 230 | 210 | 170 | 120 | 4.5 |
| Comparative Example 10 | 200 | 225 | 230 | 230 | 210 | 170 | 120 | 4.5 |
| Comparative Example 11 | 200 | 225 | 230 | 230 | 210 | 170 | 120 | 4.5 |
| Comparative Example 12 | 200 | 225 | 230 | 230 | 210 | 170 | 120 | 4.5 |
| Comparative Example 13 | 200 | 225 | 230 | 230 | 210 | 170 | 120 | 4.5 |

TABLE 4

|  | Phase separation structure of PEs phase | | | Film properties | | | Film evaluation | | |
| --- | --- | --- | --- | --- | --- | --- | --- | --- | --- |
|  | Surface fraction of PEs (%) | Presence/ absence of PEs phase (A) of more than 1 µm in width | Fractal dimension | Film thickness (µm) | Hardness index of Covering layer (nm) | Haze (%) | Non-solvent type HC layer/ covering layer | Solvent- dilutable HC layer/ Covering layer | Blocking resistance |
| Example 1 | 68 | absent | 1.86 | 125 | 5.1 | 0.58 | 95 | 100 | ○ |
| Example 2 | 65 | absent |  | 125 | 5.3 | 0.65 | 100 | 100 | ○ |
| Example 3 | 52 | absent | 1.75 | 125 | 7.0 | 0.45 | 100 | 100 | ○ |
| Example 4 | 76 | absent | 1.70 | 125 | 3.5 | 0.41 | 95 | 97 | ○ |
| Example 5 | 48 | absent |  | 125 | 12.5 | 0.85 | 100 | 95 | ○ |
| Example 6 | 52 | absent |  | 125 | 7.3 | 0.65 | 100 | 100 | ○ |
| Example 7 | 75 | absent |  | 125 | 6.5 | 0.61 | 92 | 95 | ○ |
| Example 8 | 64 | absent |  | 125 | 5.5 | 0.85 | 100 | 100 | ○ |
| Example 9 | 70 | absent | 1.89 | 100 | 5.3 | 0.55 | 100 | 100 | ○ |
| Example 10 | 51 | absent | 1.85 | 188 | 8.0 | 0.46 | 100 | 100 | ○ |
| Example 11 | 61 | absent |  | 125 | 5.3 | 0.73 | 100 | 100 | ○ |
| Example 12 | 68 | absent |  | 125 | 5.3 | 0.78 | 96 | 100 | ○ |
| Example 13 | 79 | absent |  | 125 | 4.3 | 0.78 | 91 | 93 | ○ |
| Example 14 | 66 | absent |  | 125 | 5.5 | 0.54 | 85 | 86 | ○ |
| Example 15 | 70 | absent |  | 125 | 5.2 | 0.56 | 85 | 86 | ○ |
| Example 16 | 87 | absent |  | 125 | 4.0 | 0.47 | 50 | 80 | ○ |
| Example 17 | 69 | absent |  | 125 | 5.0 | 0.57 | 96 | 100 | ○ |
| Example 18 | 69 | present |  | 125 | 5.3 | 3.40 | 100 | 100 | ○ |
| Example 19 | 50 | present |  | 125 | 7.9 | 0.47 | 83 | 95 | ○ |
| Example 20 | 68 | absent |  | 125 | 5.1 | 0.58 | 95 | 100 | ○ |
| Comparative Example 1 | 8 | absent | 1.25 | 125 | 15.5 | 1.05 | 75 | 50 | x |
| Comparative Example 2 | — | absent |  | 125 | 15.3 | 0.75 | 84 | 60 | x |
| Comparative Example 3 | — | absent |  | 125 | 5.5 | 0.41 | 100 | 95 | x |
| Comparative Example 4 | 30 | absent | 1.58 | 125 | 15.1 | 0.73 | 93 | 79 | x |
| Comparative Example 5 | 15 | absent |  | 125 | 15.7 | 0.98 | 95 | 60 | x |
| Comparative Example 6 | 93 | present | 1.40 | 125 | 2.8 | 0.47 | 30 | 70 | ○ |
| Comparative Example 7 | — | absent |  | 125 | 4.1 | 0.62 | 78 | 65 | x |
| Comparative Example 8 | 34 | absent |  | 125 | 6.0 | 0.70 | 100 | 98 | x |
| Comparative Example 9 | 32 | absent |  | 125 | 6.5 | 0.54 | 100 | 92 | x |
| Comparative Example 10 | 33 | absent |  | 125 | 6.0 | 1.55 | 100 | 90 | Δ |
| Comparative Example 11 | 91 | absent |  | 125 | 3.5 | 0.38 | 25 | 70 | ○ |
| Comparative Example 12 | 34 | absent |  | 125 | 5.9 | 1.53 | 98 | 87 | Δ |
| Comparative Example 13 | 32 | absent |  | 125 | 6.8 | 2.20 | 95 | 88 | x |

TABLE 5

|  |  | Surface fraction of PEs (%) | | Haze (%) | | Adhesion to HC layer (%) | | | |
|---|---|---|---|---|---|---|---|---|---|
|  |  | | | | | Non-solvent type HC layer/covering layer | | Solvent-dilutable HC layer/covering layer | |
|  |  | Max | Min | Max | Min | Max | Min | Max | Min |
| Example 1 | Longitudinal direction | 73 | 63 | 0.59 | 0.56 | 100 | 94 | 100 | 96 |
|  | Width direction | 72 | 64 | 0.59 | 0.56 | 100 | 96 | 100 | 97 |
| Example 20 | Longitudinal direction | 77 | 60 | 0.60 | 0.56 | 100 | 93 | 100 | 95 |
|  | Width direction | 75 | 61 | 0.60 | 0.56 | 100 | 91 | 100 | 94 |

Following examples show embodiments including a copolymerized polyester resin wherein a covering layer is crosslinked with at least one cross-linker selected from an epoxy cross-linker, a melamine cross-linker, and an oxazoline cross-linker. In the Examples, following evaluation method was used for moisture—and heat-resistant adhesion.

(8) Moisture—and Heat-Resistant Adhesion

Film samples obtained in Examples and Comparative Examples were kept in an environment at a temperature of 60° C., and relative humidity of 90% for 1000 hours. Next, about 5 g of a hard coating agent which was a non-solvent type light curable acrylic resin (Seikabeam EXF01 (B) produced by Dainichiseika Color & Chemicals Mfg. Co., Ltd.) was put on a glass plate with a thickness of 5 mm which was kept clean, and a covering layer surface of the film samples and the hard coating agent were superimposed in a manner that they were in contact with each other, and they were pressure-bonded from above the film sample with a hand-operated loaded rubber roller having a width of 10 cm and a diameter of 4 cm in a manner that the hard coating agent was stretched. Then, from the film surface side, ultraviolet light was exposed by a high-pressure mercury lamp under conditions of a radiation dose of 500 mJ/cm$^2$, a radiation distance of 15 cm, and running speed of 5 m/minute to cure the hard coat layer.

Next, the film samples having the hard coat layer were peeled off from the glass plate to obtain a hard coating film. An opposite side of the hard coat layer of the hard coating film was attached on a glass plate having a thickness of 5 mm with a two-sided tape attached. Next, 100 slashes in square shape penetrating the hard coat layer and the covering layer to reach the base material film was made using a cutter guide with a spacing of 2 mm.

Then, an adhesive tape (No. 405; 24 mm in width produced by Nichiban Co., Ltd.) was attached on the sides having slashes in square shape. When the tape was attached, air remaining at the interface was pushed out by an eraser to make them completely adhere to each other, and then the adhesive tape was peeled off swiftly in a vertical direction. The number of squares peeled off was counted with eyes and adhesion was calculated by following formula. This calculation was performed with respect to three points to obtain an average value of adhesion, and humidity-and heat-resistance was judged based on following criteria. Herein, a square partially peeled off was counted into the number of squares peeled off.

Adhesion (%)=(1-number of squares peeled off/100 squares)×100
○: 71 to 100%
Δ: 51 to 70%
x: 0 to 50%

Example 21

(1) Preparation of Coating Liquid

A coating liquid used in the present invention was prepared according to a following method. Ninety-five parts by mass of dimethyl terephthalate, 95 parts by mass of dimethyl isophthalate, 35 parts by mass of ethylene glycol, 145 parts by mass of neopentyl glycol, 0.1 part by mass of zinc acetate and 0.1 part by mass of antimony trioxide were fed into a reaction container to carry out ester exchange reaction at 180° C. for 3 hours. Next, 6.0 parts by mass of 5-sodium sulfoisophthalate was added to carry out esterification reaction at 240° C. for 1 hour, followed by polycondensation reaction at 250° C. under reduced pressure (10 to 0.2 mmHg) for 2 hours to obtain a copolymerized polyester resin having a number average molecular weight of 19,500 and a softening point at 60° C.

12.8 parts by mass of 30% by mass aqueous dispersion of the resultant copolymerized polyester resin (A), 10.1 parts by mass of 20% by mass aqueous solution of self-crosslinking polyurethane resin (B) containing isocyanate group blocked with sodium bisulfite (Elastron H-3 produced by Dai-Ichi Kogyo Seiyaku Co Ltd.), 2.3 parts by mass of aqueous dispersion having a solid content of 20% by mass of a methylated melamine cross-linker (Sumimal M-100 produced by Sumitomo Chemical Co., Ltd.), 0.3 parts by mass of a catalyst for Elastron (Cat 64 produced by Dai-Ichi Kogyo Seiyaku Co Ltd.), 39.4 parts by mass of water and 37.5 parts by mass of isopropyl alcohol were mixed respectively. Then, 0.6 parts by mass of 10% by mass aqueous solution of a fluorinated nonionic surfactant (MEGAFACE F142D produced by Dainippon Ink and Chemicals Incorporated), 2.3 parts by mass of 20% by mass aqueous dispersion of colloidal silica (Snowtex OL produced by Nissan Chemical Industries, Ltd.; average particle size of 40 nm) as particle A and 0.5 parts by mass of 3.5% by mass aqueous dispersion of dry-method silica (Aerosil OX50 produced by Nippon Aerosil Co., Ltd.; average particle size of 200 nm, average primary particle size of 40 nm) as particle B were added. Next, pH of the coating liquid was adjusted to 6.2 with 5% by mass of sodium hydrogen carbonate aqueous solution and the liquid was subjected to microfiltration using a felt-type polypropylene filter having a filtered particle size of 10 μm (initial filtration efficiency: 95%) to prepare coating liquid AA. As the surfactant, a pretreated one was used by following method.

In the surfactant, isopropyl alcohol (IPA) was added and the mixture was heat-dissolved on a warm bath at 30° C. to prepare a 15% by mass of IPA solution of the surfactant. The solution was filtrated with quantitative filter paper (No. 5C produced by Advantec Toyo Kaisha, Ltd.) to remove insoluble matter and dust in the solution. After the filtration of the solution, the solution was put in a sealed glass container to keep still in a freezer at 0° C. for 24 hours. After a lapse of 24 hours, a solution containing deposited solid matter was subjected to suction filtration using the quantitative filter paper. The solid matter on a filter paper was vacuum-dried to obtain solid matter, and the solid matter was diluted with water into 10% by mass aqueous solution to be used as the pretreated surfactant.

The surfactant obtained in the pretreatment was analyzed using methanol as a developer by plastic sheet coated with TLC (Silica Gel 60 Produced by Merck). Sample spots were colored with iodine vapor, and as a result, it was confirmed that a spot equivalent of polyethylene glycol was not detected.

(2) Production of Laminated Polyester Film

As a raw-material polymer, polyethylene terephthalate (PET) resin pellets with intrinsic viscosity of 0.62 dl/g devoid of particles were dried under reduced pressure at 135° C. for 6 hours (1 Torr). Next, the dried PET resin pellets were fed into an extruder to be subjected to melt-extrusion into a sheet form at about 285° C., followed by rapid quench and solidification on a metal roll wherein the surface temperature thereof was maintained at 20° C. to obtain a cast film. At the time, as a filtering medium to remove foreign matter in the molten resin, a filtering medium of sintered stainless-steel with filtered particle size of 15 μm (initial filtration efficiency: 95%) was used.

The resultant cast film was heated by heated rolls and a infrared heater to 95° C., and was stretched in a longitudinal direction to 3.5 times by rolls having different speeds of rotation, thereby obtaining a uniaxial oriented PET film. Next, coating liquid AA was subjected to microfiltration by a felt-type polypropylene filtering medium with filtered particle size (initial filtration efficiency: 95%) of 10 μm, and was coated on one side of the uniaxial oriented PET film by reverse-roll method. At the time, as application rolls and metalling rolls of a coater, rolls formed with a surface of 0.2 S or less by ultra-hard chromium zinc finish having circularity and cylindricity of 3/1000 mm were used.

After that, the coated surface was dried in a drying furnace placed right above the coater divided into 4 zones comprising a first zone at a temperature of 135° C. for 1.0 second, a second zone at a temperature of 65° C. for 2.2 seconds, a third zone at a temperature of 40° C. for 1.8 seconds, and a fourth zone at a temperature of 30° C. for 1.8 seconds. The amount of coating was determined in such a manner that a final solid content was to be 0.08 g/m². Transit time of the film from the coating to the inlet of the drying furnace was 0.8 seconds. At the time, wind speed of drying air in the first zone was set to 30 m/second, supply air volume of the drying air 130 m³/second, exhaust air volume 170 m³/second, supply air volume from the second zone to the fourth zone 100 m³/second, and the exhaust air volume 150 m³/second so as not to allow the drying air to flow into a side of the coater. Tension of the film was determined 7000 N/original fabric, and both side edges of the film were gripped with pinch roll from coating to an inlet of the drying furnace.

Further, during the coating, coating equipment wherein a ratio of a capacity of a tray for coating liquid, a capacity of the circulation tank and a capacity of the preparation tank had a following relationship was used.

(a) Ratio of capacity of tray for coating liquid to capacity of circulation tank=1/50
(b) Ratio capacity of circulation tank to capacity of preparation tank=1/40

Next, with the film side edges clipped, the film was introduced to hot air zone heated at a temperature of 120° C. and a speed of 15 m/second, and was stretched to 4.3 times in width direction. Then, while a width after stretched in width direction was maintained, it sequentially passed through a first heat fixation zone (temperature: 200° C.), a second heat fixation zone (temperature: 225° C.), a third heat fixation zone (temperature: 230° C.), a fourth heat fixation zone (temperature: 230° C.), a fifth heat fixation zone (temperature: 210° C.), a sixth heat fixation zone (temperature: 170° C.), and a seventh heat fixation zone (temperature: 120° C.). In the sixth heat fixation zone, relaxation treatment by 3% was carried out in width direction. Then, uncoated part of both side edges of the film were trimmed, and the film was wound by a winding device and further divided equally into four in width direction and slit to obtain a laminated polyester film roll having a width of 1000 mm, film length of 1000 m, and a film thickness of 125 μm. Wind speed of each of the heat fixation zones was 15 m/second, and transit time of each zone was 4.5 seconds, and spacing between nozzles spraying hot air was 350 mm, and the number of nozzles per 1 zone was 8.

Properties and characteristics of the Film are shown in Table 9. Further, a maximum value and a minimum value of the surface fraction of PEs of the resultant laminated polyester film roll in a longitudinal direction and in width direction; a maximum value and a minimum value of haze thereof, and a maximum value and a minimum value of adhesion to the hard coat layer are shown in Table 10. A range of fluctuation of surface fraction of PEs in a longitudinal direction of the resultant thermoplastic laminated polyester film roll was 10% and a range of fluctuation in width direction was 10%. An average value of the surface fraction of PEs was 65%. With respect to blocking resistance, all the measurement points were ○.

Example 22

The laminated polyester film was obtained in a same manner as Example 21 except that the coating liquid was changed to coating liquid BB using 10% by mass aqueous solution of fluorinated cationic type surfactant (Phthagent 310 produced by Neos Company Limited) pretreated in a same manner as Example 21 as a surfactant for the coating liquid.

Example 23

The laminated polyester film was obtained in a same manner as Example 21 except that, in heat fixation treatment step, temperature of each heat fixation zone was 190° C. in the first heat fixation zone, 205° C. in the second heat fixation zone, 220° C. in the third heat fixation zone, and 220° C. in the fourth heat fixation zone.

Example 24

The laminated polyester film was obtained in a same manner as Example 21 except that the coating liquid was changed to following coating liquid CC wherein the mass ratio of copolymerized polyester resin, polyurethane resin and cross-linker in the coating liquid was changed to 55/35/10.

(Preparation of Coating Liquid CC).

8.3 parts by mass of 30% by mass aqueous dispersion of the copolymerized polyester resin (A) used in Example 21, 7.9 parts by mass of 20% by mass aqueous solution of polyurethane resin (B) used in Example 21, 2.3 parts by mass of the cross-linker used in Example 21, 0.3 parts by mass of catalyst for Elastron (Cat 64 produced by Dai-Ichi Kogyo Seiyaku Co Ltd.), 40.2 parts by mass of water, and 37.4 parts by mass of isopropyl alcohol were mixed together. Further, 0.6 parts by mass of the aqueous solution of the surfactant used in Example 21, 2.3 parts by mass of 20% by mass aqueous dispersion of colloidal silica (Snowtex OL produced by Nissan Chemical Industries, Ltd.; average particle size of 40 nm) as particle A, and 0.5 parts by mass of 3.5% by mass aqueous dispersion of dry-method silica (Aerosil OX50 produced by Nippon Aerosil Co., Ltd.; average particle size of 200 nm, average primary particle size of 40 nm) as particle B were added followed by being subjected to pH adjustment with 5% by mass aqueous solution of sodium hydrogen carbonate, and passed through filters with filtration performance of 5 μm and 1 μm sequentially to give coating liquid CC.

Example 25

The laminated polyester film was obtained in a same manner as Example 21 except that the coating liquid was changed to following coating liquid DD wherein the mass ratio of copolymerized polyester resin, polyurethane resin and cross-linker in the coating liquid was changed to 35/55/10.

(Preparation of Coating Liquid DD)

5.3 parts by mass of 30% by mass aqueous dispersion of the copolymerized polyester resin (A) used in Example 21, 12.4 parts by mass of 20% by mass aqueous solution of polyurethane resin (B) used in Example 21, 2.3 parts by mass of the cross-linker used in Example 21, 0.3 parts by mass of catalyst for Elastron (Cat 64 produced by Dai-Ichi Kogyo Seiyaku Co Ltd.), 38.5 parts by mass of water, and 37.6 parts by mass of isopropyl alcohol were mixed together. Further, 0.6 parts by mass of the 10% by mass aqueous solution of the surfactant used in Example 21, 2.3 parts by mass of 20% by mass aqueous dispersion of colloidal silica (Snowtex OL produced by Nissan Chemical Industries, Ltd.; average particle size of 40 nm) as particle A, and 0.5 parts by mass of 3.5% by mass aqueous dispersion of dry-method silica (Aerosil OX50 produced by Nippon Aerosil Co., Ltd.; average particle size of 200 nm, average primary particle size of 40 nm) as particle B were added followed by being subjected to pH adjustment to 6.2 with 5% by mass aqueous solution of sodium hydrogen carbonate, and passed through filters with filtration performance of 5 μm and 1 μm sequentially to give coating liquid DD.

Example 26

The laminated polyester film was obtained in a same manner as Example 21 except that the amount of coating was determined so that the final solid content was to be 0.12 g/m².

Example 27

The laminated polyester film was obtained in a same manner as Example 21 except for a use of following coating liquid EE wherein the amount of the surfactant in the coating liquid was changed to 0.03% by mass.

(Preparation of Coating Liquid EE)

In preparation of the coating liquid of Example 21, the content of 10% by mass aqueous solution of fluorinated non-ionic surfactant (MEGAFACE F142D produced by Dainippon Ink and Chemicals Incorporated) was changed to 0.3 parts by mass, water to 39.4 parts by mass and isopropyl alcohol to 37.5 parts by mass.

Example 28

The laminated polyester film was obtained in a same manner as Example 21 except that following coating liquid FF in which the amount of surfactant in the coating liquid was changed to 0.10% by mass was used.

(Preparation of Coating Liquid FF)

In preparation of the coating liquid of Example 21, the content of 10% by mass aqueous solution of fluorinated non-ionic surfactant (MEGAFACE F142D produced by Dainippon Ink and Chemicals Incorporated) was changed to 1.0 part by mass, water to 39.0 parts by mass, and isopropyl alcohol to 37.5 parts by mass.

Example 29

The laminated polyester film was obtained in a same manner as Example 21 expect that the transit time of the film from the coating to the inlet of the drying furnace was changed to 0.7 seconds, drying time to 0.8 seconds, and further that the transit time for each zone during the heat fixation treatment step was changed to 3.5 seconds and a thickness of the film to 100 μm.

Example 30

The laminated polyester film was obtained in a same manner as Example 21 except that the transit time of the film from the coating to the inlet of the drying furnace was changed to 1.0 second, drying time to 1.9 seconds, and further that the transit time for each zone during the heat fixation treatment step was changed to 6.6 seconds and the film thickness to 188 μm.

Example 31

The laminated polyester film was obtained in a same manner as Example 21 except that the coating liquid was changed to coating liquid GG in which pH was adjusted to 7.9 by using 5% by mass sodium carbonate aqueous solution.

Example 32

The laminated polyester film was obtained in a same manner as Example 21 except that a covering layer was coated on both sides of the uniaxial orientation polyester film. Here, transit time of the film from the coating to the inlet of the drying furnace was 0.8 seconds for one side and 1.0 second for the other side.

Example 33

The laminated polyester film was obtained in a same manner as Example 21 except that the amount of coating of the final solid content was determined to be 0.02 g/m².

Example 34

The laminated polyester film was obtained in a same manner as Example 21 except that coating liquid HH in which the surfactant had not been pretreated was used. On the surface of the covering layer of the resultant laminated polyester film, phase separation structure of a copolymerized polyester resin and a polyurethane resin could be detected, but was somewhat unclear.

Example 35

The laminated polyester film was obtained in a same manner as Example 21 except for a use of the following coating liquid II in which the mass ratio of the dispersion medium (water/IPA) of the coating liquid was changed to 50/50 was used.

(Preparation of Coating Liquid II)

6.8 parts by mass of 30% by mass aqueous dispersion of the copolymerized polyester resin (A) used in Example 21, 10.1 parts by mass of 20% by mass aqueous solution of polyurethane resin (B) used in Example 21, 2.3 parts by mass of the cross-linker used in Example 21, 0.3 parts by mass of catalyst for Elastron (Cat 64 produced by Dai-Ichi Kogyo Seiyaku Co Ltd.), 30.0 parts by mass of water, and 46.8 parts by mass of isopropyl alcohol were mixed together. Further, 0.6 parts by mass of the 10% by mass aqueous solution of the surfactant used in Example 21, 2.3 parts by mass of 20% by mass aqueous dispersion of colloidal silica (Snowtex OL produced by Nissan Chemical Industries, Ltd.; average particle size of 40 nm) as particle A, and 0.5 parts by mass of 3.5% by mass aqueous dispersion of dry-method silica (Aerosil OX50 produced by Nippon Aerosil Co., Ltd.; average particle size of 200 nm, average primary particle size of 40 nm) as particle B were added followed by being subjected to pH adjustment to 6.2 with 5% by mass aqueous solution of sodium hydrogen carbonate, and passed through filters with filtration performance of 5 μm and 1 μm sequentially to give coating liquid II.

Example 36

A laminated polyester film having a thickness of 125 μm was obtained in a same manner as Example 21 except that coating liquid JJ in which pH of coating liquid was changed to 4.6 with acetic acid.

Example 37

The laminated polyester film was obtained in a same manner as Example 21 except that coating liquid KK in which polyurethane resin (B) was changed to a following polyurethane resin was used. The polyurethane resin was obtained by the following method.

(Preparation of Polyurethane Resin)

Ninety-three parts by mass of polyester diol (OHV: 111.8 eq/ton, AV: 1.1 eq/ton) comprising a composition of adipic acid//1.6-hexanediol/neopentyl glycol (molar ratio: 4//3/2) and 22 parts by mass of xylylene diisocyanate were mixed to react under nitrogen stream at 95 to 100° C. for 1 hour, thereby obtaining an urethane prepolymer (NCO/OH ratio: 1.50, free isocyanate group: theoretical value of 3.29% by mass, actual measurement value of 3.16% by mass).

Next, the resultant urethane prepolymer was cooled to 60° C., and 4.5 parts by mass of methyl ethyl ketoxime was added to react at 60° C. for 50 minutes, thereby obtaining a partially blocked urethane prepolymer containing 1.3% by mass of free isocyanate. Continuously, the urethane prepolymer was cooled to 55° C., and a mixed solvent comprising 9 parts by mass of isopropyl alcohol and 140 parts by mass of methanol was added, and they were evenly mixed. Subsequently, 9.3 parts by mass of 50% by mass aqueous solution of sodium bisulfite and 5.4 parts by mass of 30% by mass aqueous solution of N-methyl taurine were added and stirred intensively. About 30 minutes later, it started to exhibit water-solubility, and 2 hours later, free sodium bisulfite became almost zero, and the reaction finished. Then, water was added thereto to obtain a 20% by mass aqueous solution which were clouded and viscous.

Comparative Example 14

(1) Preparation of Coating Liquid LL 33.7 parts by mass of dimethyl terephthalate, 20.0 parts by mass of dimethyl isophthalate, 9.1 parts by mass of 5-sodiumsulfodimethyl isophthalate, 40.0 parts by mass of ethylene glycol, 10.0 parts by mass of diethylene glycol, and 0.049 parts by mass of calcium acetate monohydrate were mixed and was subjected to ester exchange at 200 to 230° C. until a theoretical amount of methanol was distilled. Next, 0.09 parts by mass of orthophosphoric acid was added to polymerize under a reduced pressure at 280° C., thereby obtaining a copolymerized polyester resin.

Hundred and ninety-two parts by mass of polyether containing a sulfonate group wherein polyether of ethylene oxide which started from allyl alcohol was sulfonated with sodium metabisulfite (content of $SO_3$: 8.3% by mass, content of polyethylene oxide: 83% by mass), 1013 parts by mass of polytetramethylene adipate (number average molecular weight: 2,250), and 248 parts by mass of polypropylene oxide polyether started with bisphenol A (number average molecular weight: 550) were mixed and were subjected to dehydration under vacuum at 100° C.

The mixture was heated to be at 70° C., and a mixture of 178 parts by mass of isophorone diisocyanate and 244 parts of hexamethylene-1,6-diisocyanate was added thereto, and a resultant mixture was stirred at 80° C. to 90° C. until a content of isocyanate thereof became 5.6% by mass. The prepolymer was cooled to 60° C., and 56 parts by mass of biuret polyisocyanate obtained from 3 mol of hexamethylene diisocyanate and 1 mol of water and 175 parts by mass of bisketimine obtained from isophorone diamine and acetone were sequentially added to obtain an aqueous dispersion of polyurethane.

The copolymerized polyester resin and polyurethane aqueous dispersion were blended in such a manner that a solid content of each of them became 20 parts by mass and 80 parts by mass respectively to prepare an aqueous dispersion with 10% by mass of solid concentration to give coating liquid LL. Here, particles and a surfactant were not blended in the coating liquid.

(2) Production of Laminated Polyester Film

As a raw material polymer, polyethylene terephthalate resin pellets devoid of particles having intrinsic viscosity of 0.66 dl/g were dried under a reduced pressure (1 Torr) at 135 for 6 hours, then they were fed into an extruder to be subjected to melt-extrusion into a sheet form at about 285° C., followed by rapid quench and solidification on a metal roll wherein the surface temperature thereof was maintained at 60° C. to obtain a cast film. At the time, as a filtering medium to remove foreign matter in the molten resin, in a same manner as Example 21, a filtering medium of sintered stainless-steel with filtered particle size of 15 μm (initial filtration efficiency: 95%) was used.

The cast film was heated by heated rolls and a infrared heater to 95° C., and was stretched in a longitudinal direction to 3.5 times by rolls having different speeds of rotation, thereby obtaining a uniaxial oriented PET film. Next, the coating liquid LL was subjected to microfiltration by a felt-type polypropylene filtering medium with filtered particle size (initial filtration efficiency: 95%) of 10 μm, and was coated on one side of the uniaxial oriented PET film by reverse-roll method. Next, with the film side edges clipped, the film was introduced to hot air zone heated at 110° C., and after drying, they were stretched in width direction to 3.5 times. At the time, wind speed in the tenter was 15 m/second, and drying time was 20 seconds. A time from coating on the film to an inlet of the tenter was 10.0 seconds. An amount of coating was determined so as to obtain 0.15 g/m² as a final solid content.

Next, while a width of the film stretched in width direction was maintained, the film sequentially and continuously passed through a first heat fixation zone (200° C.), a second heat fixation zone (205° C.), a third heat fixation zone, a fourth heat fixation zone (210° C.), a fifth heat fixation zone (215° C.), a sixth heat fixation zone (220° C.), and a seventh heat fixation zone (170° C.). Further, in the seventh heat fixation zone, the film was subjected to relaxation treatment of 3% in width direction, followed by trimming of uncoated part of both side edges of the film, thereby obtaining a laminated polyester film having a thickness of 125 µm. Wind speed of each of the heat fixation zones was 15 m/second, and transit time of each zone was 4.5 seconds, and spacing between nozzles spraying hot air was 700 mm, and the number of nozzles per 1 zone was 4.

On a surface of the covering layer of the resultant laminated polyester film, a phase separation structure between a copolymerized polyester resin and a polyurethane resin was unclear.

Comparative Example 15

(1) Preparation of Coating Liquid MM 3.0 parts by mass of 30% by mass aqueous dispersion of copolymerized polyester resin (A) used in Example 21, 18.0 parts by mass of 20% by mass aqueous solution of polyurethane resin (B) used in Example 21, 0.3 part by mass of a catalyst for Elastron (Cat 64 produced by Dai-Ichi Kogyo Seiyaku Co Ltd.), 70.7 parts by mass of water, and 4.7 parts by mass of isopropyl alcohol were mixed. Further, 0.6 parts by mass of 10% by mass aqueous solution of dodecyl benzene sulfonate as a surfactant, 2.3 parts by mass of 20% by mass aqueous dispersion of a colloidal silica (Snowtex OL produced by Nissan Chemical Industries, Ltd.; average particle size of 40 nm) as particle A, 0.5 parts by mass of 3.5% by mass aqueous dispersion of a dry-method silica (Aerosil OX50 produced by Nippon Aerosil Co., Ltd.; average particle size of 200 nm, average primary particle size of 40 nm) as particle B were added thereto to obtain coating liquid MM. A pH of coating liquid MM was 4.8 since pH adjustment was not performed.

(2) Production of Laminated Polyester Film

Next, after polyethylene terephthalate resin pellets devoid of particles used in Example 21 having intrinsic viscosity of 0.62 dl/g were dried under a reduced pressure (1 Torr) at 135 for 6 hours, they were fed into an extruder to be subjected to melt-extrusion into a sheet form at about 285° C., followed by rapid quench and solidification on a metal roll wherein the surface temperature thereof was maintained at 20° C. to obtain a cast film. At the time, as a filtering medium to remove foreign matter in the molten resin, a filtering medium of sintered stainless-steel with filtered particle size of 15 µm (initial filtration efficiency: 95%) was used.

The resultant cast film was heated by heated rolls and an infrared heater to 95° C., and was stretched in a longitudinal direction to 3.5 times by rolls having different speeds of rotation, thereby obtaining a uniaxial oriented PET film. Next, coating liquid MM was subjected to microfiltration by a felt-type polypropylene filtering medium with filtered particle size (initial filtration efficiency: 95%) of 10 µm, and was coated on one side of the uniaxial oriented PET film by reverse-roll method.

Next, with the film side edges clipped, the film was introduced to hot air zone heated at 80° C., and after a coated surface was dried, the film was stretched to 4.0 times in width direction. At the time, wind speed in the tenter was 15 m/second, and drying time was 20 seconds. A time from coating to an inlet of the tenter was 10.0 seconds. An amount of coating was determined so as to obtain 0.10 g/m² as a final solid content. Further, a laminated polyester film having a thickness of 125 µm was obtained in a same manner as Comparative Example 14 except that temperature in the heat fixation treatment step was 200° C. in the first heat fixation zone, 210° C. in the second heat fixation zone, 220° C. in the third heat fixation zone, 225° C. in the fourth heat fixation zone, 230° C. in the fifth heat fixation zone, 235° C. in the sixth heat fixation zone, and 240° C. in the seventh heat fixation zone, and further that relaxation treatment in width direction was not carried out.

On a surface of the covering layer of the resultant laminated polyester film, a phase separation structure between a copolymerized polyester resin and a polyurethane resin could not be observed.

Comparative Example 16

(1) Preparation of Coating Liquid NN 7.5 parts by mass of 30% by mass aqueous dispersion of copolymerized polyester resin (A) used in Example 21, 11.3 parts by mass of 20% by mass aqueous solution of polyurethane resin (B) used in Example 21, 0.3 parts by mass of catalyst for Elastron (Cat 64 produced by Dai-Ichi Kogyo Seiyaku Co Ltd.), 40.5 parts by mass of water and 39.5 parts by mass of isopropyl alcohol were mixed together. Additionally, 0.6 parts by mass of 10% by mass aqueous solution of fluorinated nonionic surfactant (MEGAFACE F142D produced by Dainippon Ink and Chemicals Incorporated) which had not been pretreated, and 0.03 parts by mass of 3.5% by mass aqueous dispersion of aggregate silica (Sylysia 310 produced by Fuji Silysia Chemical Ltd.; average particle size of 1.4 µm) as particle A was added, while and particle B were not used, to give coating liquid NN. A pH adjustment of coating liquid NN was not carried out. The pH of coating liquid NN was 4.6.

(2) Production of Laminated Polyester Film

Polyethylene terephthalate resin pellets devoid of particles used in Example 21 having intrinsic viscosity of 0.62 dl/g were fed into an extruder as raw material polymer to be subjected to melt-extrusion into a sheet form at about 285° C., followed by rapid quench and solidification on a metal roll wherein the surface temperature thereof was maintained at 20° C. to obtain a cast film. At the time, as a filtering medium to remove foreign matter in the molten resin, a filtering medium of sintered stainless-steel with filtered particle size of 15 µm (initial filtration efficiency: 95%) was used.

The resultant cast film was heated by heated rolls and a infrared heater to 95° C., and was stretched in a longitudinal direction to 3.5 times by rolls having different speeds of rotation, thereby obtaining a uniaxial oriented PET film. Next, the coating liquid NN was subjected to microfiltration by a felt-type polypropylene filtering medium with filtered particle size (initial filtration efficiency: 95%) of 10 µm, and was coated on one side of the uniaxial oriented PET film by reverse-roll method.

After the coating, the film was introduced to a drying furnace to dry at a temperature of 120° C. for 3.2 seconds. An amount of coating was determined in a manner that it was to be 0.08 g/m² as a final solid content. Transit time of the film from the coating to the inlet of the drying furnace was 3.2 seconds. Further, wind speed of the first zone of the drying furnace was 15 m/second, and with respect to wind speed from the second to fourth zone, in a same manner as Example 21, supply air volume of drying air was to be 70 m³/second in each zone from the first drying zone to the fourth drying zone, and exhaust air was to be ventilated naturally before and after drying furnace.

Continuously, transversal stretching was carried out in a same manner as Example 21 except that transversal stretching ratio was changed to 4.0 times, and heat fixation and relaxation treatment in width direction were carried out in a same manner as Comparative Example 15, thereby obtaining the laminated polyester film having a thickness of 125 μm. On a surface of the covering layer of the resultant laminated polyester film, phase separation structure between a copolymerized polyester resin and a polyurethane resin could not be observed.

Comparative Example 17

The laminated polyester film having a thickness of 125 μm was obtained in a same manner as Example 21 except that transit time of the film from the coating of coating liquid AA onto the film to the inlet of the drying furnace was set to 3.2 seconds.

Comparative Example 18

2.3 parts by mass of 30% by mass aqueous dispersion of copolymerized polyester resin (A) used in Example 21, 16.9 parts by mass of 20% by mass aqueous solution of polyurethane resin (B) used in Example 21, 2.3 parts by mass of the cross-linker used in Example 21, 0.3 parts by mass of catalyst for Elastron (Cat 64 produced by Dai-Ichi Kogyo Seiyaku Co Ltd.), 36.9 parts by mass of water, and 37.7 parts by mass of isopropyl alcohol were mixed together. Further, 0.6 parts by mass of 10% by mass aqueous solution of the surfactant used in Example 21, 2.3 parts by mass of 20% by mass aqueous dispersion of colloidal silica (Snowtex OL produced by Nissan Chemical Industries, Ltd.; average particle size of 40 nm) as particle A, and 0.5 parts by mass of 3.5% by mass aqueous dispersion of dry-method silica (Aerosil OX50 produced by Nippon Aerosil Co., Ltd.; average particle size of 200 nm, average primary particle size of 40 nm) as particle B were added, and pH thereof was adjusted to 6.2 with 5% by mass aqueous solution of sodium hydrogen carbonate to give coating liquid OO. The laminated polyester film having a thickness of 125 μm was obtained in a same manner as Example 21 except that coating liquid OO was used as a coating liquid.

Comparative Example 19

11.3 parts by mass of 30% by mass aqueous dispersion of copolymerized polyester resin (A) used in Example 21, 3.4 parts by mass of 20% by mass aqueous solution of polyurethane resin (B) used in Example 21, 2.3 parts by mass of the cross-linker used in Example 21, 0.3 parts by mass of catalyst for Elastron (Cat 64 produced by Dai-Ichi Kogyo Seiyaku Co Ltd.), 41.9 parts by mass of water and 37.2 parts by mass of isopropyl alcohol were mixed together, and further, 0.6 parts by mass of 10% by mass aqueous solution of the surfactant used in Example 21, 2.3 parts by mass of 20% by mass aqueous dispersion of colloidal silica (Snowtex OL produced by Nissan Chemical Industries, Ltd.; average particle size of 40 nm) as particle A, and 0.5 parts by mass of 3.5% by mass aqueous dispersion of dry-method silica (Aerosil OX50 produced by Nippon Aerosil Co., Ltd.; average particle size of 200 nm, average primary particle size of 40 nm) as particle B were added and pH thereof was adjusted to 6.2 with a 5% by mass aqueous solution of sodium hydrogen carbonate to give coating liquid PP. The laminated polyester film having a thickness of 125 μm was obtained in a same manner as Example 21 except that the coating liquid PP was used as a coating liquid.

Comparative Example 20

The laminated polyester film having a thickness of 125 μm was obtained in a same manner as Example 21, except that a temperature in each of the heat fixation treatment steps was set at 190° C. in the first heat fixation zone, 195° C. in the second heat fixation zone, and 200° C. from the third heat fixation zone to the fifth heat fixation zone. A phase separation structure between the copolymerized polyester resin and the polyurethane resin on the surface of the covering layer of the resultant laminated polyester film could not be observed.

Comparative Example 21

The laminated polyester film having a thickness of 125 μm was obtained in a same manner as Example 21 except that the wind speed in the drying furnace was set at 15 m/second.

Comparative Example 22

The laminated polyester film having a thickness of 125 μm was obtained in a same manner as Example 21 except that the amount of coating was determined so as to obtain the final solid content of 0.20 g/m².

Comparative Example 23

The laminated polyester film having a thickness of 125 μm was obtained in a same manner as Example 21 except that coating liquid QQ in which pH of the coating liquid was adjusted to 9.0 using 5% by mass sodium carbonate aqueous solution was used.

Comparative Example 24

The laminated polyester film having a thickness of 125 μm was obtained in a same manner as Example 21 except that coating liquid RR prepared without blending a surfactant as the coating liquid was used.

Example 38

7.5 parts by mass of 30% by mass aqueous dispersion of copolymerized polyester resin (A) used in Example 21, 11.3 parts by mass of 20% by mass aqueous solution of polyurethane resin (B) used in Example 21, 2.3 parts by mass of the cross-linker used in Example 21, 0.3 part s by mass of catalyst for Elastron (Cat 64 produced by Dai-Ichi Kogyo Seiyaku Co Ltd.), 40.5 parts by mass of water and 39.5 parts by mass of isopropyl alcohol were mixed together. Further, 0.6 parts by mass of 10% by mass aqueous solution of the surfactant used in Example 21, and 4.3 parts by mass of 3.5% by mass aqueous dispersion of aggregate silica (Sylysia 310 produced by Fuji Silysia Chemical Ltd.; average particle size of 1.94

μm) as particle A were added, and pH thereof was adjusted to 6.2 with 5% by mass aqueous solution of sodium hydrogen carbonate, and the mixture sequentially passed through filters having filtration performance of 5 μm and 1 μm to give a coating liquid SS. Particle B was not blended in coating liquid. The laminated polyester film having a thickness of 125 μm was obtained in a same manner as Example 21 except that the coating liquid SS was used.

Comparative Example 25

The laminated polyester film having a thickness of 125 μm was obtained in a same manner as Example 21 except for a use of coating liquid TT prepared in a manner that the solid content of the surfactant alone in the coating liquid was to be 0.60% by mass.

Example 39

The laminated polyester film having a thickness of 125 μm with uncoated part of both side edges of the film trimmed was obtained in a same manner as Example 21 except that a temperature in each of the heat fixation treatment steps was set at 200° C. in the first heat fixation zone, 210° C. in the second heat fixation zone, 215° C. in the third heat fixation zone, 220° C. in the fourth heat fixation zone, 225° C. in the fifth heat fixation zone, 230° C. in the sixth heat fixation zone, and 170° C. in the seventh heat fixation zone, and that relaxation treatment of 3% in a width direction was carried out in the seventh heat fixation zone.

Comparative Example 26

The laminated polyester film was obtained in a same manner as Example 21 except that 6.8 parts by mass of 30% by mass aqueous dispersion of copolymerized polyester resin (A) used in Example 21, 10.1 parts by mass of 20% by mass aqueous solution of polyurethane resin (B) used in Example 21, 0.3 parts by mass of catalyst for Elastron (Cat 64 produced by Dai-Ichi Kogyo Seiyaku Co Ltd.), 50.6 parts by mass of water and 26.2 parts by mass of isopropyl alcohol were mixed together, and further that 0.6 parts by mass of 10% by mass aqueous solution of the surfactant used in Example 21, 2.3 parts by mass of 20% by mass aqueous dispersion of colloidal silica (Snowtex OL produced by Nissan Chemical Industries, Ltd.; average particle size of 40 nm) as particle A and 0.5 parts by mass of 3.5% by mass aqueous dispersion of dry-method silica (Aerosil OX50 produced by Nippon Aerosil Co., Ltd.; average particle size of 200 nm, average primary particle size of 40 nm) as particle B were added thereto, and that pH of the mixture was adjusted to 6.2 with 5% by mass aqueous solution of sodium hydrogen carbonate to give a coating liquid UU and the coating liquid UU was used.

Example 40

The laminated polyester film roll having a length of 2000 m, a width of 1000 mm and a thickness of 125 μm was obtained in a same manner as Example 21 except that a coating equipment was used as a coating equipment, wherein the ratio of the capacity of the tray, the capacity of the circulation tank and the capacity of the preparation tank of the coating liquid had following conditions:

(a) The capacity of the coating liquid tray/the capacity of the circulation tank=1/5;
(b) The capacity of the circulation tank/the capacity of the preparation tank=1/50;
(c) The circularity and cylindricity of the application roll and metalling roll: 6/1000 mm; and
(d) No pinch roll is provided between the coater and the drying furnace.

Example 41

The laminated polyester film was obtained in a same manner as Example 21 except for a use of a coating liquid W using 2.3 parts by mass of 20% by mass aqueous dispersion of an epoxy cross-linker (Denacol EX-810 produced by Nagase Chemicals Ltd.) was used as a cross-linker for preparing the coating liquid.

Example 42

The laminated polyester film was obtained in a same manner as Example 21, except that coating liquid WW using 2.3 parts by mass of an oxazoline cross-linker (EPOCROS Series WS-700 produced by Nippon Shokubai Co. Ltd.) as a cross-linker for preparing the coating liquid was used.

Example 43

The laminated polyester film was obtained in a same manner as Example 21 except for a use of coating liquid XX obtained by mixing 7.5 parts by mass of 30% by mass aqueous dispersion of copolymerized polyester resin (A), 11.3 parts by mass of 20% by mass aqueous solution of isocyanate group-containing self-crosslinking polyurethane resin (B) blocked with sodium bisulfite (produced by Dai-Ichi Kogyo Seiyaku Co Ltd.; commercial name: Elastron (registered trade name)H-3), 0.3 parts by mass of catalyst for Elastron (commercial name of Cat 64 produced by Dai-Ichi Kogyo Seiyaku Co Ltd.), 39.8 parts by mass of water and 37.4 parts by mass of isopropyl alcohol, and further adding 0.6 parts by mass of 10% by mass aqueous solution of fluorinated nonionic surfactant (MEGAFACE F142D produced by Dainippon Ink and Chemicals Incorporated), 2.3 parts by mass of 20% by mass aqueous dispersion of colloidal silica (Snowtex OL produced by Nissan Chemical Industries, Ltd.; average particle size of 40 nm) as particle A, and 0.5 part by mass of 3.5% by mass aqueous dispersion of dry-method silica (Aerosil OX50 produced by Nippon Aerosil Co., Ltd.; average particle size of 200 nm, average primary particle size of 40 nm) as particle B.

Composition and characteristics of the coating liquid in Examples 21 to 43 and Comparative Examples 13 to 26 are shown in Table 6, conditions of coating and drying in Table 7, heat fixation conditions in Table 8, and properties and characteristics of the Film are shown in Table 9. Further, a maximum value and a minimum value of the surface fraction of PEs of the resultant laminated polyester film roll in a longitudinal direction and in width direction; a maximum value and a minimum value of haze thereof, and a maximum value and a minimum value of adhesion to the hard coat layer are shown in Table 10. With respect to blocking resistance, all the measurement points were ○.

TABLE 6

| | Resin | | Particles A | | Particles B | | | Surfactant | | | Coating liquid | |
|---|---|---|---|---|---|---|---|---|---|---|---|---|
| | Copolymerized PEs/PU/cross-linker (mass ratio) | Cross-linker Type | Average particle diameter μm | Amount added Mass % | Average particle diameter μm | Amount added Mass % | Solvent Mass ratio of water/IPA | Type | Pretreated/unpretreated | Amount blended Mass % | pH | Solid content Mass % |
| Example 21 | 45/45/10 | melamine | 0.04 | 0.45 | 0.20 | 0.02 | 60/40 | nonionic | pretreated | 0.06 | 6.2 | 5.30 |
| Example 22 | 45/45/10 | melamine | 0.04 | 0.45 | 0.20 | 0.02 | 60/40 | cationic | pretreated | 0.06 | 6.2 | 5.30 |
| Example 23 | 45/45/10 | melamine | 0.04 | 0.45 | 0.20 | 0.02 | 60/40 | nonionic | pretreated | 0.06 | 6.2 | 5.30 |
| Example 24 | 55/35/10 | melamine | 0.04 | 0.45 | 0.20 | 0.02 | 60/40 | nonionic | pretreated | 0.06 | 6.2 | 5.30 |
| Example 25 | 35/55/10 | melamine | 0.04 | 0.45 | 0.20 | 0.02 | 60/40 | nonionic | pretreated | 0.06 | 6.2 | 5.30 |
| Example 26 | 45/45/10 | melamine | 0.04 | 0.45 | 0.20 | 0.02 | 60/40 | nonionic | pretreated | 0.06 | 6.2 | 5.30 |
| Example 27 | 45/45/10 | melamine | 0.04 | 0.45 | 0.20 | 0.02 | 60/40 | nonionic | pretreated | 0.03 | 6.2 | 5.30 |
| Example 28 | 45/45/10 | melamine | 0.04 | 0.45 | 0.20 | 0.02 | 60/40 | nonionic | pretreated | 0.10 | 6.2 | 5.30 |
| Example 29 | 45/45/10 | melamine | 0.04 | 0.45 | 0.20 | 0.02 | 60/40 | nonionic | pretreated | 0.06 | 6.2 | 5.30 |
| Example 30 | 45/45/10 | melamine | 0.04 | 0.45 | 0.20 | 0.02 | 60/40 | nonionic | pretreated | 0.06 | 6.2 | 5.30 |
| Example 31 | 45/45/10 | melamine | 0.04 | 0.45 | 0.20 | 0.02 | 60/40 | nonionic | pretreated | 0.06 | 7.9 | 5.30 |
| Example 32 | 45/45/10 | melamine | 0.04 | 0.45 | 0.20 | 0.02 | 60/40 | nonionic | pretreated | 0.06 | 6.2 | 5.30 |
| Example 33 | 45/45/10 | melamine | 0.04 | 0.45 | 0.20 | 0.02 | 60/40 | nonionic | pretreated | 0.06 | 6.2 | 5.30 |
| Example 34 | 45/45/10 | melamine | 0.04 | 0.45 | 0.20 | 0.02 | 60/40 | nonionic | unpretreated | 0.06 | 6.2 | 5.30 |
| Example 35 | 45/45/10 | melamine | 0.04 | 0.45 | 0.20 | 0.02 | 50/50 | nonionic | pretreated | 0.06 | 6.2 | 5.30 |
| Example 36 | 45/45/10 | melamine | 0.04 | 0.45 | 0.20 | 0.02 | 60/40 | nonionic | pretreated | 0.06 | 4.6 | 5.30 |
| Example 37 | 45/45/10 | melamine | 0.04 | 0.45 | 0.20 | 0.02 | 60/40 | nonionic | pretreated | 0.06 | 6.2 | 5.30 |
| Example 38 | 45/45/10 | melamine | 1.4 | 3.0 | 0.20 | 0.02 | 60/40 | nonionic | pretreated | 0.06 | 6.2 | 5.30 |
| Example 39 | 45/45/10 | melamine | 0.04 | 0.45 | 0.20 | 0.02 | 60/40 | nonionic | pretreated | 0.06 | 6.2 | 5.30 |
| Example 40 | 45/45/10 | melamine | 0.04 | 0.45 | 0.20 | 0.02 | 60/40 | nonionic | pretreated | 0.06 | 6.2 | 5.30 |
| Example 41 | 45/45/10 | epoxy | 0.04 | 0.45 | 0.20 | 0.02 | 60/40 | nonionic | pretreated | 0.06 | 6.2 | 5.30 |
| Example 42 | 45/45/10 | oxazoline | 0.04 | 0.45 | 0.20 | 0.02 | 60/40 | nonionic | pretreated | 0.06 | 6.2 | 5.30 |
| Example 43 | 50/50/0 | — | 0.04 | 0.45 | 0.20 | 0.02 | 60/40 | nonionic | pretreated | 0.06 | 6.2 | 5.30 |
| Comparative Example 14 | 20/80/0 | — | — | — | — | — | 100/0 | — | — | — | 6.2 | 10.00 |
| Comparative Example 15 | 20/80/0 | — | 0.04 | 0.36 | 0.20 | 0.04 | 95/5 | anionic | unpretreated | 0.06 | 4.8 | 10.93 |
| Comparative Example 16 | 50/50/0 | — | 1.4 | 0.02 | — | — | 60/40 | nonionic | unpretreated | 0.06 | 4.6 | 4.87 |
| Comparative Example 17 | 45/45/10 | melamine | 0.04 | 0.45 | 0.20 | 0.02 | 60/40 | nonionic | pretreated | 0.06 | 6.2 | 5.30 |
| Comparative Example 18 | 15/75/10 | melamine | 0.04 | 0.45 | 0.20 | 0.02 | 60/40 | nonionic | pretreated | 0.06 | 6.2 | 5.30 |
| Comparative Example 19 | 75/15/10 | melamine | 0.04 | 0.45 | 0.20 | 0.02 | 60/40 | nonionic | pretreated | 0.06 | 6.2 | 5.30 |
| Comparative Example 20 | 45/45/10 | melamine | 0.04 | 0.45 | 0.20 | 0.02 | 60/40 | nonionic | pretreated | 0.06 | 6.2 | 5.30 |
| Comparative Example 21 | 45/45/10 | melamine | 0.04 | 0.45 | 0.20 | 0.02 | 60/40 | nonionic | pretreated | 0.06 | 6.2 | 5.30 |
| Comparative Example 22 | 45/45/10 | melamine | 0.04 | 0.45 | 0.20 | 0.02 | 60/40 | nonionic | pretreated | 0.06 | 6.2 | 5.30 |
| Comparative Example 23 | 45/45/10 | melamine | 0.04 | 0.45 | 0.20 | 0.02 | 60/40 | nonionic | pretreated | 0.06 | 9.0 | 5.30 |
| Comparative Example 24 | 45/45/10 | melamine | 0.04 | 0.45 | 0.20 | 0.02 | 60/40 | — | — | — | 6.2 | 5.30 |
| Comparative Example 25 | 45/45/10 | melamine | 0.04 | 0.45 | 0.20 | 0.02 | 60/40 | nonionic | pretreated | 0.60 | 6.2 | 5.30 |
| Comparative Example 26 | 45/45/10 | melamine | 0.04 | 0.45 | 0.20 | 0.02 | 72/28 | nonionic | pretreated | 0.06 | 6.2 | 5.30 |

TABLE 7

| | Conditions of coating and drying | | | | |
|---|---|---|---|---|---|
| | Transit time from immediately after coating to inlet of drying step (second) | Drying temperature (° C.) | Drying time (second) | Wind speed (m/s) | Final amount of coating (g/m²) |
| Example 21 | 0.8 | 135 | 1.0 | 30 | 0.08 |
| Example 22 | 0.8 | 0.8 | 0.8 | 30 | 0.08 |
| Example 23 | 0.8 | 0.8 | 0.8 | 30 | 0.08 |
| Example 24 | 0.8 | 0.8 | 0.8 | 30 | 0.08 |
| Example 25 | 0.8 | 0.8 | 0.8 | 30 | 0.08 |
| Example 26 | 0.8 | 0.8 | 0.8 | 30 | 0.12 |
| Example 27 | 0.8 | 0.8 | 0.8 | 30 | 0.08 |

TABLE 7-continued

| | Conditions of coating and drying | | | | |
|---|---|---|---|---|---|
| | Transit time from immediately after coating to inlet of drying step (second) | Drying temperature (° C.) | Drying time (second) | Wind speed (m/s) | Final amount of coating (g/m²) |
| Example 28 | 0.8 | 0.8 | 0.8 | 30 | 0.08 |
| Example 29 | 0.7 | 0.8 | 0.8 | 30 | 0.08 |
| Example 30 | 1.0 | 0.8 | 1.9 | 30 | 0.08 |
| Example 31 | 0.8 | 0.8 | 1.0 | 30 | 0.08 |
| Example 32 | 0.8/1.0 | 0.8 | 1.0 | 30 | 0.08 |
| Example 33 | 0.8 | 0.8 | 1.0 | 30 | 0.02 |
| Example 34 | 0.8 | 0.8 | 1.0 | 30 | 0.08 |
| Example 35 | 0.8 | 0.8 | 1.0 | 30 | 0.08 |
| Example 36 | 0.8 | 0.8 | 1.0 | 30 | 0.08 |
| Example 37 | 0.8 | 0.8 | 1.0 | 30 | 0.08 |
| Example 38 | 0.8 | 0.8 | 1.0 | 30 | 0.08 |
| Example 39 | 0.8 | 0.8 | 1.0 | 30 | 0.08 |
| Example 40 | 0.8 | 0.8 | 1.0 | 30 | 0.08 |
| Example 41 | 0.8 | 0.8 | 1.0 | 30 | 0.08 |
| Example 42 | 0.8 | 0.8 | 1.0 | 30 | 0.08 |
| Example 43 | 0.8 | 135 | 1.0 | 30 | 0.08 |
| Comparative Example 14 | 10 | 110 | 20 | 15 | 0.15 |
| Comparative Example 15 | 10 | 80 | 20 | 20 | 0.10 |
| Comparative Example 16 | 3.2 | 120 | 1.0 | 15 | 0.08 |
| Comparative Example 17 | 3.2 | 135 | 1.0 | 30 | 0.08 |
| Comparative Example 18 | 0.8 | 135 | 1.0 | 30 | 0.08 |
| Comparative Example 19 | 0.8 | 135 | 1.0 | 30 | 0.08 |
| Comparative Example 20 | 0.8 | 135 | 1.0 | 30 | 0.08 |
| Comparative Example 21 | 0.8 | 135 | 1.0 | 15 | 0.08 |
| Comparative Example 22 | 0.8 | 135 | 1.0 | 30 | 0.20 |
| Comparative Example 23 | 0.8 | 135 | 1.0 | 30 | 0.08 |
| Comparative Example 24 | 0.8 | 135 | 1.0 | 30 | 0.08 |
| Comparative Example 25 | 0.8 | 135 | 1.0 | 30 | 0.08 |
| Comparative Example 26 | 0.8 | 135 | 1.0 | 30 | 0.08 |

TABLE 8

| | Heat fixation conditions | | | | | | | |
|---|---|---|---|---|---|---|---|---|
| | Heat fixation temperature (° C.) | | | | | | | Transit time in |
| | zone #1 | zone #2 | zone #3 | zone #4 | zone #5 | zone #6 | zone #7 | each zone (second) |
| Example 21 | 200 | 225 | 230 | 230 | 210 | 170 | 120 | 4.5 |
| Example 22 | 200 | 225 | 230 | 230 | 210 | 170 | 120 | 4.5 |
| Example 23 | 190 | 205 | 220 | 220 | 210 | 170 | 120 | 4.5 |
| Example 24 | 200 | 225 | 230 | 230 | 210 | 170 | 120 | 4.5 |
| Example 25 | 200 | 225 | 230 | 230 | 210 | 170 | 120 | 4.5 |
| Example 26 | 200 | 225 | 230 | 230 | 210 | 170 | 120 | 4.5 |
| Example 27 | 200 | 225 | 230 | 230 | 210 | 170 | 120 | 4.5 |
| Example 28 | 200 | 225 | 230 | 230 | 210 | 170 | 120 | 4.5 |
| Example 29 | 200 | 225 | 230 | 230 | 210 | 170 | 120 | 3.5 |
| Example 30 | 200 | 225 | 230 | 230 | 210 | 170 | 120 | 6.6 |
| Example 31 | 200 | 225 | 230 | 230 | 210 | 170 | 120 | 4.5 |
| Example 32 | 200 | 225 | 230 | 230 | 210 | 170 | 120 | 4.5 |
| Example 33 | 200 | 225 | 230 | 230 | 210 | 170 | 120 | 4.5 |
| Example 34 | 200 | 225 | 230 | 230 | 210 | 170 | 120 | 4.5 |
| Example 35 | 200 | 225 | 230 | 230 | 210 | 170 | 120 | 4.5 |
| Example 36 | 200 | 225 | 230 | 230 | 210 | 170 | 120 | 4.5 |
| Example 37 | 200 | 225 | 230 | 230 | 210 | 170 | 120 | 4.5 |
| Example 38 | 200 | 225 | 230 | 230 | 210 | 170 | 120 | 4.5 |
| Example 39 | 200 | 210 | 215 | 220 | 225 | 230 | 170 | 4.5 |
| Example 40 | 200 | 225 | 230 | 230 | 210 | 170 | 120 | 4.5 |
| Example 41 | 200 | 225 | 230 | 230 | 210 | 170 | 120 | 4.5 |
| Example 42 | 200 | 225 | 230 | 230 | 210 | 170 | 120 | 4.5 |
| Example 43 | 200 | 225 | 230 | 230 | 210 | 170 | 120 | 4.5 |
| Comparative Example 14 | 200 | 205 | 210 | 213 | 215 | 220 | 170 | 4.5 |
| Comparative Example 15 | 200 | 210 | 220 | 225 | 230 | 235 | 240 | 4.5 |
| Comparative Example 16 | 200 | 205 | 210 | 213 | 215 | 220 | 170 | 4.5 |
| Comparative Example 17 | 200 | 225 | 230 | 230 | 210 | 170 | 120 | 4.5 |
| Comparative Example 18 | 200 | 225 | 230 | 230 | 210 | 170 | 120 | 4.5 |

TABLE 8-continued

| | Heat fixation conditions | | | | | | | |
|---|---|---|---|---|---|---|---|---|
| | Heat fixation temperature (° C.) | | | | | | | Transit time in |
| | zone #1 | zone #2 | zone #3 | zone #4 | zone #5 | zone #6 | zone #7 | each zone (second) |
| Comparative Example 19 | 200 | 225 | 230 | 230 | 210 | 170 | 120 | 4.5 |
| Comparative Example 20 | 190 | 195 | 200 | 200 | 200 | 170 | 120 | 4.5 |
| Comparative Example 21 | 200 | 225 | 230 | 230 | 210 | 170 | 120 | 4.5 |
| Comparative Example 22 | 200 | 225 | 230 | 230 | 210 | 170 | 120 | 4.5 |
| Comparative Example 23 | 200 | 225 | 230 | 230 | 210 | 170 | 120 | 4.5 |
| Comparative Example 24 | 200 | 225 | 230 | 230 | 210 | 170 | 120 | 4.5 |
| Comparative Example 25 | 200 | 225 | 230 | 230 | 210 | 170 | 120 | 4.5 |
| Comparative Example 26 | 200 | 225 | 230 | 230 | 210 | 170 | 120 | 4.5 |

TABLE 9

| | Phase-separation structure of PEs phase | | | Film properties | | | Film evaluation | | | |
|---|---|---|---|---|---|---|---|---|---|---|
| | | | | | | | Adhesion to HC layer (%) | | | |
| | Surface fraction of PEs (%) | Presence/ absence of PEs phase (A) of more than 1 μm in width | Fractal dimension | Film thickness (μm) | Hardness index of covering layer (nm) | Haze (%) | Non-solvent type HC layer/ covering layer | Solvent- dilutable HC layer/ covering layer | Humidity- and heat- resistant adhesion | Blocking resistance |
| Example 21 | 65 | absent | 1.90 | 125 | 4.2 | 0.59 | 92 | 98 | ○ | ○ |
| Example 22 | 63 | absent | | 125 | 4.5 | 0.65 | 99 | 99 | ○ | ○ |
| Example 23 | 51 | absent | 1.77 | 125 | 6.0 | 0.47 | 99 | 99 | ○ | ○ |
| Example 24 | 72 | absent | 1.72 | 125 | 2.8 | 0.42 | 92 | 95 | ○ | ○ |
| Example 25 | 44 | absent | | 125 | 12.8 | 0.87 | 98 | 94 | ○ | ○ |
| Example 26 | 50 | absent | | 125 | 6.1 | 0.66 | 98 | 99 | ○ | ○ |
| Example 27 | 73 | absent | | 125 | 5.6 | 0.62 | 91 | 94 | ○ | ○ |
| Example 28 | 63 | absent | | 125 | 4.6 | 0.86 | 98 | 99 | ○ | ○ |
| Example 29 | 68 | absent | 1.93 | 100 | 4.4 | 0.56 | 97 | 98 | ○ | ○ |
| Example 30 | 49 | absent | 1.87 | 188 | 7.0 | 0.48 | 97 | 98 | ○ | ○ |
| Example 31 | 59 | absent | | 125 | 4.4 | 0.74 | 98 | 99 | ○ | ○ |
| Example 32 | 66 | absent | | 125 | 4.6 | 0.8 | 94 | 98 | ○ | ○ |
| Example 33 | 75 | absent | | 125 | 3.4 | 0.79 | 88 | 92 | ○ | ○ |
| Example 34 | 63 | absent | | 125 | 4.8 | 0.53 | 84 | 86 | ○ | ○ |
| Example 35 | 67 | absent | | 125 | 4.3 | 0.57 | 84 | 85 | ○ | ○ |
| Example 36 | 82 | absent | | 125 | 3.5 | 0.45 | 50 | 78 | ○ | ○ |
| Example 37 | 66 | absent | | 125 | 4.1 | 0.58 | 95 | 98 | ○ | ○ |
| Example 38 | 65 | present | | 125 | 4.7 | 3.43 | 99 | 99 | ○ | ○ |
| Example 39 | 45 | present | | 125 | 7.0 | 0.48 | 76 | 93 | ○ | ○ |
| Example 40 | 67 | absent | | 125 | 4.2 | 0.59 | 94 | 97 | ○ | ○ |
| Example 41 | 66 | absent | | 125 | 4.1 | 0.73 | 91 | 96 | ○ | ○ |
| Example 42 | 65 | absent | | 125 | 4.0 | 0.71 | 91 | 97 | ○ | ○ |
| Example 43 | 68 | absent | | 125 | 5.1 | 0.58 | 95 | 100 | x | ○ |
| Comparative Example 14 | 8 | absent | 1.25 | 125 | 16.6 | 1.05 | 75 | 50 | x | x |
| Comparative Example 15 | — | absent | | 125 | 16.4 | 0.75 | 84 | 60 | x | x |
| Comparative Example 16 | — | absent | | 125 | 6.6 | 0.41 | 100 | 95 | x | x |
| Comparative Example 17 | 26 | absent | 1.60 | 125 | 14.2 | 0.74 | 91 | 76 | ○ | x |
| Comparative Example 18 | 13 | absent | | 125 | 14.8 | 0.99 | 93 | 55 | ○ | x |
| Comparative Example 19 | 90 | present | 1.45 | 125 | 1.9 | 0.48 | 27 | 68 | ○ | ○ |
| Comparative Example 20 | — | absent | | 125 | 3.2 | 0.63 | 70 | 63 | ○ | x |
| Comparative Example 21 | 30 | absent | | 125 | 5.1 | 0.71 | 90 | 92 | ○ | x |
| Comparative Example 22 | 28 | absent | | 125 | 5.6 | 0.57 | 90 | 83 | ○ | x |
| Comparative Example 23 | 30 | absent | | 125 | 5.1 | 1.56 | 95 | 85 | ○ | Δ |
| Comparative Example 24 | 86 | absent | | 125 | 2.6 | 0.39 | 22 | 65 | ○ | ○ |
| Comparative Example 25 | 32 | absent | | 125 | 5.0 | 1.56 | 92 | 83 | ○ | Δ |

TABLE 9-continued

| | Phase-separation structure of PEs phase | | | Film properties | | | Film evaluation | | | |
|---|---|---|---|---|---|---|---|---|---|---|
| | | | | | | | | Adhesion to HC layer (%) | | |
| | Surface fraction of PEs (%) | Presence/ absence of PEs phase (A) of more than 1 μm in width | Fractal dimension | Film thickness (μm) | Hardness index of covering layer (nm) | Haze (%) | Non-solvent type HC layer/ covering layer | Solvent-dilutable HC layer/ covering layer | Humidity- and heat-resistant adhesion | Blocking resistance |
| Comparative Example 26 | 29 | absent | | 125 | 5.9 | 2.21 | 90 | 84 | ○ | x |

TABLE 10

| | | Surface fraction of PEs (%) | | Haze (%) | | Adhesion to HC layer (%) | | | | Humidity- and heat- resistant adhesion |
|---|---|---|---|---|---|---|---|---|---|---|
| | | | | | | Non-solvent type HC layer/ covering layer | | Solvent-dilutable HC layer/ covering layer | | |
| | | Max | Min | Max | Min | Max | Min | Max | Min | |
| Example 21 | Longitudinal direction | 70 | 60 | 0.6 | 0.57 | 100 | 90 | 100 | 97 | ○ |
| | Width direction | 71 | 61 | 0.6 | 0.57 | 100 | 91 | 100 | 97 | ○ |
| Example 40 | Longitudinal direction | 72 | 55 | 0.6 | 0.57 | 100 | 90 | 100 | 97 | ○ |
| | Width direction | 70 | 55 | 0.6 | 0.57 | 100 | 91 | 100 | 97 | ○ |
| Example 41 | Longitudinal direction | 71 | 61 | 0.75 | 0.70 | 95 | 87 | 100 | 93 | ○ |
| | Width direction | 70 | 62 | 0.75 | 0.69 | 95 | 88 | 100 | 94 | ○ |
| Example 42 | Longitudinal direction | 70 | 60 | 0.72 | 0.71 | 97 | 88 | 100 | 94 | ○ |
| | Width direction | 69 | 61 | 0.72 | 0.70 | 95 | 90 | 100 | 95 | ○ |

INDUSTRIAL APPLICABILITY

The laminated Thermoplastic resin film of the present invention thus obtained is excellent in adhesion to a functional layer such as a hard coat layer, a diffusion layer, and an antireflection layer, and, at the same time, is excellent in blocking resistance and transparency; therefore, it is preferable as a base film of an optional functional film or an optical functional sheet such as a hard coating film, an antireflection (AR) film, a prism lens sheet, a transparent conductive film, an infrared absorbing film, and an electromagnetic wave absorbing film. Additionally, it may be used as a film for printing to be printed using a UV ink comprising an acrylic resin as a resin component. In such a case, an opaque film, other than a transparent film, may be used as a thermoplastic resin film used as a base material.

The invention claimed is:

1. A laminated thermoplastic resin film comprising a covering layer containing a copolymerized polyester resin and a polyurethane resin on one side or both sides of a thermoplastic resin film, wherein
the covering layer has a microphase-separated or nanophase-separated structure in polyester phase A comprising a copolymerized polyester resin as a main component and polyurethane phase B comprising a polyurethane resin as a main component, and
when the covering layer is observed by a scanning probe microscopy in phase measurement mode, an area ratio (surface fraction of PEs) of polyester phase A (which indicates a dark phase in phase image) on a surface of the covering layer defined by following formula (1) is 35% or more and less than 90% per a measurement area of 5 μm×5 μm, wherein Surface fraction of PEs (%)=(area of polyester phase A/measurement area) ×100          (1).

2. The laminated thermoplastic resin film according to claim 1, wherein the copolymerized polyester resin is crosslinked using at least one cross-linker selected from an epoxy cross-linker, a melamine cross-linker, and an oxazoline cross-linker.

3. The laminated thermoplastic resin film according to claim 1, wherein the thermoplastic resin film or both the thermoplastic resin film and the covering layer contain particles.

4. The laminated thermoplastic resin film according to claim 1, wherein the thermoplastic resin film does not essentially contain particles but the covering layer alone contains particles.

5. The laminated thermoplastic resin film according to claim 3, wherein the particles are silica particles.

6. The laminated thermoplastic resin film according to claim 3, wherein the particles in the covering layer are unevenly distributed either in polyester phase A or polyurethane phase B.

7. The laminated thermoplastic resin film according to claim 3, wherein haze of the laminated thermoplastic resin film is 1.5% or less.

8. The laminated thermoplastic resin film according to claim 7, used as a base film of an optical functional film or an optical functional sheet.

9. The laminated thermoplastic resin film according to claim 8, wherein the optical functional film or the optical functional sheet is any one of a hard coating film, an antireflection film, an optical diffusion sheet, a prism sheet, a transparent conductive film, a near infrared absorbing film, and an electromagnetic wave absorbing film.

10. The laminated thermoplastic resin film according to claim 1, wherein the thermoplastic resin film is either a biaxially oriented polyester film or a biaxially oriented polyamide film.

11. The laminated thermoplastic resin film according to claim 1, wherein the lower limit of the surface fraction of PEs is 40%.

12. The laminated thermoplastic resin film according to claim 1, wherein the lower limit of the surface fraction of PEs is 45%.

13. The laminated thermoplastic resin film according to claim 1, wherein the upper limit of the surface fraction of PEs is 80%.

14. The laminated thermoplastic resin film according to claim 1, wherein the upper limit of the surface fraction of PEs is 75%.

15. The laminated thermoplastic resin film according to claim 1, wherein, in a phase image obtained by observing a surface of the covering layer by a scanning probe microscopy in phase measurement mode wherein a contour of an interface of a light phase and a dark phase is stressed, fractal dimension calculated from a boundary between the light phase and the dark phase (contour of the interface) by using box-counting method is from 1.60 to 1.95 per a measurement area of 5 μm×5 μm.

16. The laminated thermoplastic resin film according to claim 1, wherein a hardness index of the covering layer is from 3.0 to 15.0 nm, and wherein the hardness index of the covering layer means an average value of measured values obtained when measuring, by a non-contact system for three-dimensional surface shape measurement, concavo-convex shapes of scratches on the surface of the covering layer made with a needle having a sapphire with a radius of 75 μm at a tip thereof by applying a load of 5 gf; the values obtained by measuring difference of elevation between neighboring convex and concave portions at fifty different points.

17. The laminated thermoplastic resin film according to claim 1, wherein a functional layer comprising an acrylic resin as a main constituting component laminated on at least one side of the covering layer.

18. A laminated thermoplastic resin film roll formed by winding the laminated thermoplastic resin film according to claim 1 having a covering layer containing a copolymerized polyester resin and a polyurethane resin on one side or both sides thereof sequentially into a roll with a size of 1000 m or more in length and 50 mm or more in width, wherein when an area ratio (surface fraction of PEs) of polyester phase A (which indicates a dark phase in phase image) on the surface of the covering layer was measured along a longitudinal direction of the film at intervals of 100 m, a difference between a maximum value and a minimum value of the surface fraction of PEs on the surface of a covering layer in a longitudinal direction is 15% or less and wherein with regard to the measurement of the surface fraction of PEs on the surface of the covering layer, when the laminated thermoplastic resin film roll is wound off and one end of a constant region where film properties are stable is to be a first end and the other end is to be a second end in a longitudinal direction (MD) thereof, a first measurement is carried out within 2 m from the first end, and a final measurement is carried out within 2 m from the second end, while measurements are also carried out at every 100 m from a point of the first measurement.

19. The laminated thermoplastic resin film roll according to claim 18, wherein a difference between the maximum value and the minimum value of the surface fraction of PEs on the surface of the covering layer in width direction is 10% or less when the laminated thermoplastic resin film roll is wound off, and the film is divided equally into four in width direction to measure an area ratio (surface fraction of PEs) of polyester phase A (which indicates a dark phase in phase image) at a center of each.

* * * * *

UNITED STATES PATENT AND TRADEMARK OFFICE
CERTIFICATE OF CORRECTION

PATENT NO. : 7,531,238 B2
APPLICATION NO. : 11/791767
DATED : May 12, 2009
INVENTOR(S) : Naoki Mizuno et al.

It is certified that error appears in the above-identified patent and that said Letters Patent is hereby corrected as shown below:

Columns 75 and 76, line 8 in Table 7, third column titled "Drying temperature (°C)" for Examples 22, please change "0.8" to --135--;

Columns 75 and 76, line 9 in Table 7, third column titled "Drying temperature (°C)" for Examples 23, please change "0.8" to --135--;

Columns 75 and 76, line 10 in Table 7, third column titled "Drying temperature (°C)" for Examples 24, please change "0.8" to --135--;

Columns 75 and 76, line 11 in Table 7, third column titled "Drying temperature (°C)" for Examples 25, please change "0.8" to --135--;

Columns 75 and 76, line 12 in Table 7, third column titled "Drying temperature (°C)" for Examples 26, please change "0.8" to --135--;

Columns 75 and 76, line 13 in Table 7, third column titled "Drying temperature (°C)" for Examples 27, please change "0.8" to --135--;

Columns 77 and 78, line 7 in Table 7 - continued, third column titled "Drying temperature (°C)" for Examples 28, please change "0.8" to --135--;

Columns 77 and 78, line 8 in Table 7 - continued, third column titled "Drying temperature (°C)" for Examples 29, please change "0.8" to --135--;

Columns 77 and 78, line 9 in Table 7 - continued, third column titled "Drying temperature (°C)" for Examples 30, please change "0.8" to --135--;

Columns 77 and 78, line 10 in Table 7 - continued, third column titled "Drying temperature (°C)" for Examples 31, please change "0.8" to --135--;

Columns 77 and 78, line 11 in Table 7 - continued, third column titled "Drying temperature (°C)" for Examples 32, please change "0.8" to --135--;

Signed and Sealed this

Twenty-fourth Day of August, 2010

David J. Kappos
*Director of the United States Patent and Trademark Office*

Columns 77 and 78, line 12 in Table 7 - continued, third column titled "Drying temperature (°C)" for Examples 33, please change "0.8" to --135--;

Columns 77 and 78, line 13 in Table 7 - continued, third column titled "Drying temperature (°C)" for Examples 34, please change "0.8" to --135--;

Columns 77 and 78, line 14 in Table 7 - continued, third column titled "Drying temperature (°C)" for Examples 35, please change "0.8" to --135--;

Columns 77 and 78, line 15 in Table 7 - continued, third column titled "Drying temperature (°C)" for Examples 36, please change "0.8" to --135--;

Columns 77 and 78, line 16 in Table 7 - continued, third column titled "Drying temperature (°C)" for Examples 37, please change "0.8" to --135--;

Columns 77 and 78, line 17 in Table 7 - continued, third column titled "Drying temperature (°C)" for Examples 38, please change "0.8" to --135--;

Columns 77 and 78, line 18 in Table 7 - continued, third column titled "Drying temperature (°C)" for Examples 39, please change "0.8" to --135--;

Columns 77 and 78, line 19 in Table 7 - continued, third column titled "Drying temperature (°C)" for Examples 40, please change "0.8" to --135--;

Columns 77 and 78, line 20 in Table 7 - continued, third column titled "Drying temperature (°C)" for Examples 41, please change "0.8" to --135--; and Columns 77 and 78, line 21 in Table 7 - continued, third column titled "Drying temperature (°C)" for Examples 42, please change "0.8" to --135--.